Dec. 16, 1924.
M. P. JACOMINI ET AL
1,519,455
BRIQUETTING MACHINE
Filed April 12, 1920   37 Sheets-Sheet 20
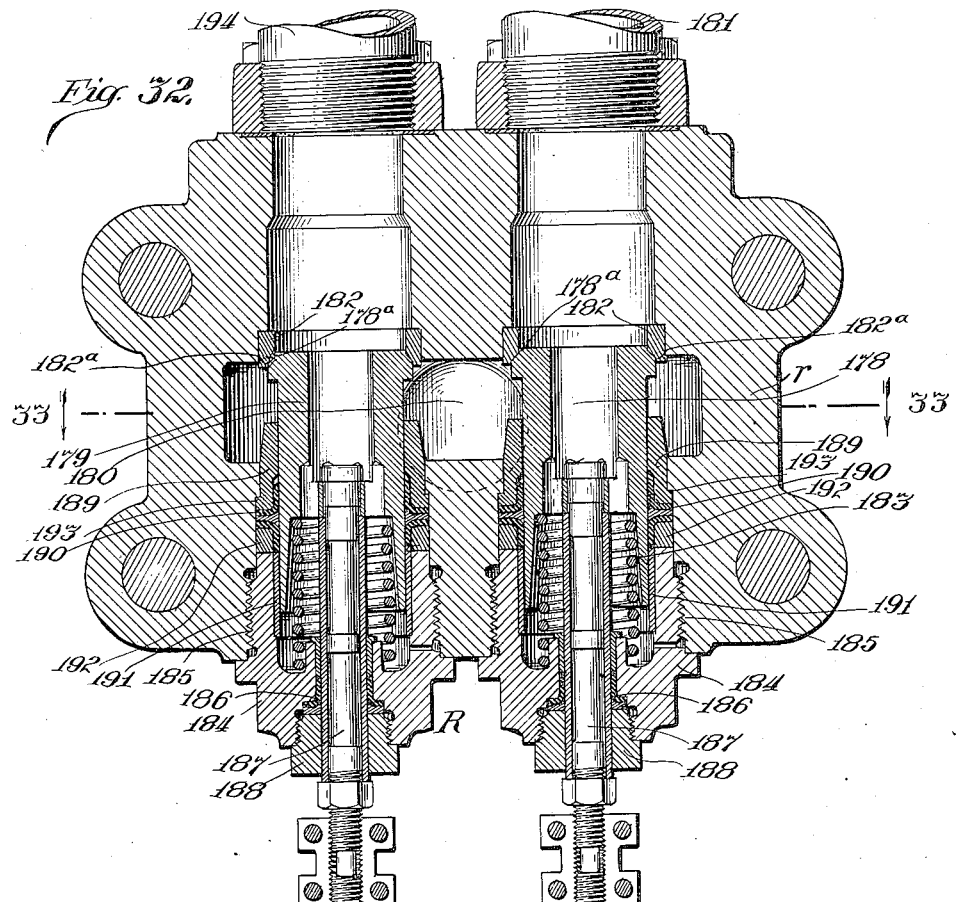
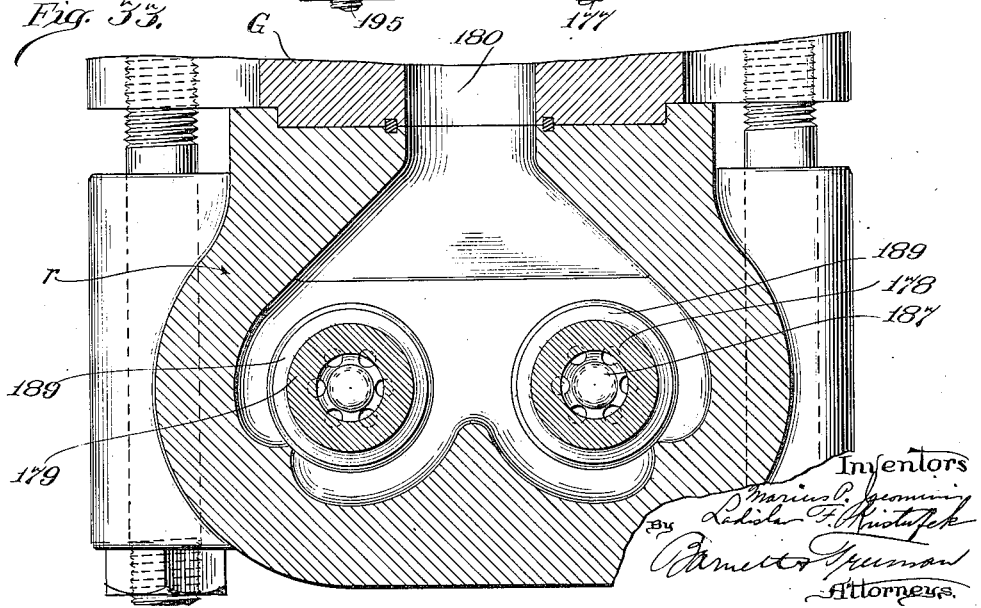

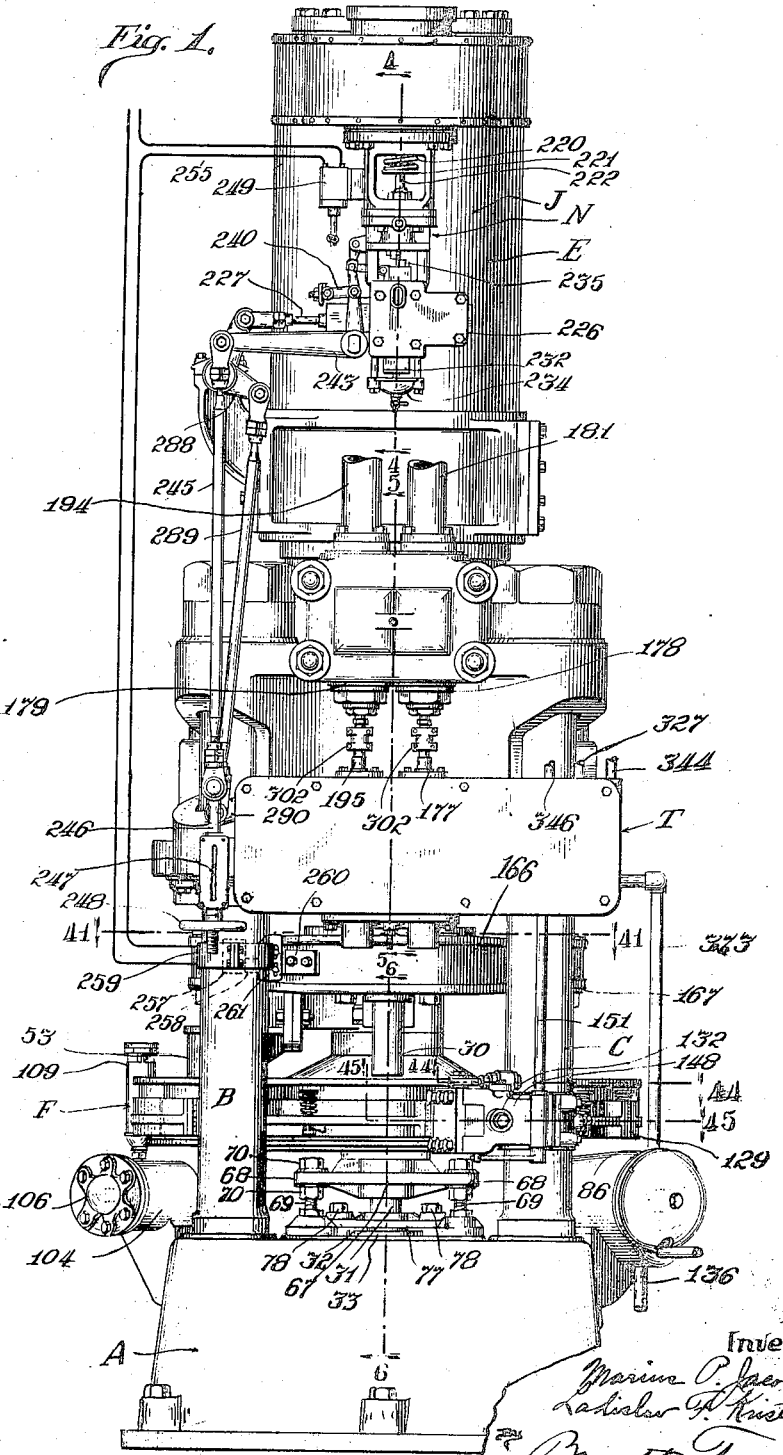

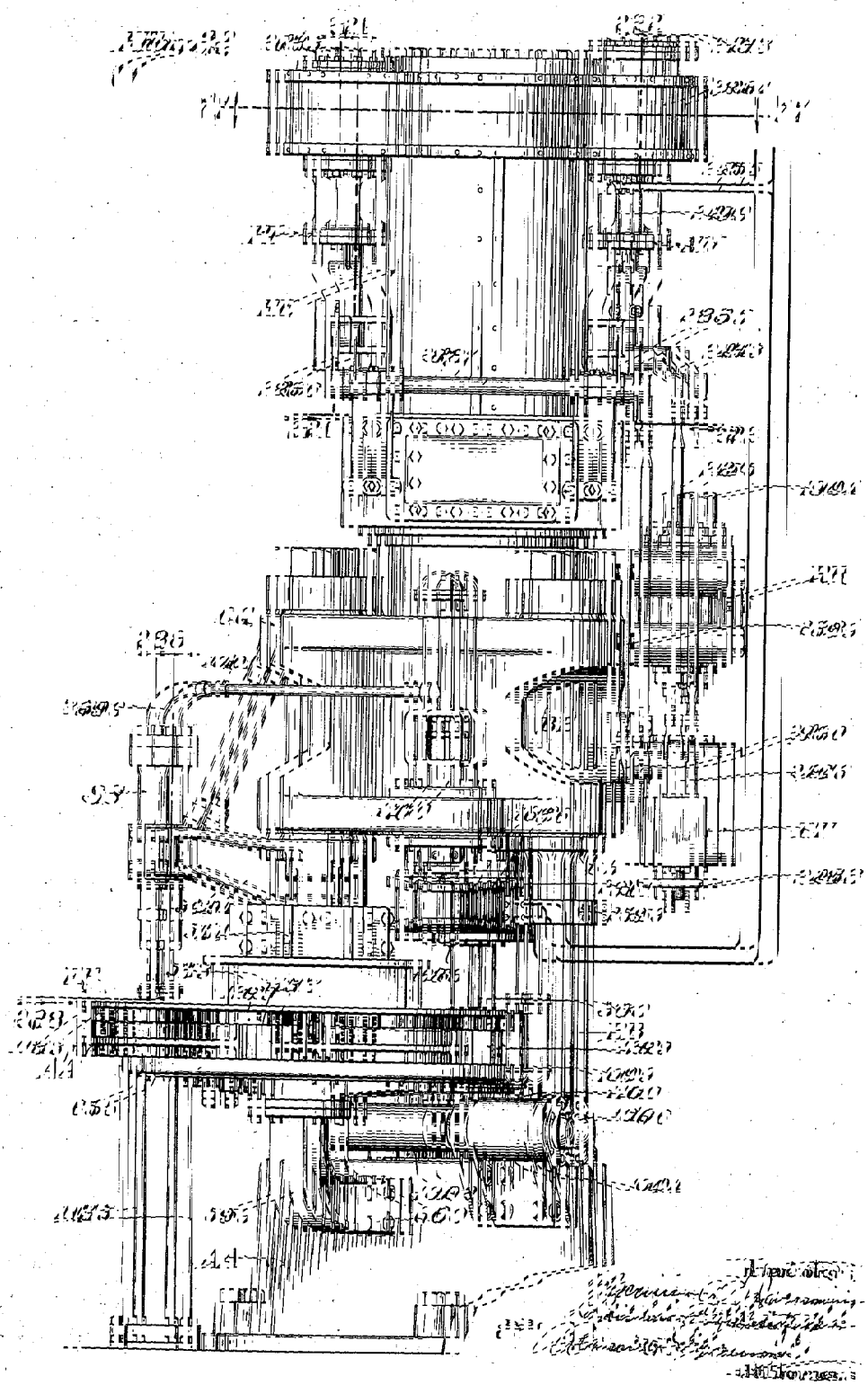

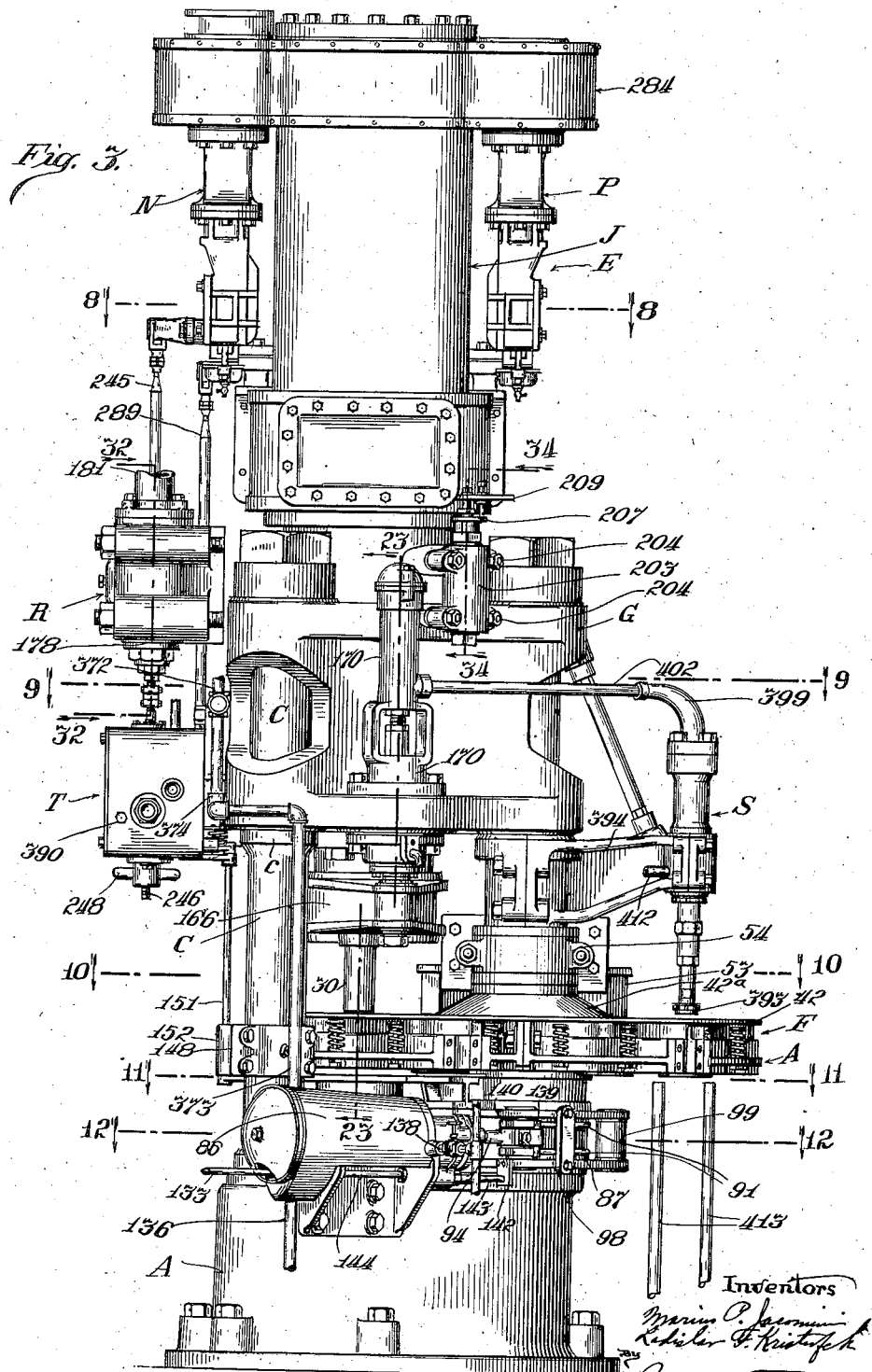

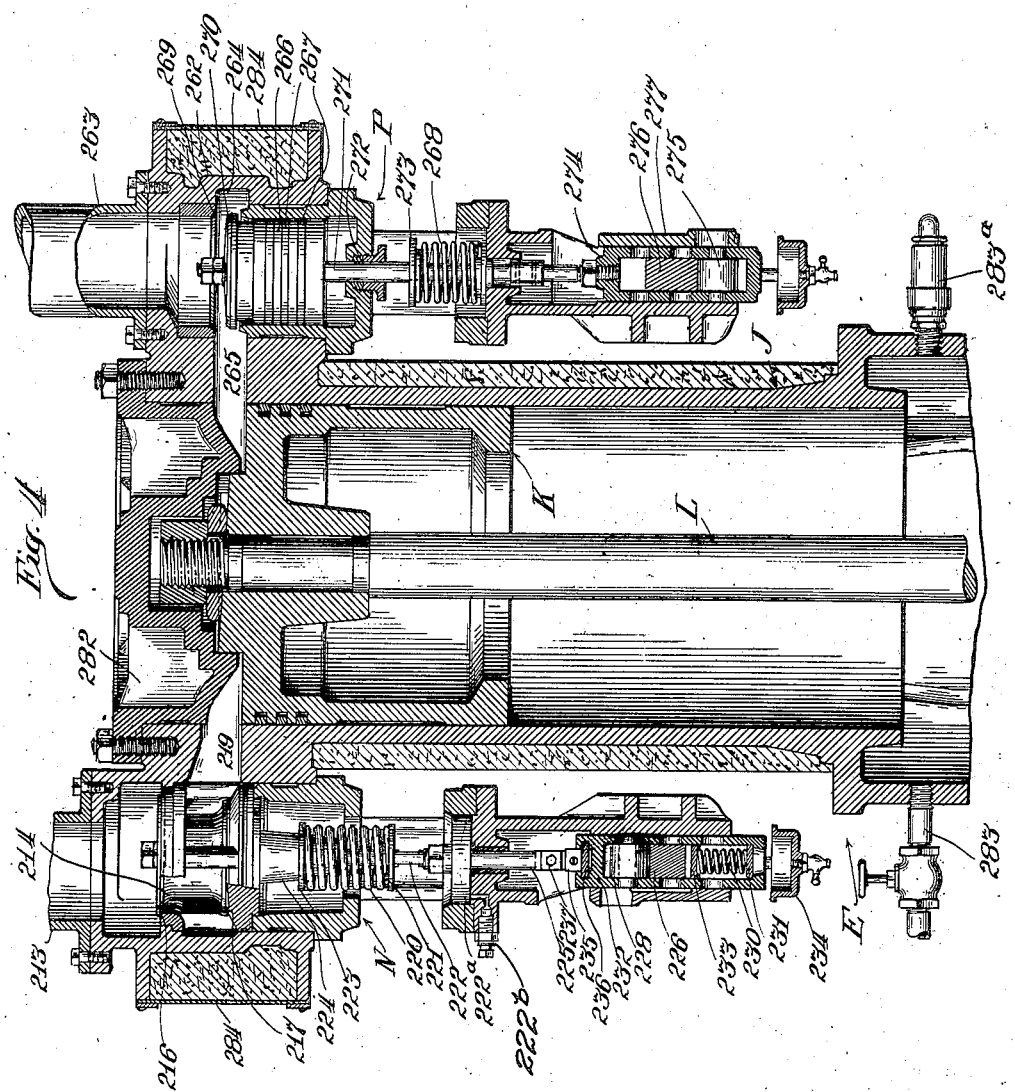

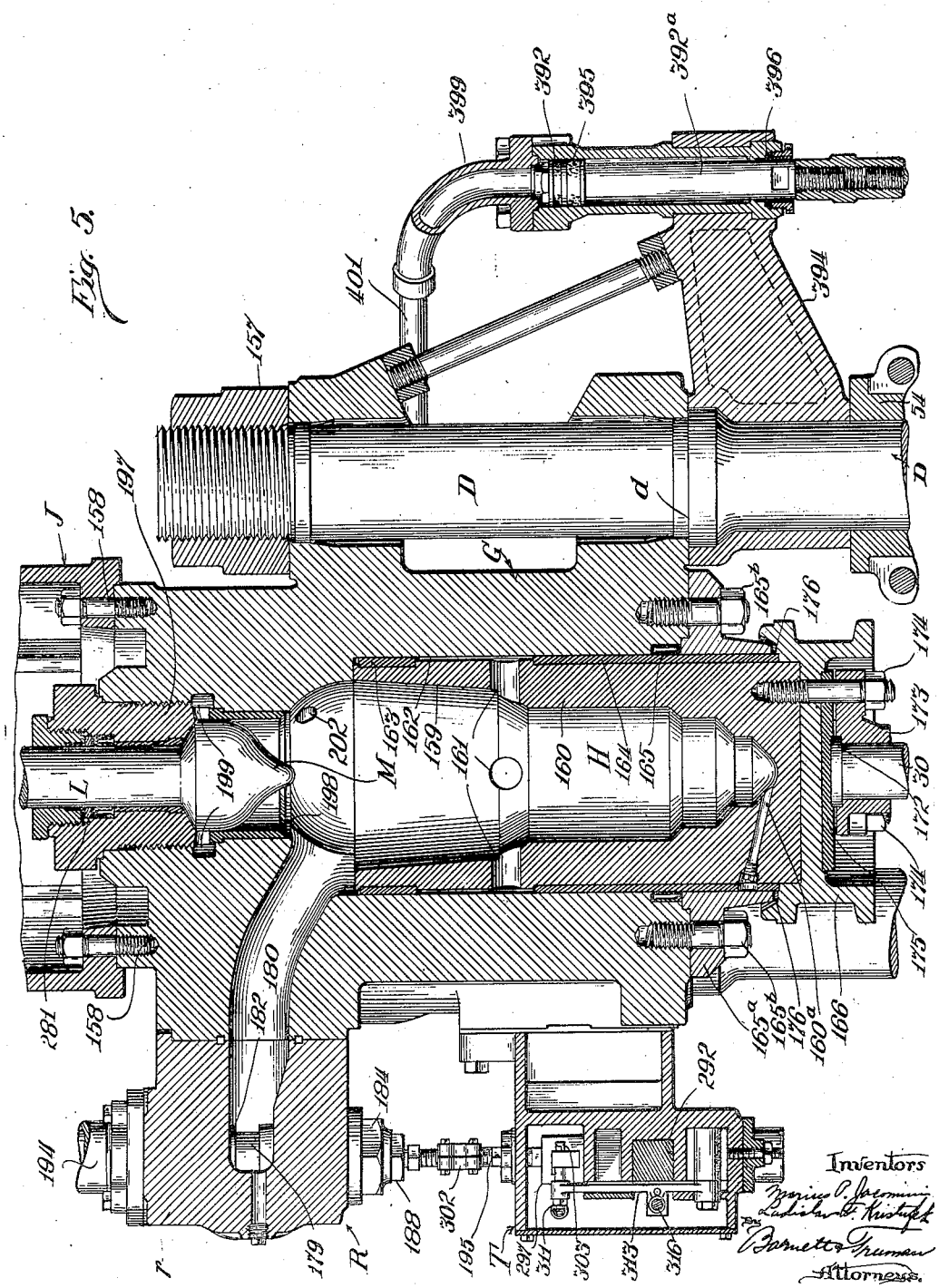

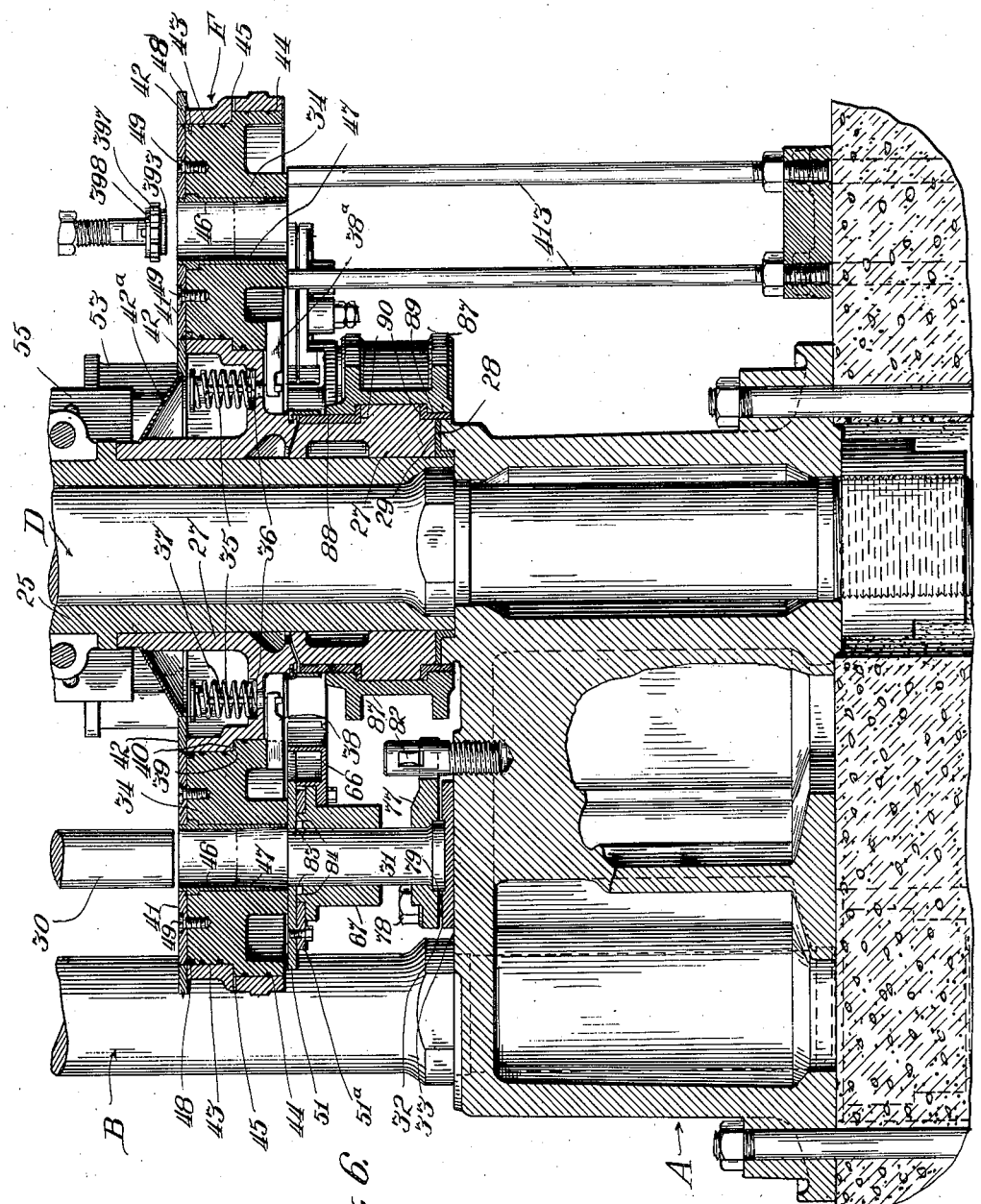

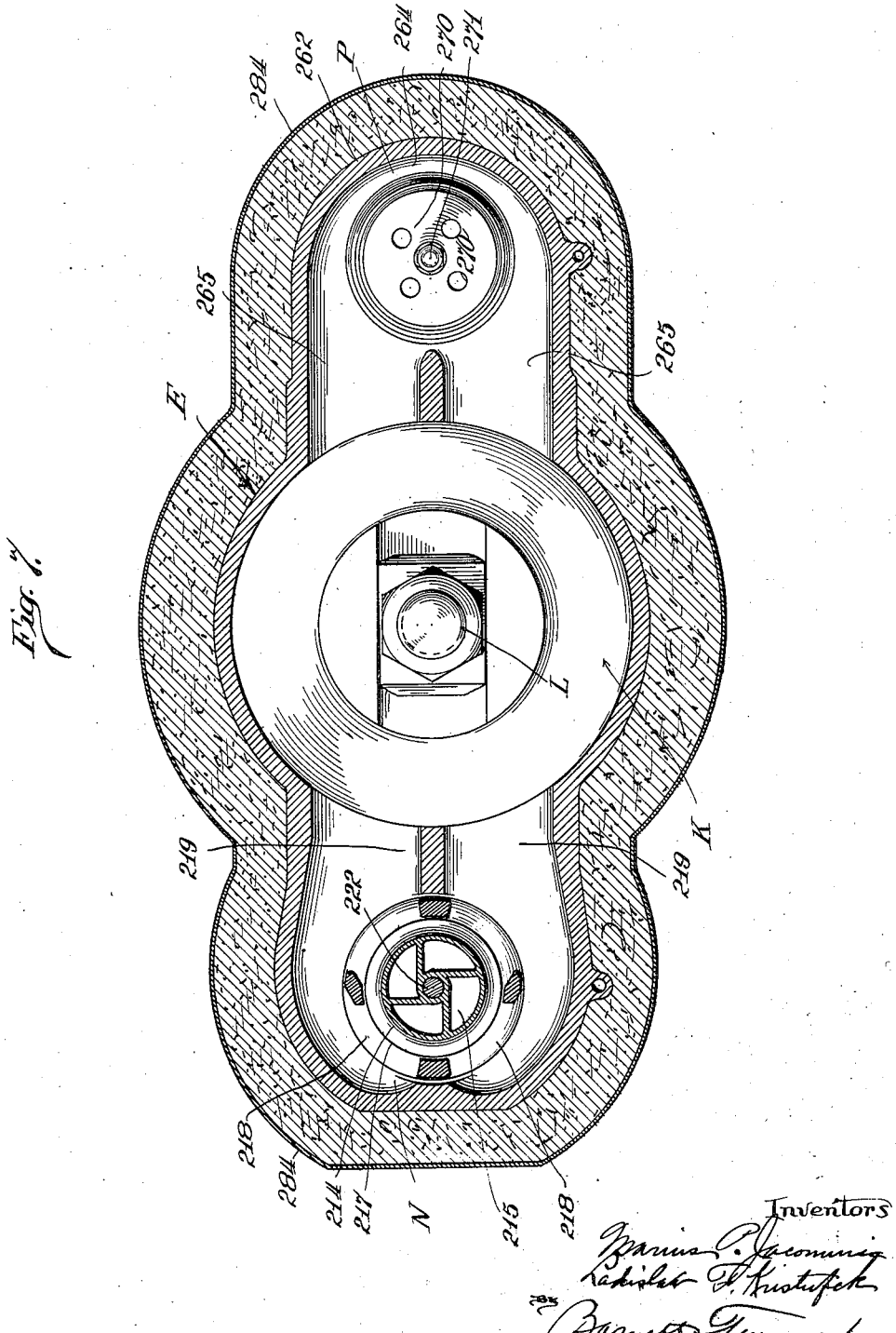

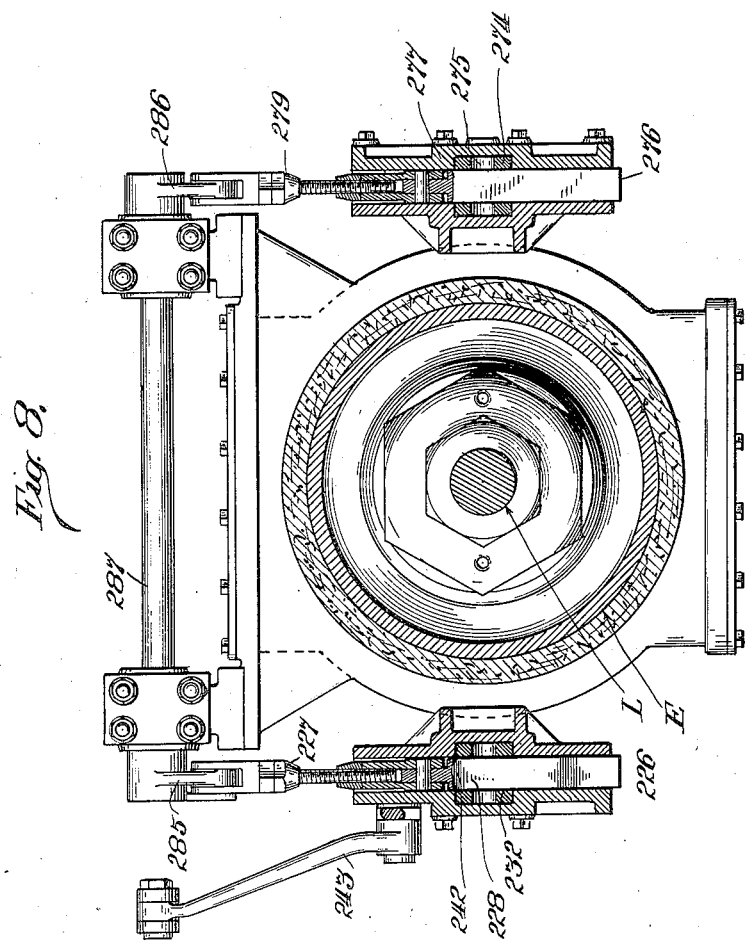

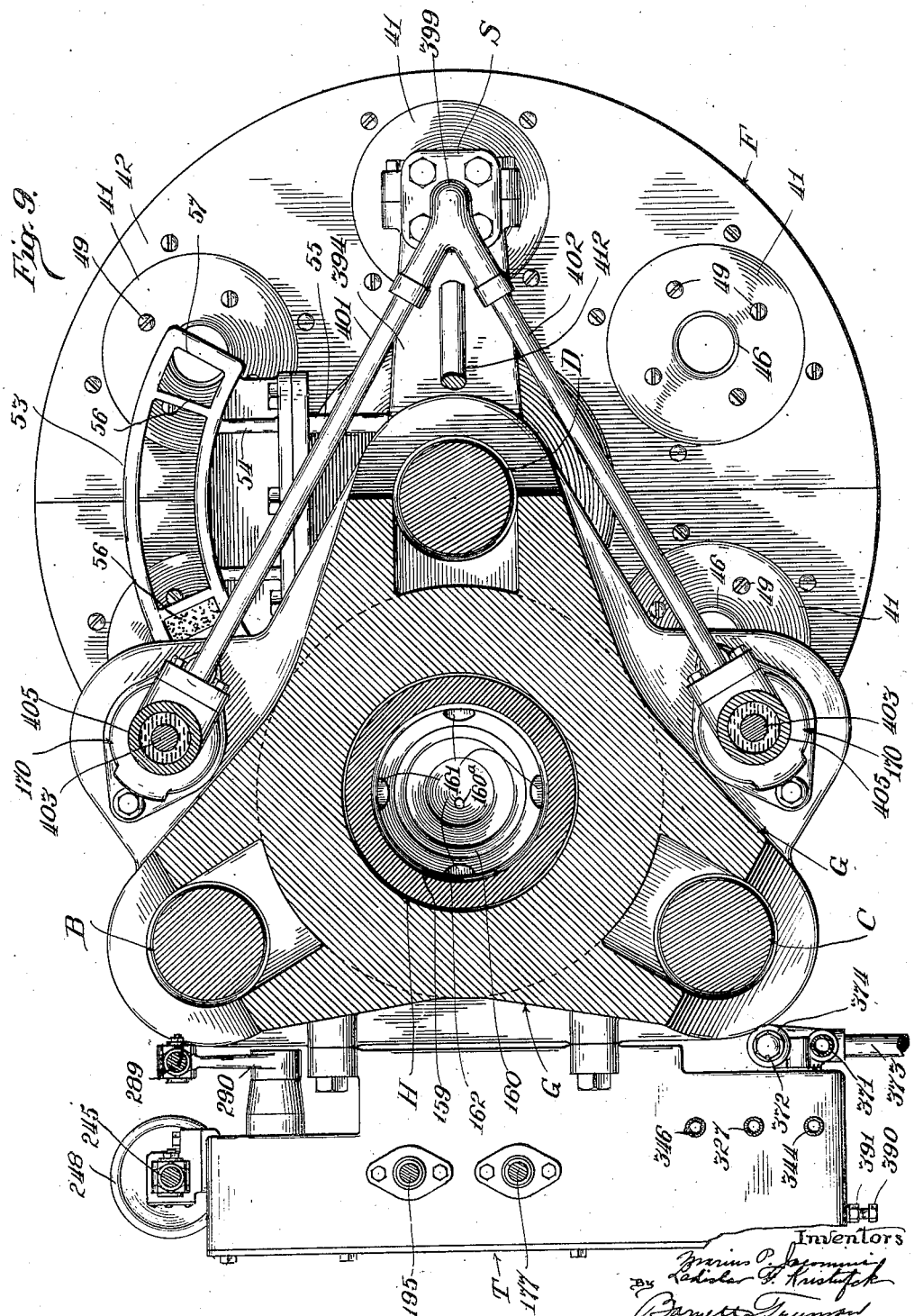

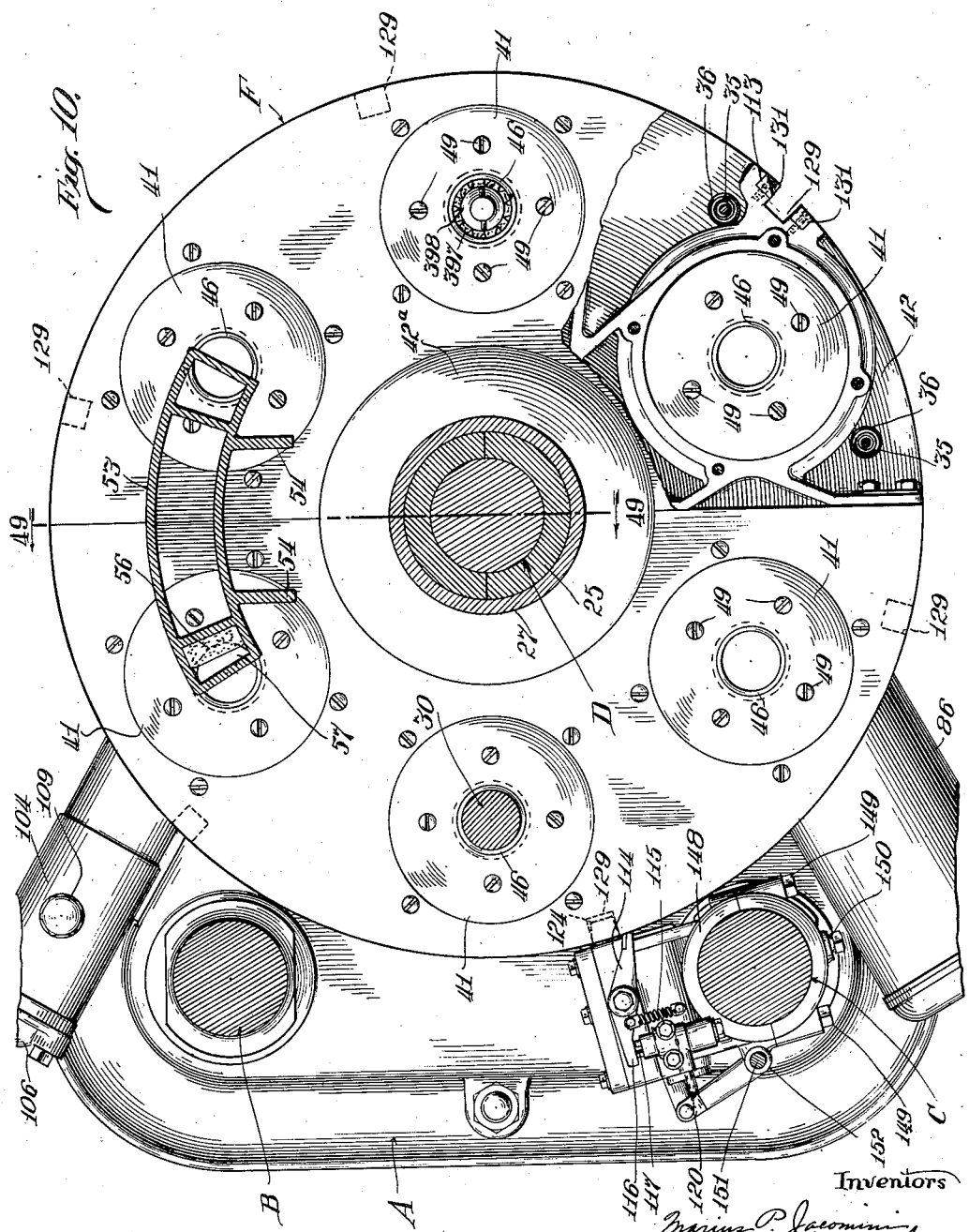

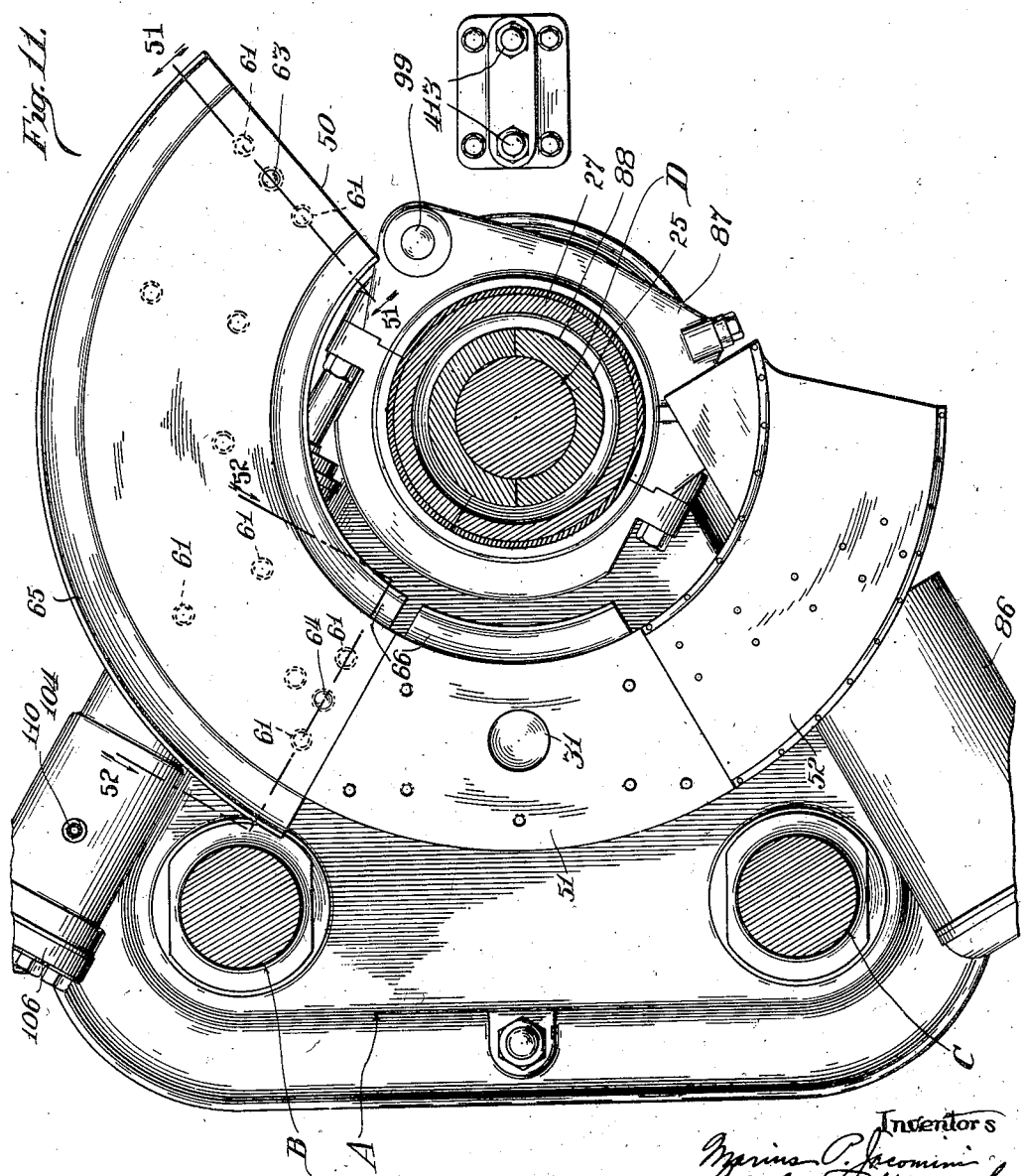

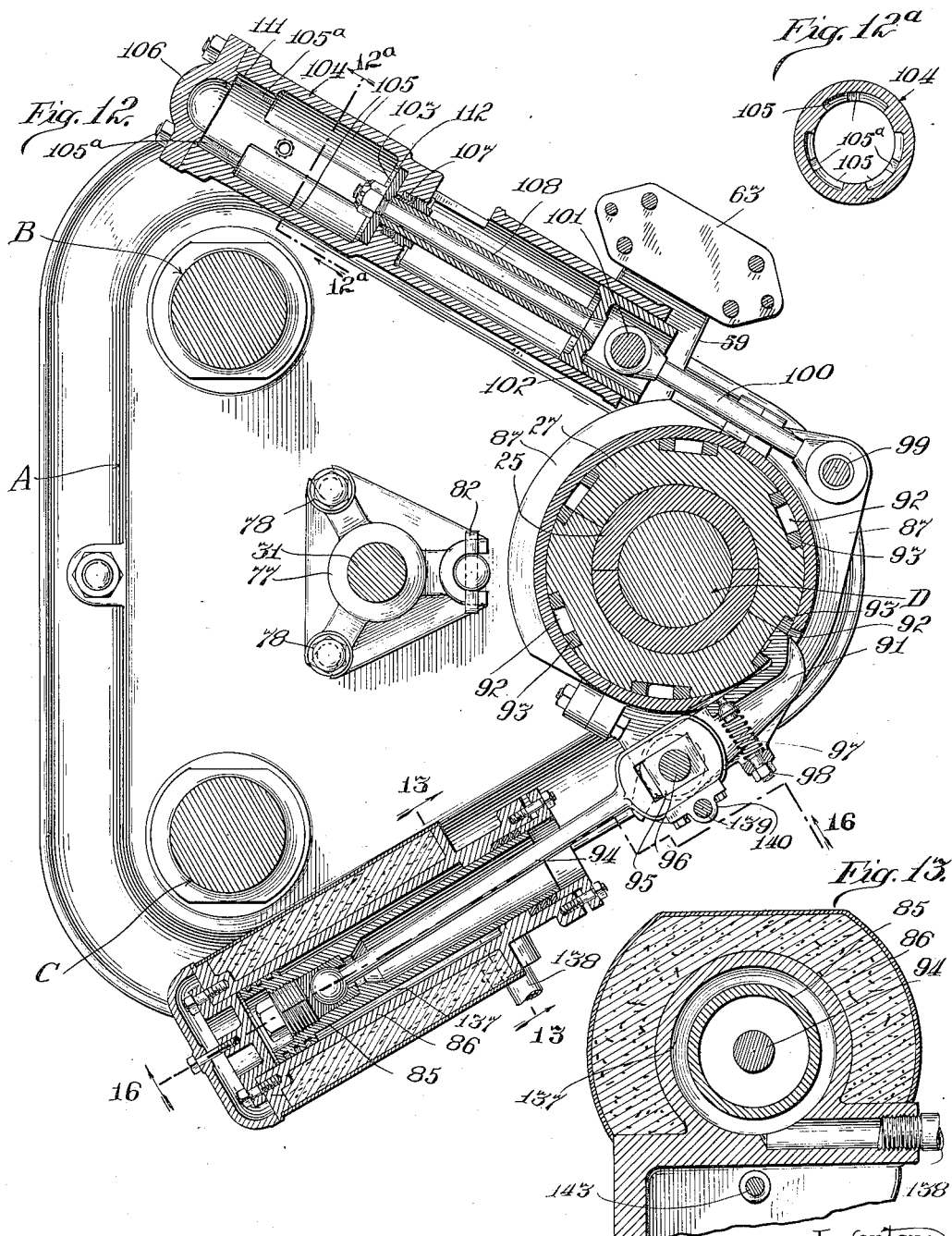

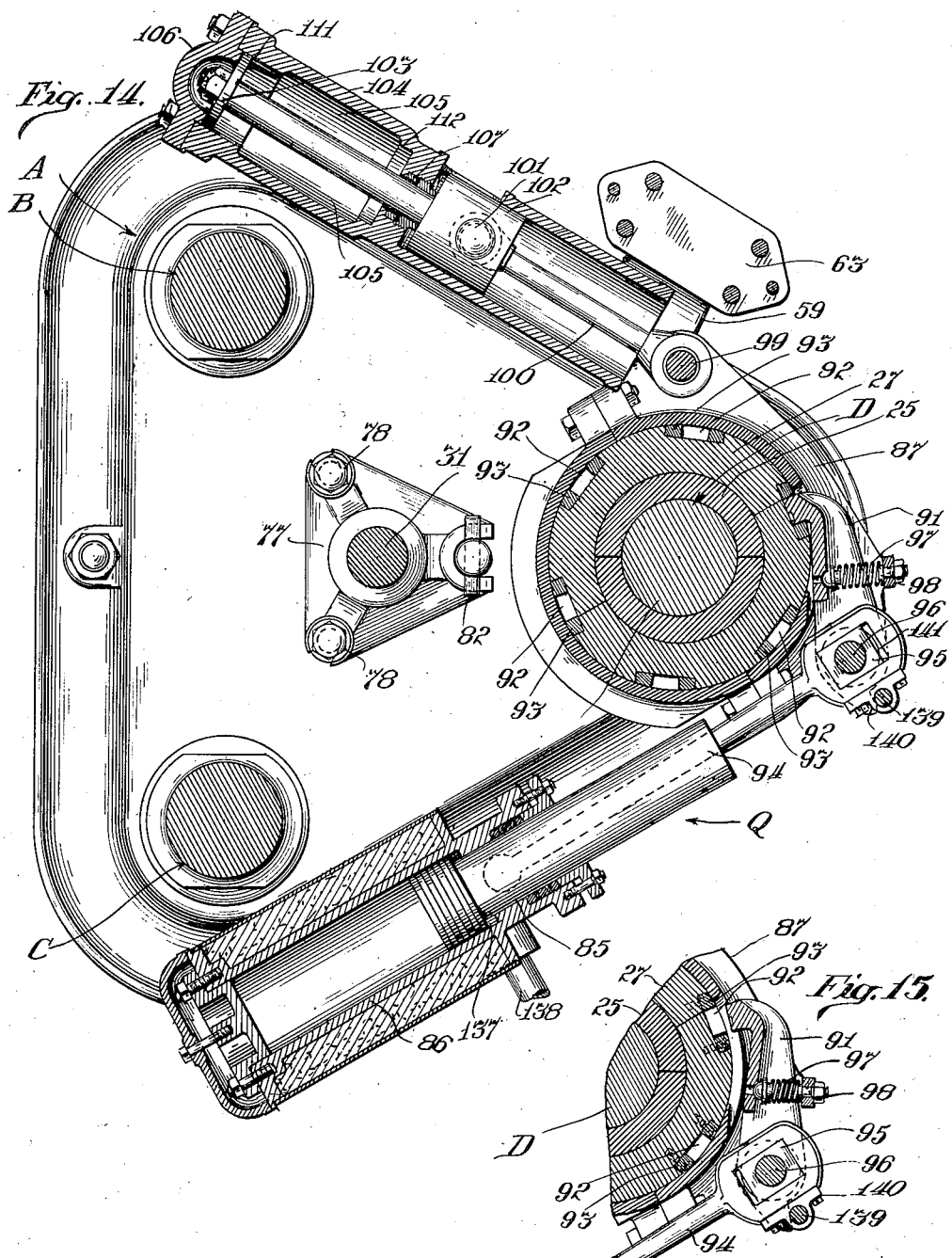

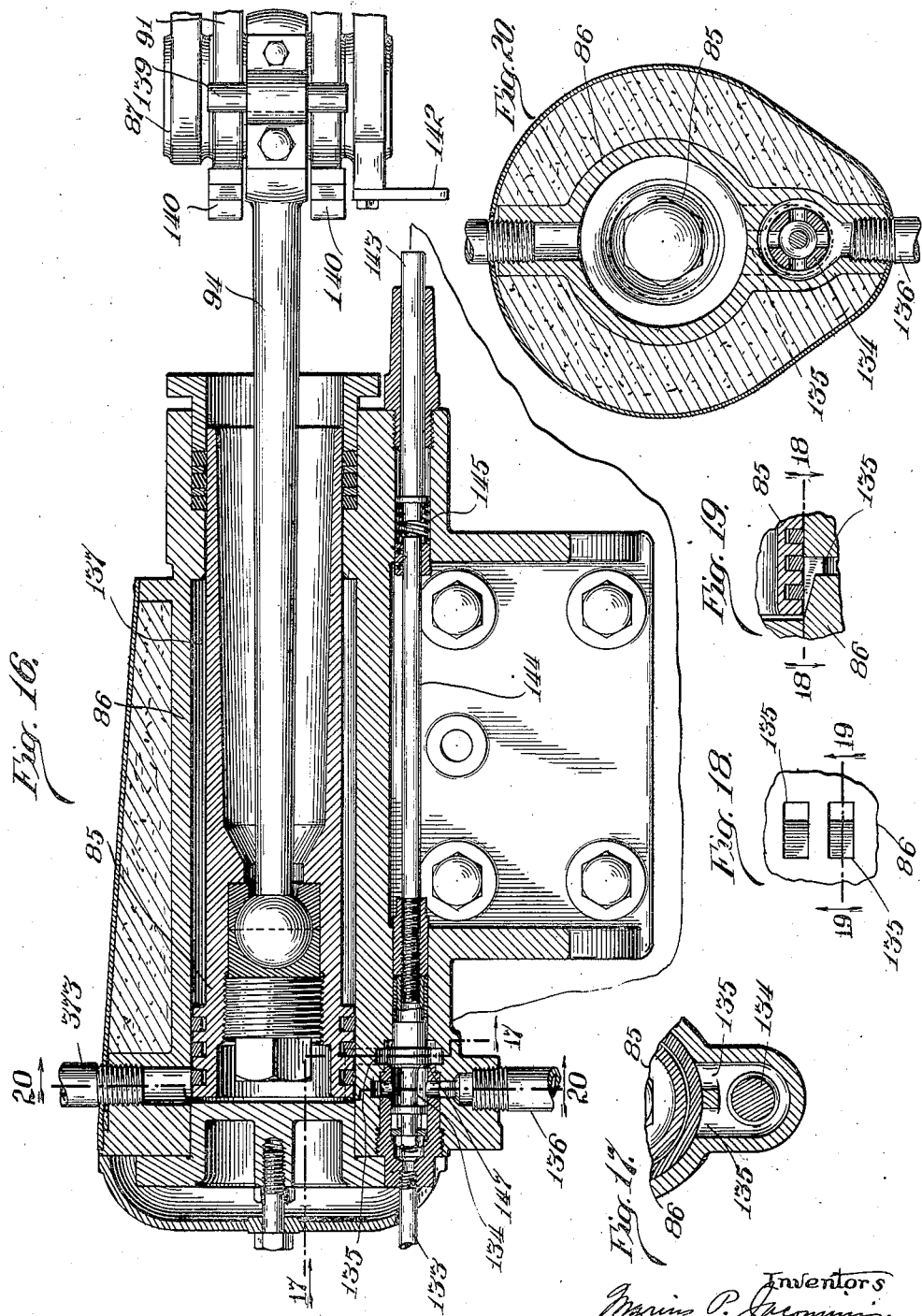

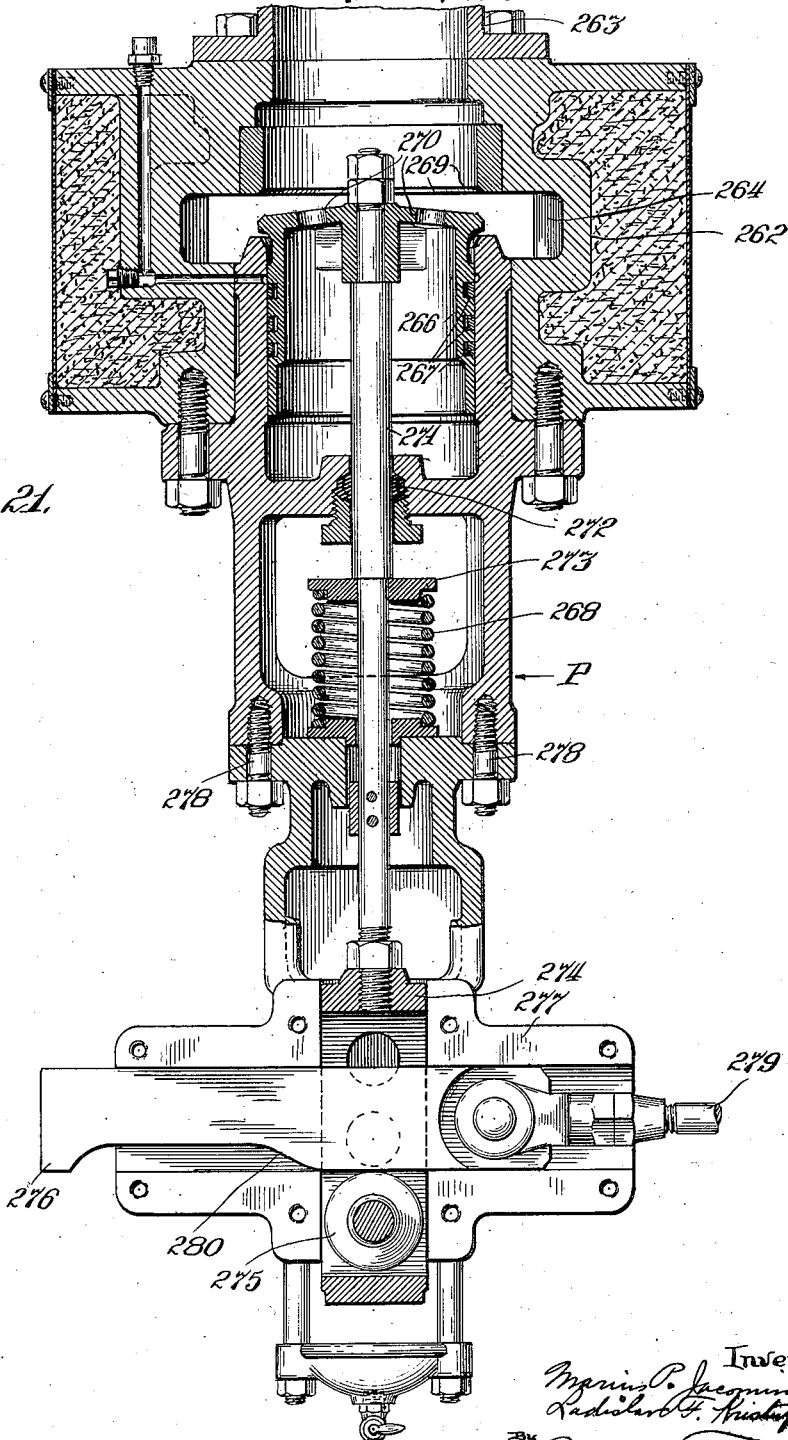

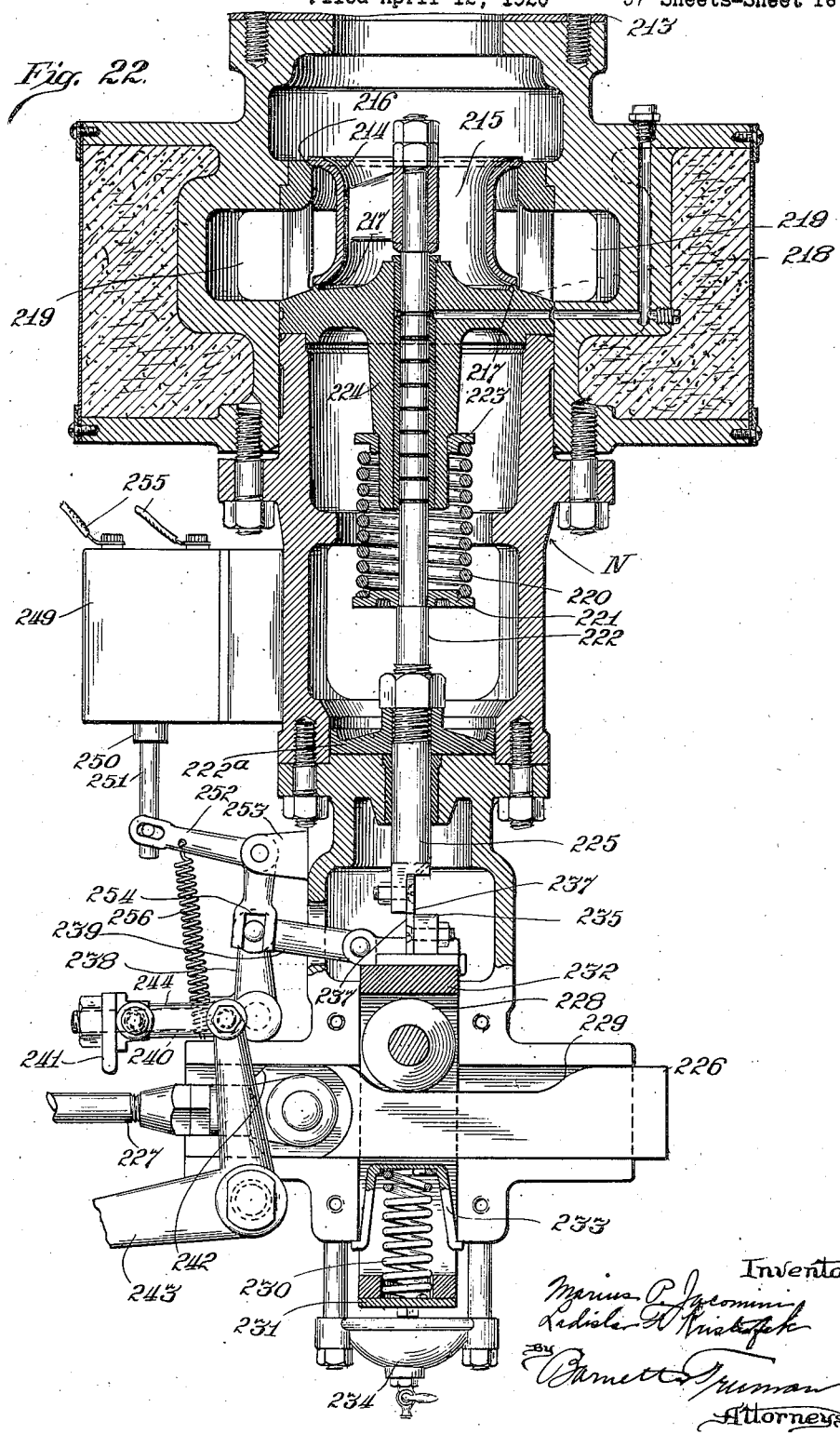

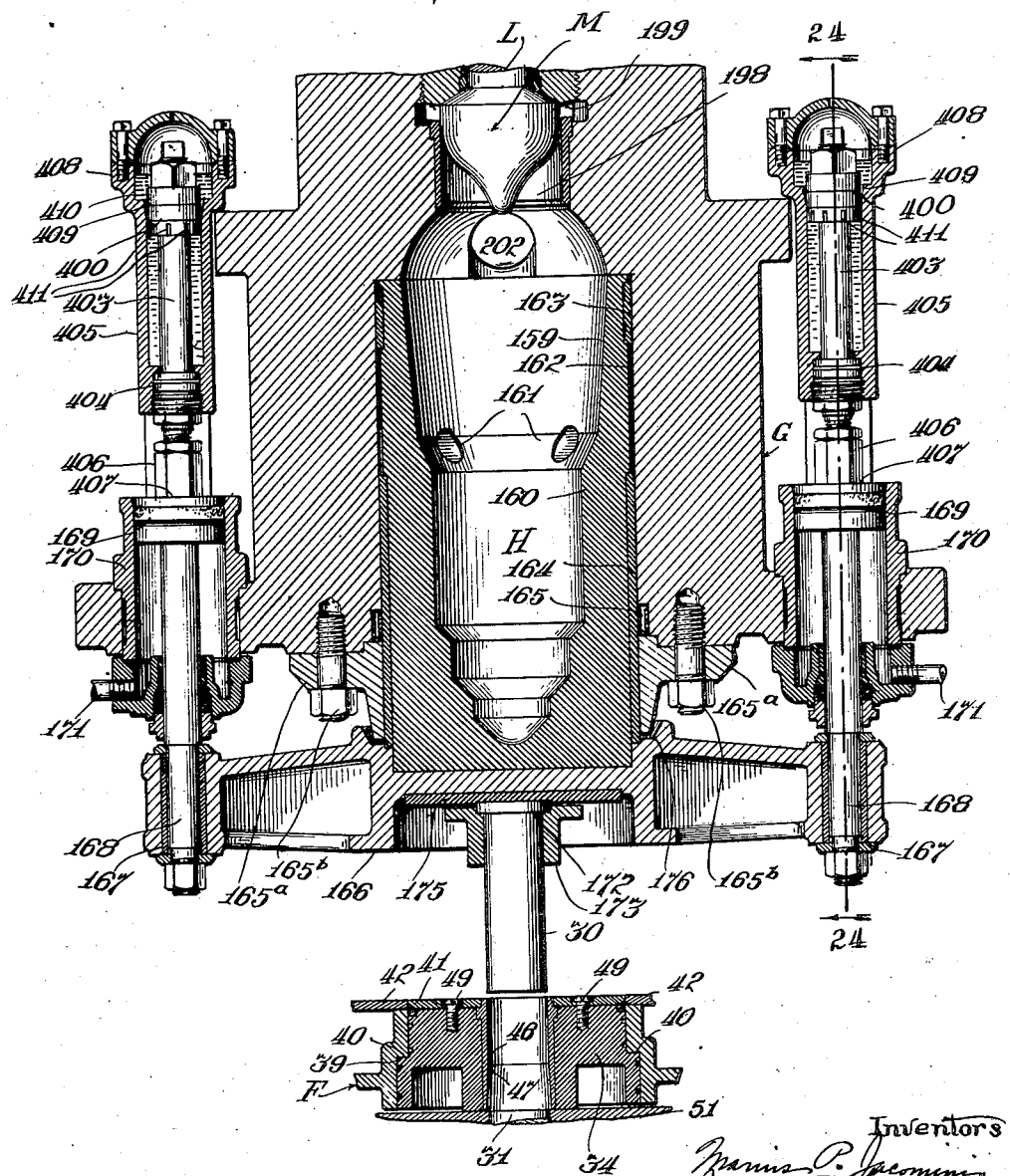

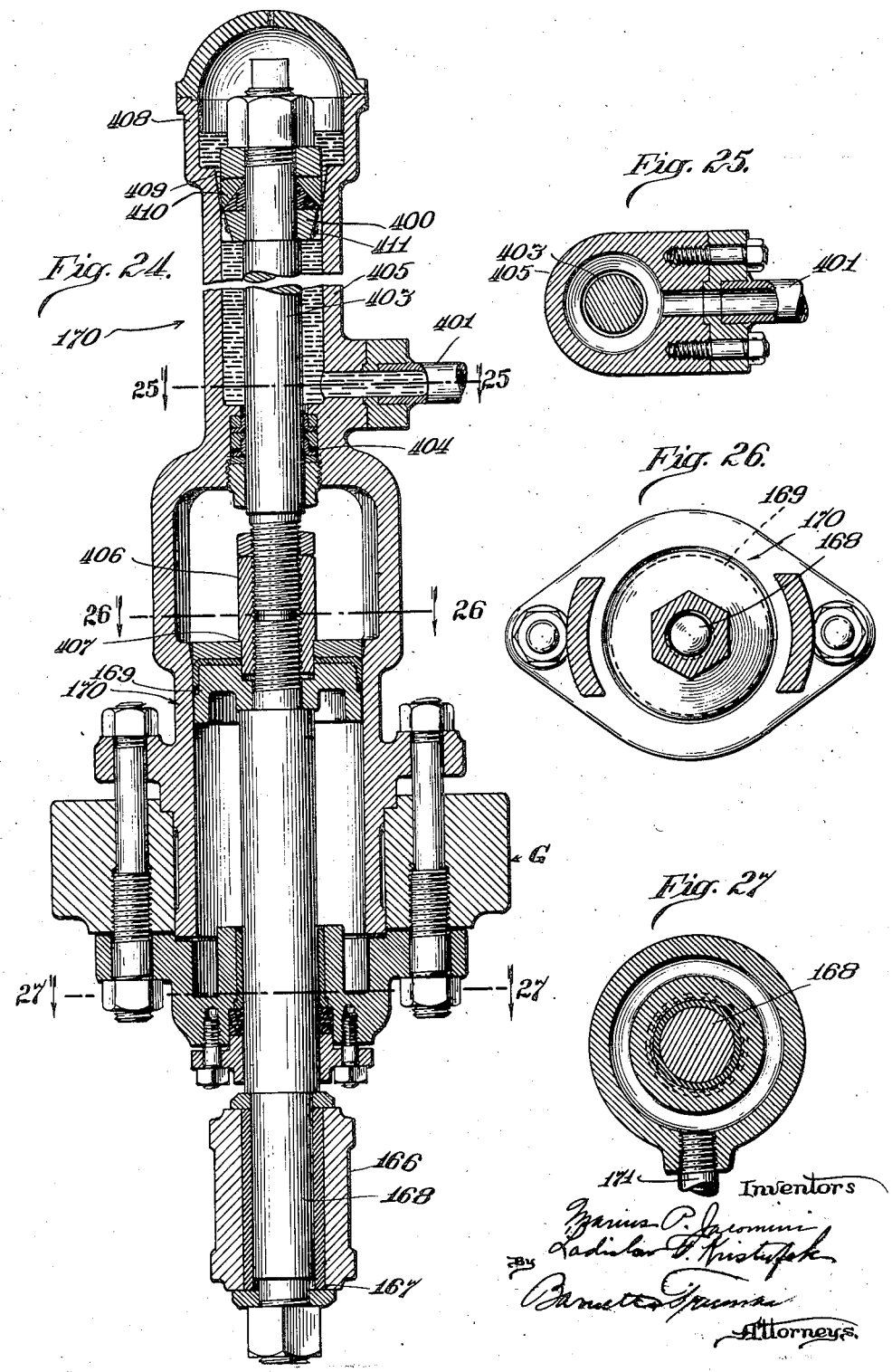

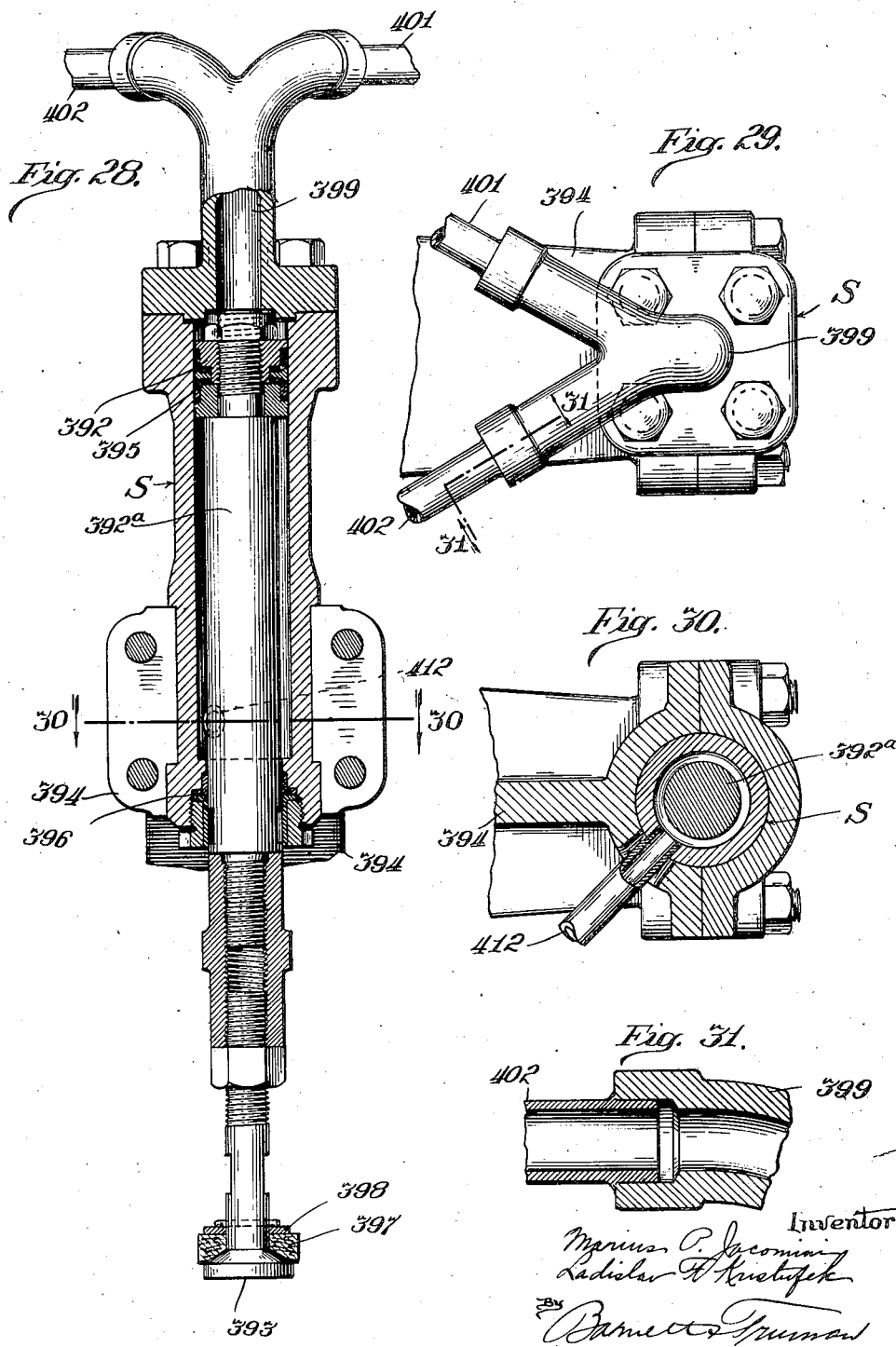

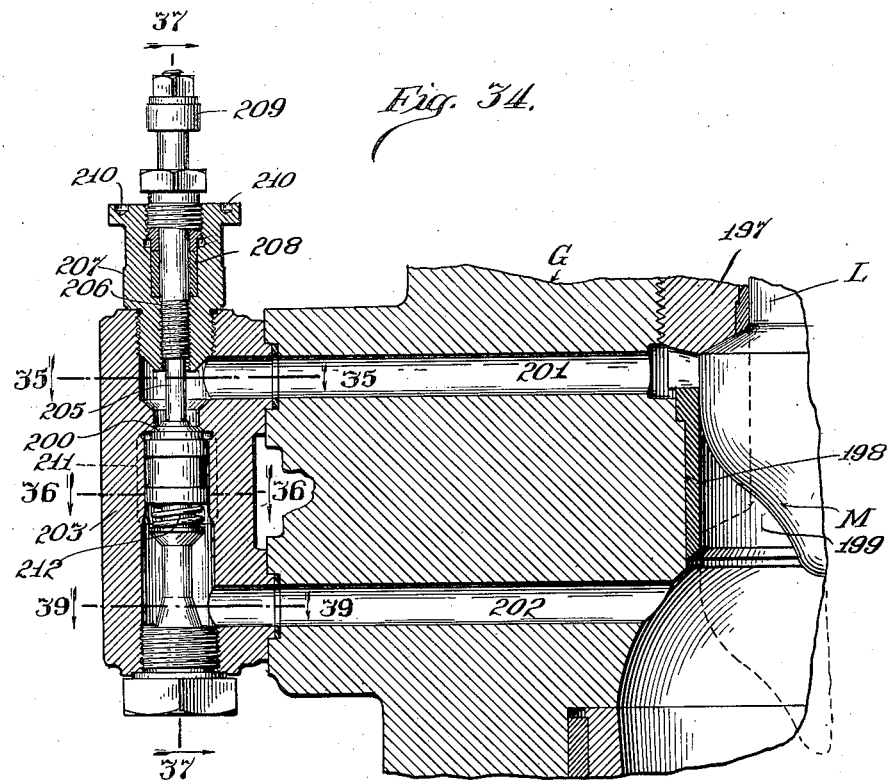
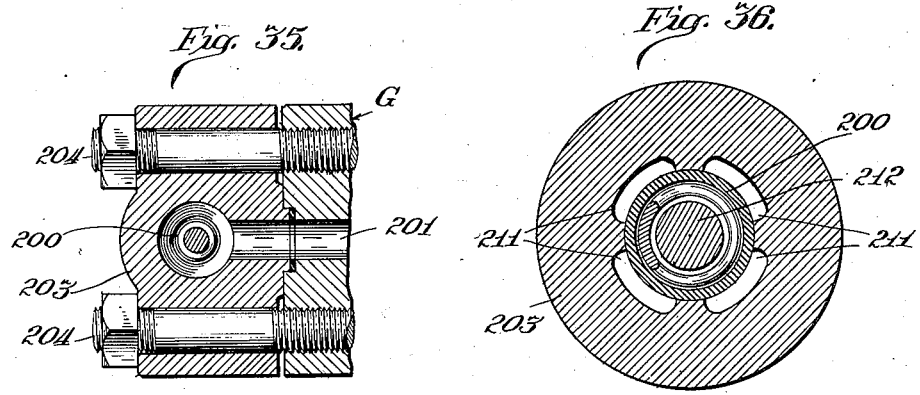

Dec. 16, 1924. 1,519,455
M. P. JACOMINI ET AL
BRIQUETTING MACHINE
Filed April 12, 1920 37 Sheets-Sheet 22
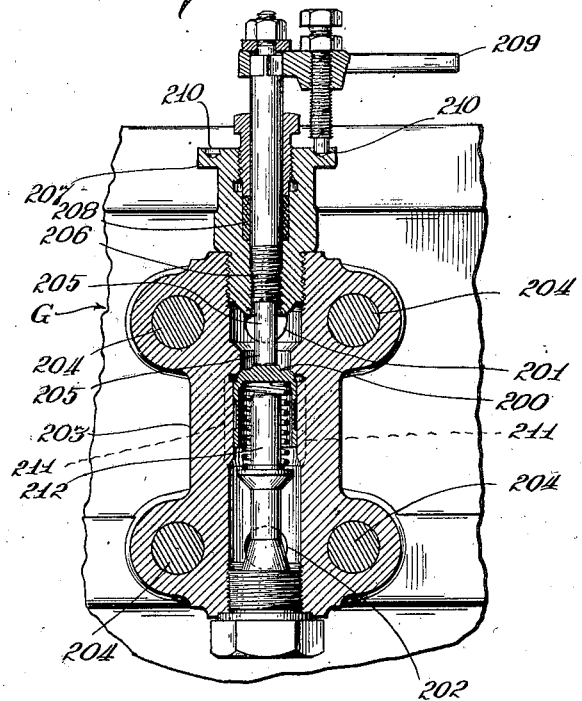
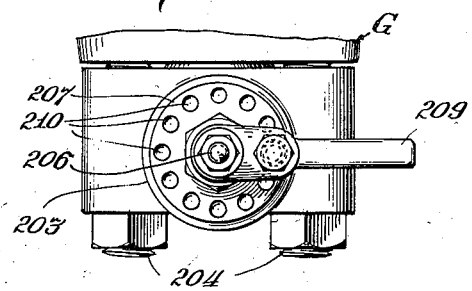
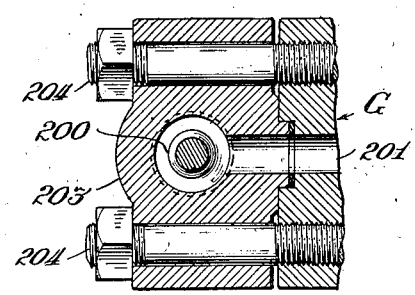

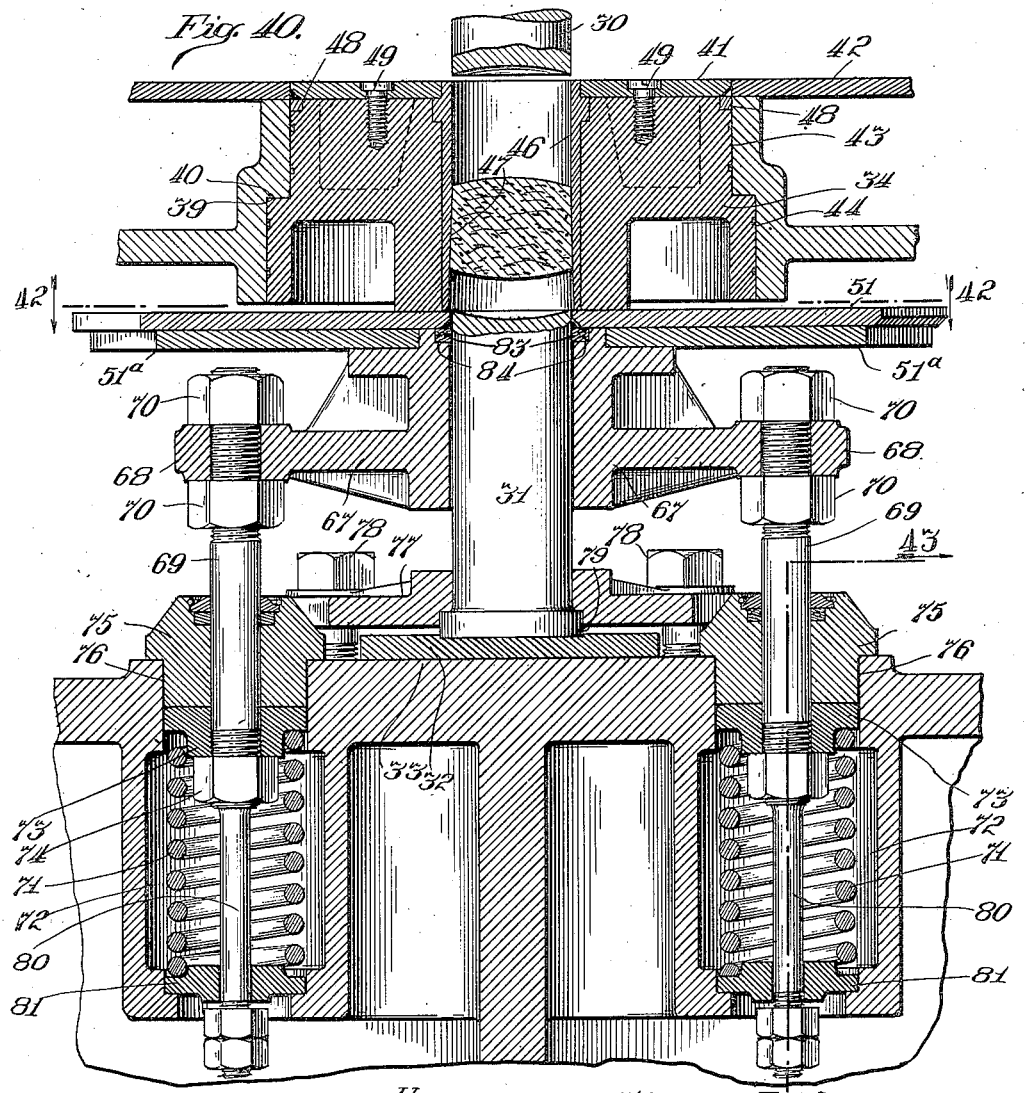
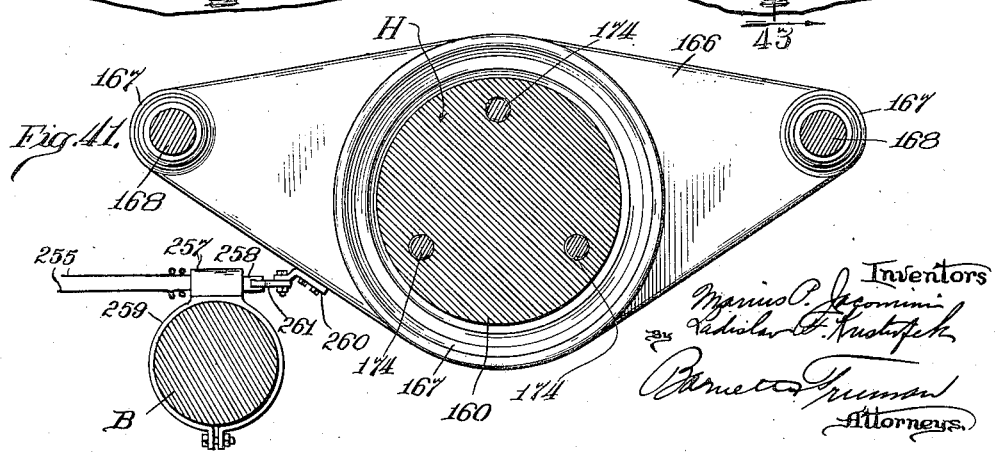

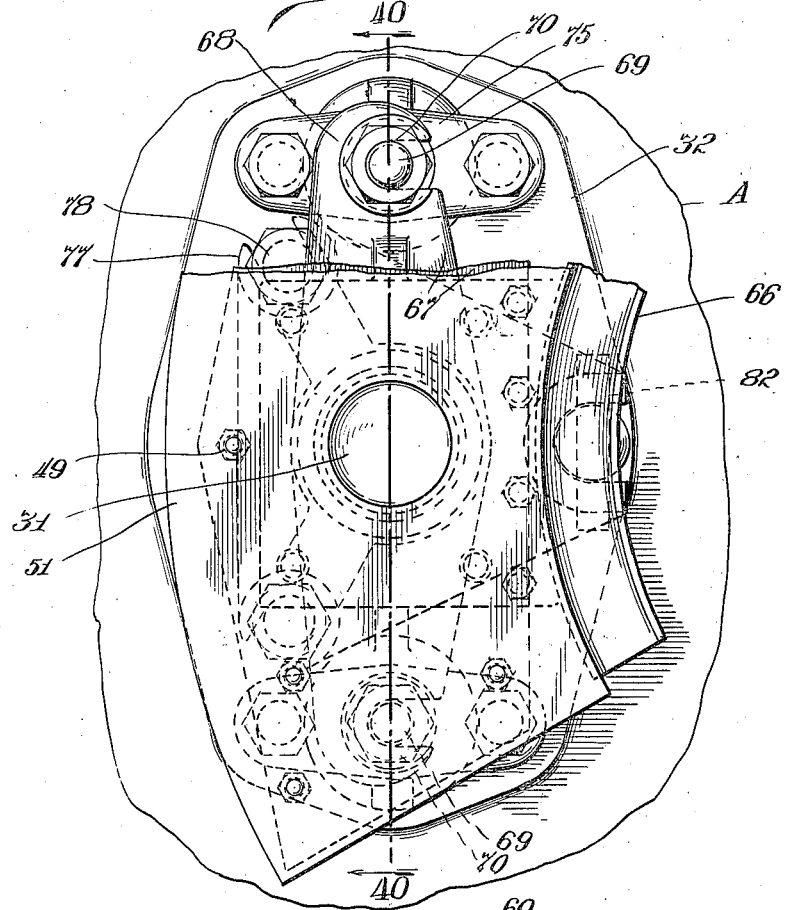

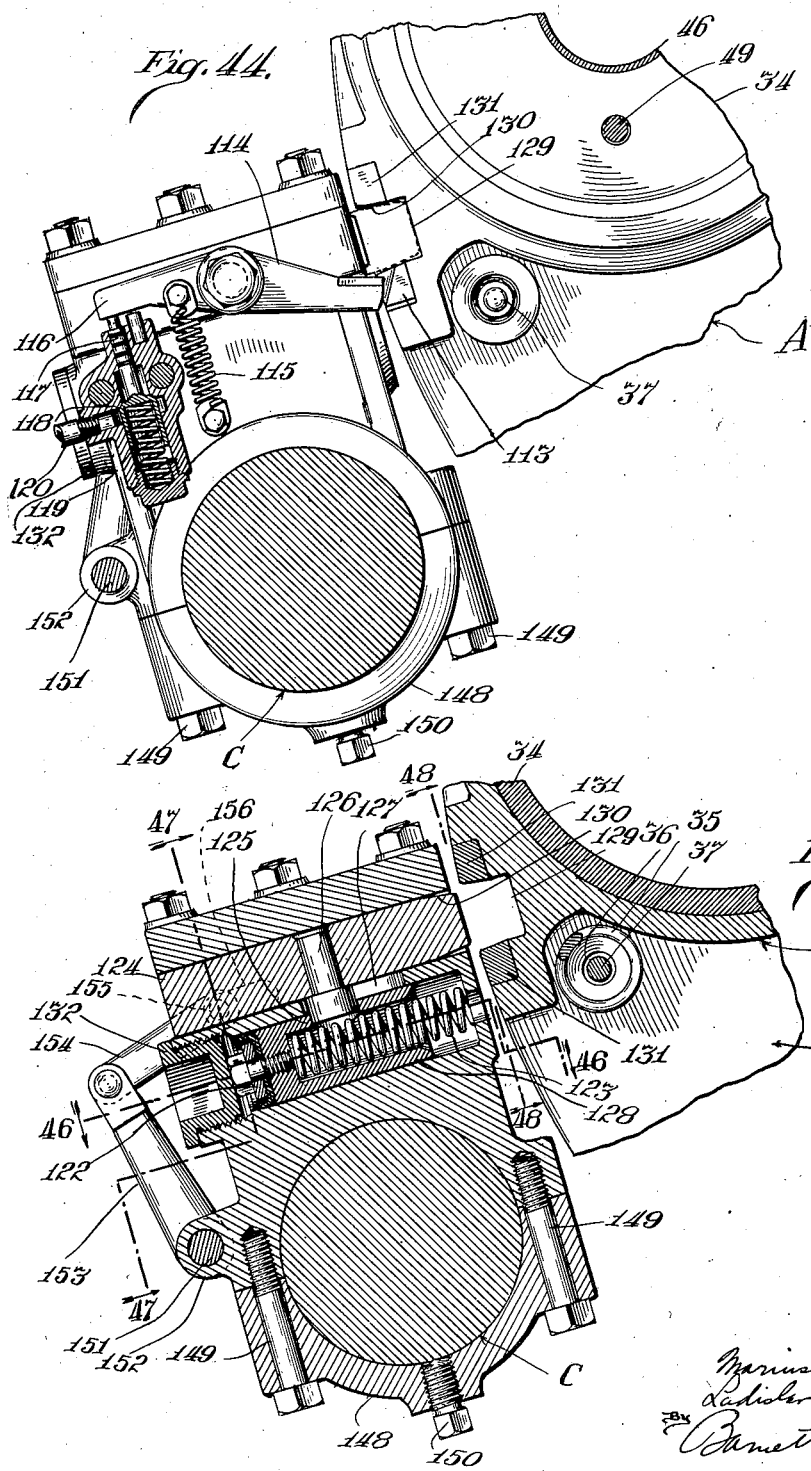

Dec. 16, 1924.

M. P. JACOMINI ET AL

BRIQUETTING MACHINE

Filed April 12, 1920 — 37 Sheets-Sheet 26

1,519,455

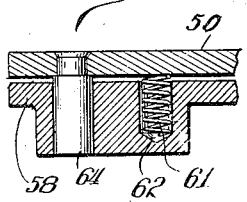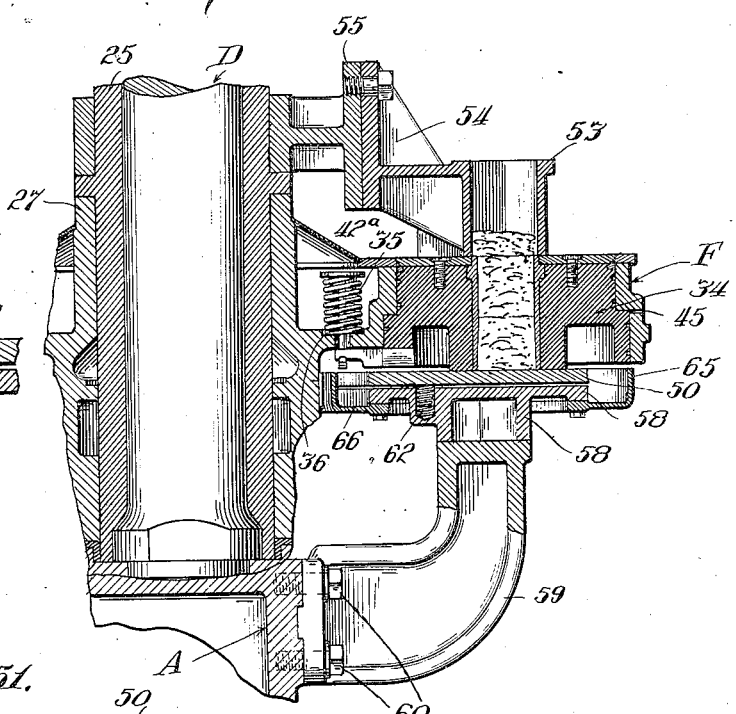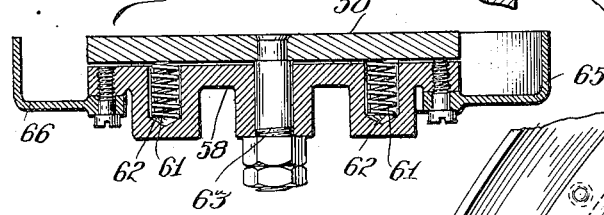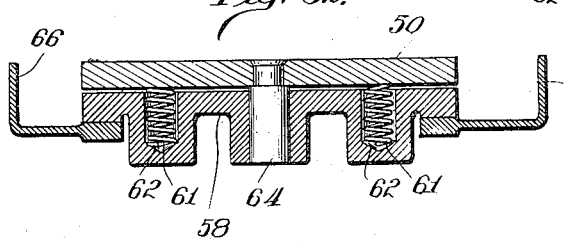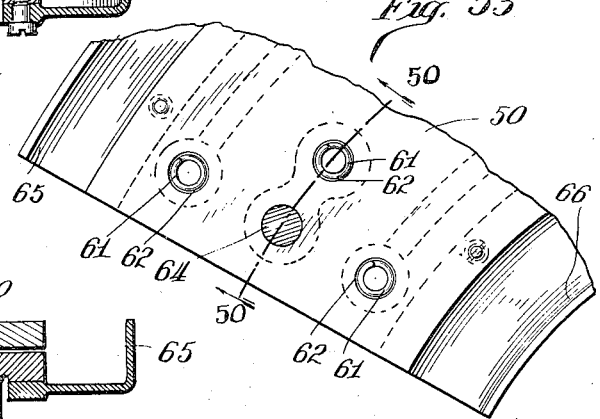

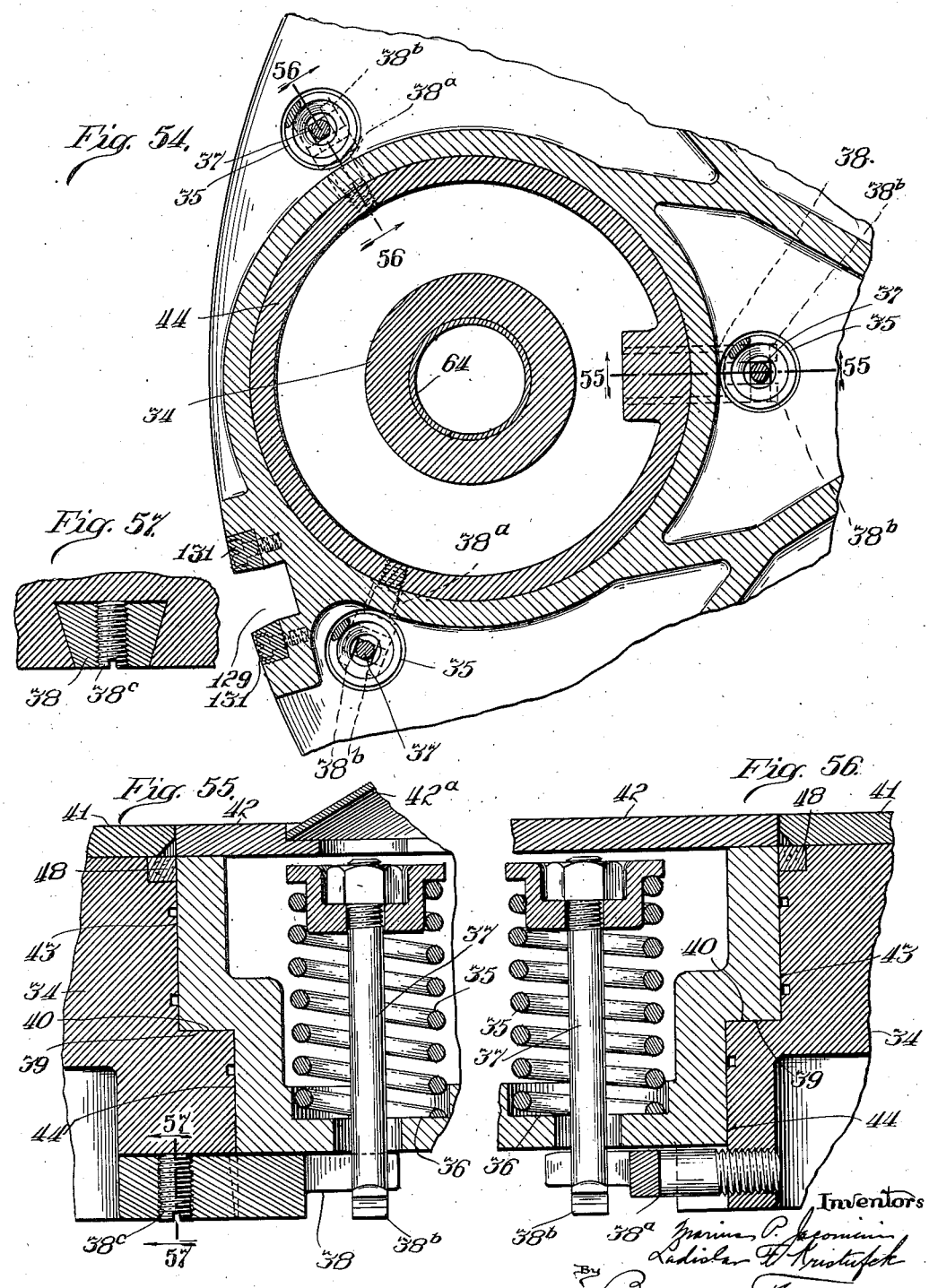

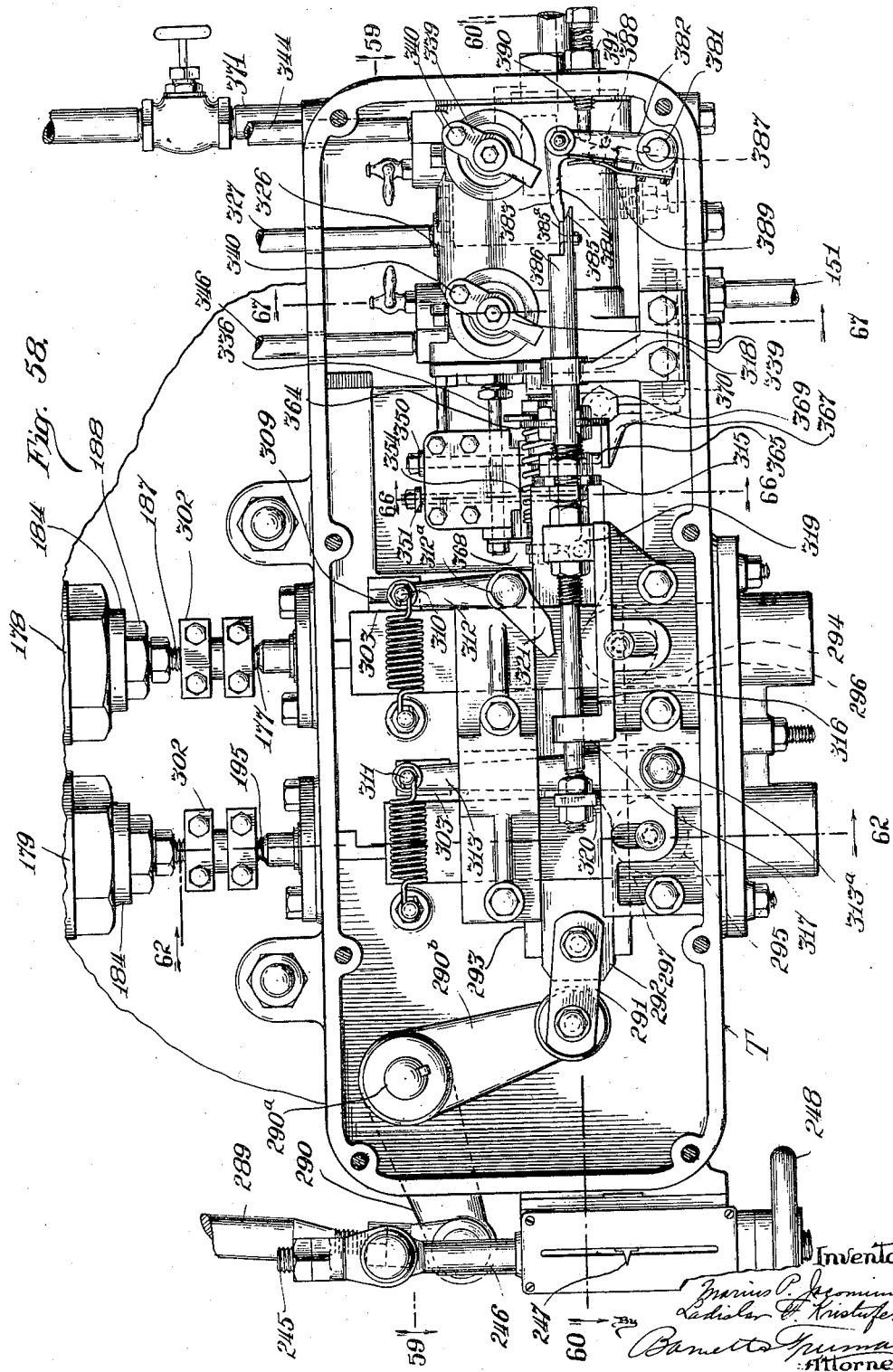

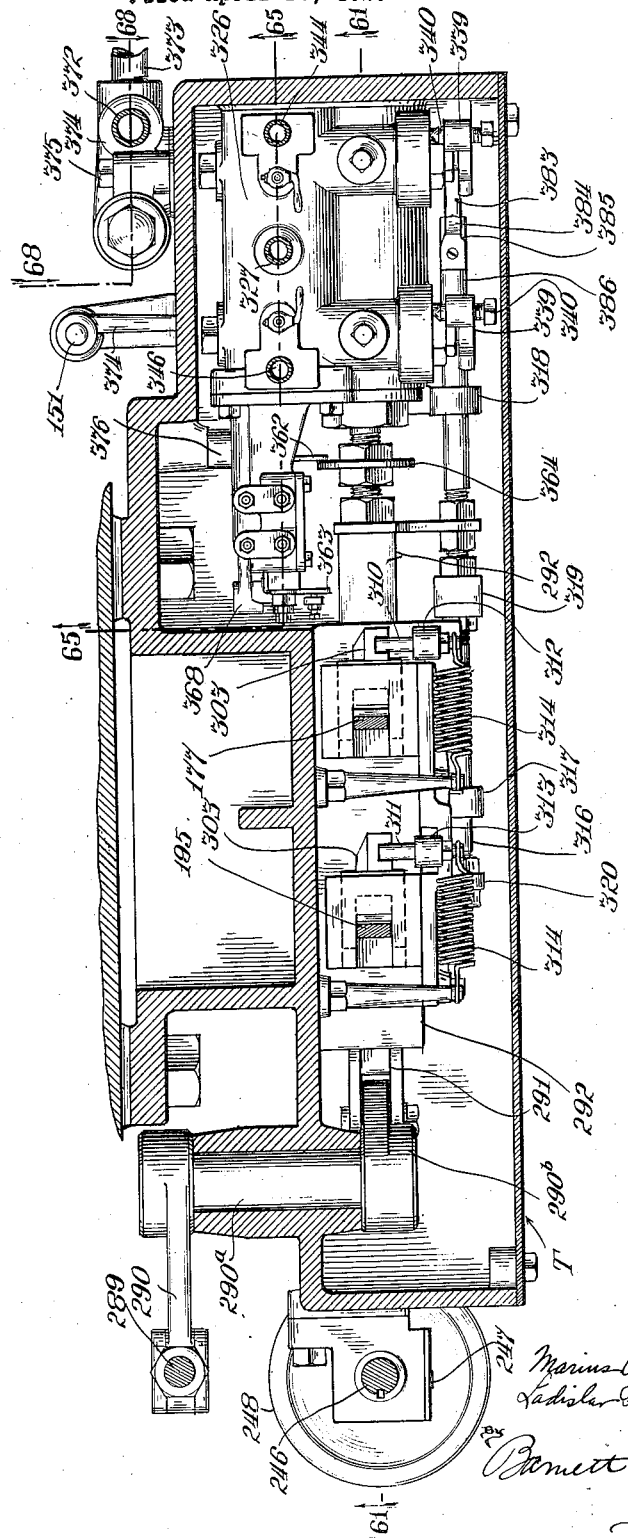

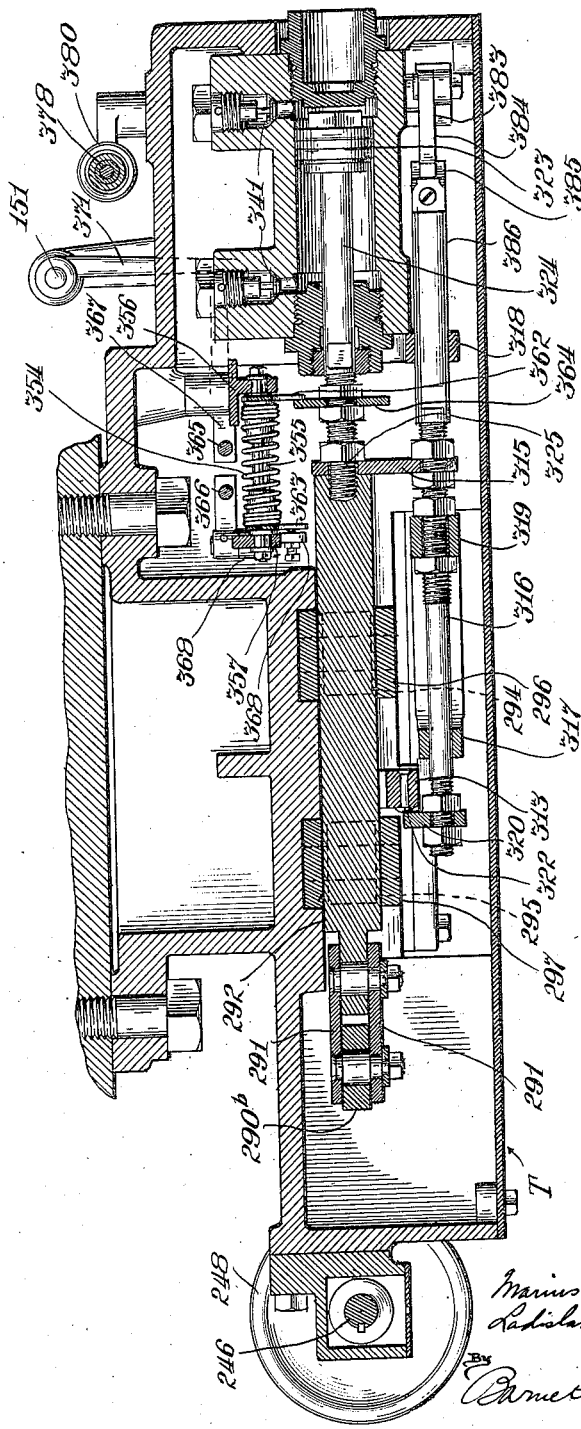

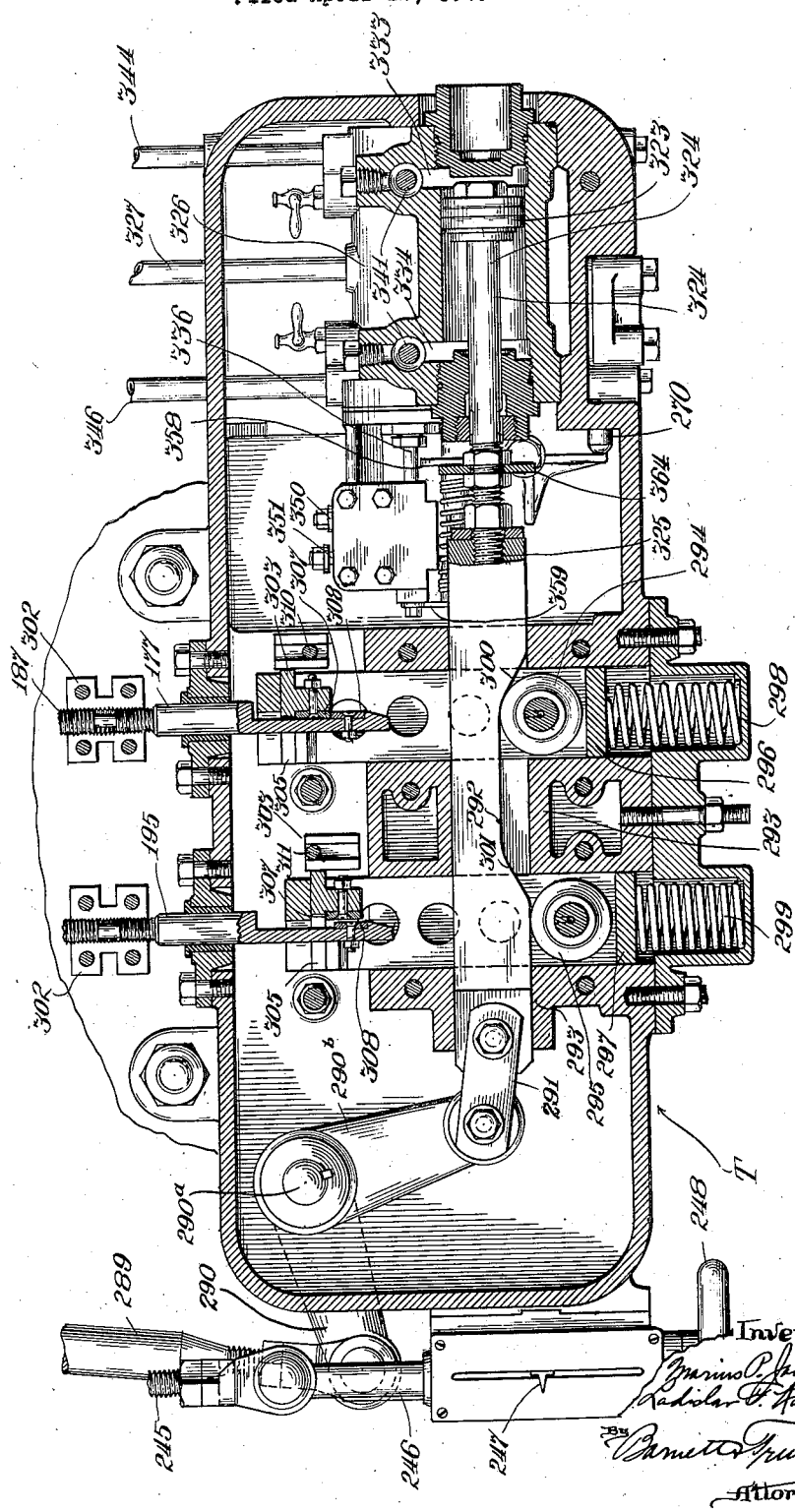

Dec. 16, 1924.
M. P. JACOMINI ET AL
BRIQUETTING MACHINE
Filed April 12, 1920  37 Sheets-Sheet 33
1,519,455
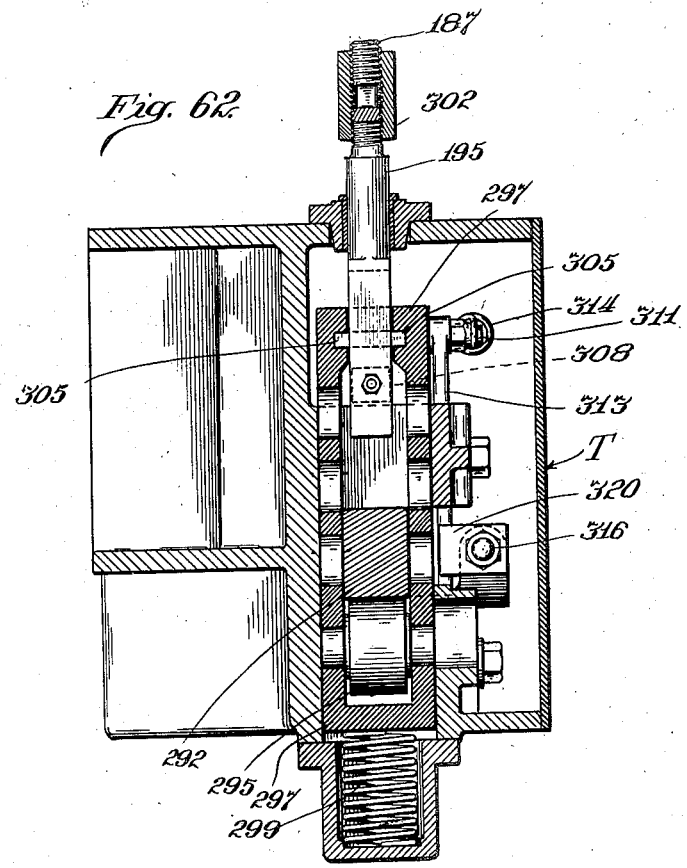
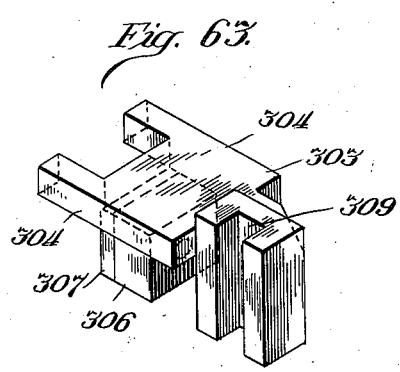
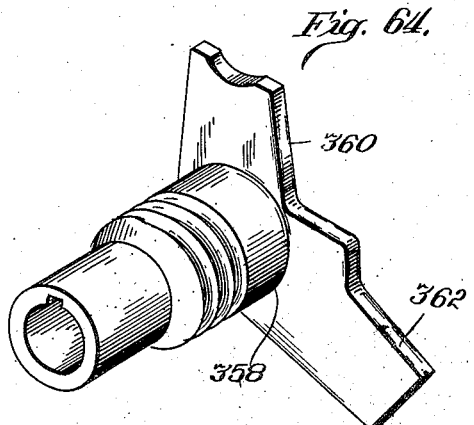
Inventors

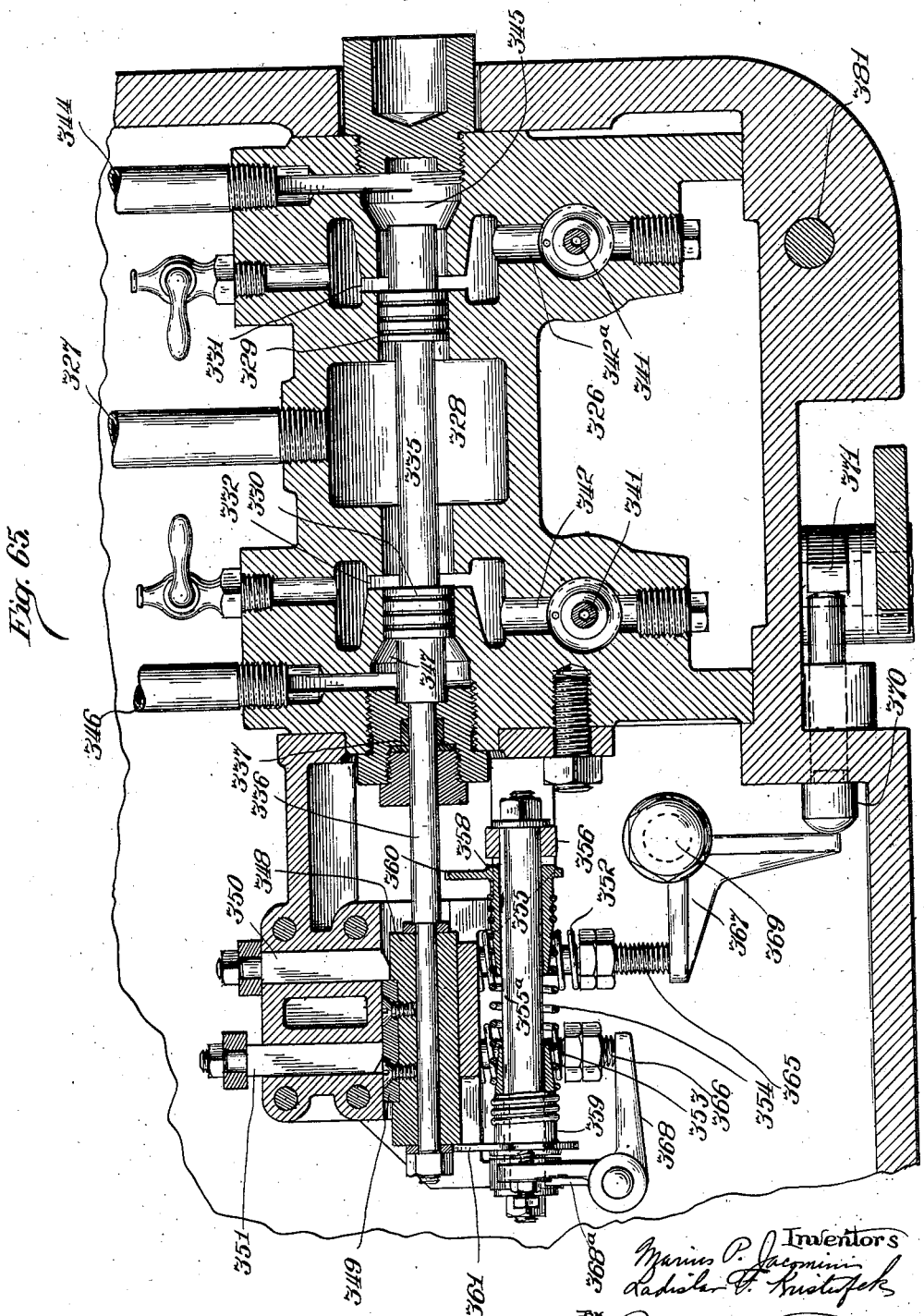

Dec. 16, 1924. 1,519,455
M. P. JACOMINI ET AL
BRIQUETTING MACHINE
Filed April 12, 1920 37 Sheets-Sheet 35

Dec. 16, 1924.

M. P. JACOMINI ET AL

BRIQUETTING MACHINE

Filed April 12, 1920    37 Sheets-Sheet 36

1,519,455

Inventors
Marius P. Jacomini
Ladislav F. Nielufek
By Barnett & Truman
Attorneys.

Patented Dec. 16, 1924.

1,519,455

UNITED STATES PATENT OFFICE.

MARIUS P. JACOMINI AND LADISLAV F. KRISTUFEK, OF CINCINNATI, OHIO.

BRIQUETTING MACHINE.

Application filed April 12, 1920. Serial No. 373,287.

*To all whom it may concern:*

Be it known that we, MARIUS P. JACOMINI and LADISLAV F. KRISTUFEK, citizens of the United States, residing at Cincinnati, in the county of Hamilton and State of Ohio, have invented certain new and useful Improvements in Briquetting Machines, of which the following is a specification.

This invention relates to improvements in apparatus or presses for exerting pressure or applying impacts to an article or material for the purpose of forging, molding, compressing, briquetting or otherwise treating said article or material, and to a method of compressing said article or material.

It has for one object to provide a practical press of this character in which the operations are automatic and continuous.

Another object is to provide a die carrying structure in which the dies, containing the material during compression, substantially "float" instead of being immovable, for the reasons to be hereinafter set forth.

Another object is to provide mechanism for so actuating a work carrying structure as to place each piece of work in operative relation with the operating mechanism of a machine in rapid succession, reducing as much as possible the interval of time between the completion of one operation and the beginning of another.

Another object is to provide safety mechanism which interrupts the cycle of operation under certain conditions where a continuance of the operation might result in damage to the machine.

A further object is to provide mechanism, capable of adjustment, for timing the operations of the machine.

A still further object is to provide an improved valve, as part of the hydraulic system, which cushions itself on seating so as to lessen noise and wear.

The invention is conveniently illustrated as applied to a briquetting press having a movable die carrying structure bearing a plurality of dies, mechanism for successively bringing each die into operative relation with the compressing means, and means for coordinating the operations of the die carrying structure and the compressing means so as to provide for automatic and continuous production of briquets. The compressing mechanism herein disclosed for the purpose of illustrating the invention comprises in general an element driven by an expansible fluid and a liquid medium for transmitting the energy of the driven element to the element operating on the material, and of means for momentarily increasing the capacity of the space containing the liquid so as to permit the driven element to absorb additional energy which is later transmitted to the material through the body of liquid.

The invention, in its broader phases, is not, however, confined to such embodiment as will be evident from the specification and claims, but relates also to automatic machines independently of the character of the operation performed on the article or material.

The invention consists in the novel constructions, arrangements and devices to be hereinafter described for carrying out the above stated objects and such other objects as will appear from the following specification.

The invention is illustrated in the accompanying drawings, wherein—

Fig. 1 is a front elevation of the machine considering the side having the timing box as being the front of the machine.

Fig. 2 is a similar elevation of the left hand side of the machine as shown in Fig. 1.

Fig. 3 is a similar elevation of the right hand side of the machine shown in Fig. 1.

Fig. 4 is a vertical section, taken on line 4—4 of Fig. 1, of the power cylinder.

Fig. 5 is a vertical section taken on line 5—5 of Fig. 1 which corresponds to the same section as that on which Fig. 4 was taken, and which shows the central section through the hydraulic ram.

Fig. 6 is a vertical section of the lower portion of the machine taken on line 6—6 of Fig. 1 which corresponds to the same plan as that on which Fig. 4 was taken.

Fig. 7 is a horizontal section through the steam chest for the power cylinder taken on line 7—7 of Fig. 2.

Fig. 8 is a horizontal section through the machine taken on the line 8—8 of Fig. 3, showing the power cylinder valve actuating mechanism in section.

Fig. 9 is a horizontal section on the line 9—9 of Fig. 3, showing a cross section of the hydraulic cylinder, ram and the supporting posts.

Fig. 10 is a horizontal section taken on line 10—10 of Fig. 3, showing a plan view of the die table and hopper.

Fig. 11 is a similar plan section taken on line 11—11 of Fig. 3, showing the die table supporting structure.

Fig. 12 is a sectional plan view on line 12—12 of Fig. 3, showing a cross section through the die table steam cylinder and oil brake.

Figure 46:
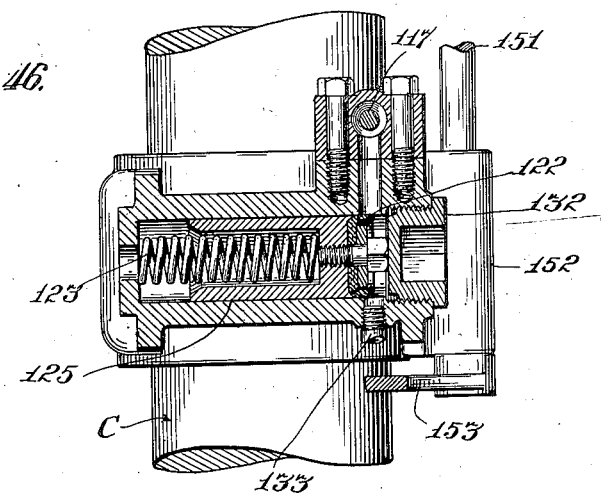

Fig. 12ª is a cross section of the oil brake cylinder taken on the line 12ª—12ª of Fig. 12.

Fig. 13 is a vertical section taken through the end of the die table steam cylinder, along the line 13—13 of Fig. 12.

Fig. 14 is a section similar to Fig. 12 showing the table piston at the end of its stroke.

Fig. 15 is a fragment of a section similar to Fig. 14 showing the pawl raised from engagement with the die table.

Fig. 16 is a vertical section taken along the line 16—16 of Fig. 12 showing details of the table cylinder and exhaust valve for the same.

Fig. 17 is a detail section through the table cylinder exhaust valve taken on the line 17—17 of Fig. 16.

Fig. 18 is a plan view of the exhaust ports of the table cylinder taken on line 18—18 of Fig. 19.

Fig. 19 is a fragmentary section taken through an exhaust port on line 19—19 of Fig. 18.

Fig. 20 is a transverse section of the head end of the table cylinder, showing the exhaust valve taken on line 20—20 of Fig. 16.

Fig. 21 is a vertical section taken on line 21—21 of Fig. 2, showing the exhaust valve and valve operating mechanism.

Fig. 22 is a vertical section through the inlet valve and valve mechanism of the power cylinder taken on line 22—22 of Fig. 2.

Fig. 23 is an enlarged vertical section through the hydraulic cylinder and ram taken on line 23—23 of Fig. 3.

Fig. 24 is an enlarged vertical section showing one of the ram return cylinders, taken on line 24—24 of Fig. 23.

Fig. 25 is a section through one of the oil pump cylinders for actuating the briquet discharging plunger, taken on line 25—25 of Fig. 24.

Fig. 26 is a horizontal detail section taken on line 26—26 of Fig. 24.

Fig. 27 is a section through the lower portion of the return cylinder taken on line 27—27 of Fig. 24.

Fig. 28 is an enlarged vertical section taken on line 28—28 of Fig. 2 of the briquet discharge or "knock out" cylinder.

Fig. 29 is a plan view of the discharge cylinder showing the oil pipe lines leading thereto.

Fig. 30 is a section taken on line 30—30 of Fig. 28.

Fig. 31 is a fragmentary section taken on line 31—31 of Fig. 29.

Fig. 32 is a vertical section taken on line 32—32 of Fig. 3, showing the inlet and discharge oil valves for the hydraulic cylinder.

Fig. 33 is a section taken on line 33—33 of Fig. 32, showing the ports.

Fig. 34 is a section taken on line 34—34 of Fig. 3, showing the by-pass valve for permitting the escape of oil from the chamber behind the steam plunger on its return stroke.

Fig. 35 is a detail section taken on line 35—35 of Fig. 34.

Fig. 36 is a similar section taken on line 36—36 of Fig. 34.

Fig. 37 is a vertical section of the check valve taken on line 37—37 of Fig. 34.

Fig. 38 is a plan view of the valve shown in Fig. 37, showing the regulating handle.

Fig. 39 is a transverse section taken on line 39—39 of Fig. 34.

Fig. 40 is an enlarged vertical section taken through the die and lower die plunger on the line 40—40 of Fig. 42.

Fig. 41 is a section taken on line 41—41 of Fig. 1, showing the cross head on the lower end of the ram and a plan view of the safety switch.

Fig. 42 is a fragmentary plan view taken on line 42—42 of Fig. 40, showing the lower die plunger and the portion of the die supporting table below the upper die plunger.

Fig. 43 is a sectional view through one of the segment cushion springs, taken on line 43—43 of Fig. 40.

Fig. 44 is a fragmentary horizontal section taken on line 44—44 of Fig. 1, showing the table key and valve for the table key cylinder.

Fig. 45 is a section taken on line 45—45 of Fig. 1, through the table key and table key cylinder.

Fig. 46 is a vertical section through the table key cylinder taken on line 46—46 of Fig. 45.

Figure 47:
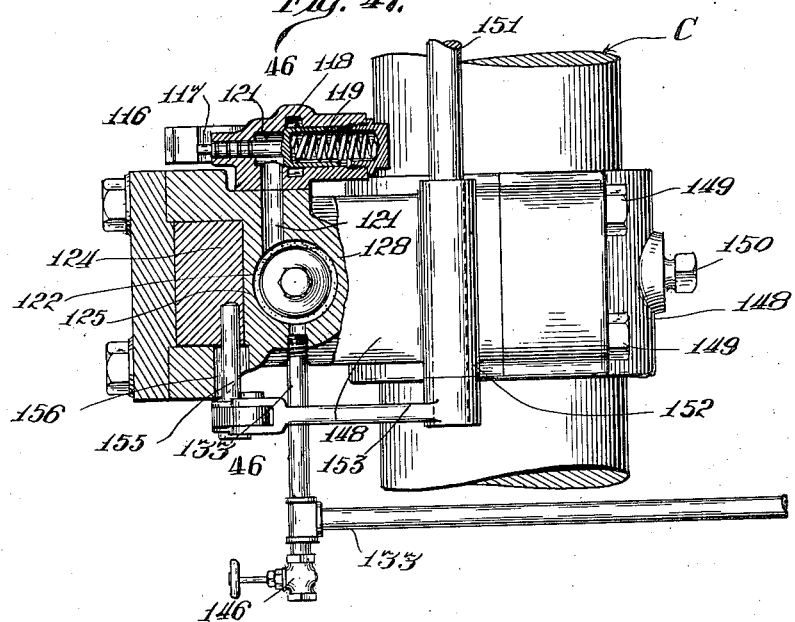

Fig. 47 is a fragmentary vertical section taken on line 47—47 of Fig. 45.

Figure 48:
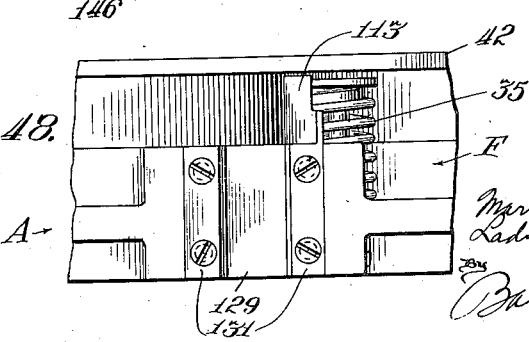

Fig. 48 is a fragmentary elevation taken on line 48—48 of Fig. 45, showing the upper table slots and facing jaws therefor.

Fig. 49 is a section through the die table taken on line 49—49 of Fig. 10.

Fig. 50 is a fragmentary section taken on line 50—50 of Fig. 53.

Fig. 51 is a section through the spring pressed plate under the hopper, taken on line 51—51 of Fig. 11.

Fig. 52 is a similar section taken on line 52—52 of Fig. 11.

Fig. 53 is a plan view of the plate shown in Figs. 51 and 52.

Fig. 54 is a horizontal section through one of the die blocks.

Fig. 55 is a section through one of the die block cushion springs, taken on the line 55—55 of Fig. 54.

Fig. 56 is a similar section through another cushion spring, taken on line 56—56 of Fig. 54.

Fig. 57 is a detail section taken on line 57—57 of Fig. 55, showing the die block guide.

Fig. 58 is an elevational view of the timing box with cover removed, taken from the front of the machine.

Fig. 59 is a horizontal section of the timing box taken on line 59—59 of Fig. 58.

Fig. 60 is a similar horizontal section taken on line 60—60 of Fig. 58.

Fig. 61 is a vertical section through the timing box taken on line 61—61 of Fig. 59.

Fig. 62 is a vertical transverse section through the timing box taken on line 62—62 of Fig. 58.

Fig. 63 is a perspective view of one of the tripping blocks for tripping one of the oil valves.

Fig. 64 is a perspective view of one of the blocks used in the mechanism for actuating the valve of the timing cylinder.

Fig. 65 is a vertical section through the timing cylinder valve taken on line 65—65 of Fig. 59.

Figure 66:
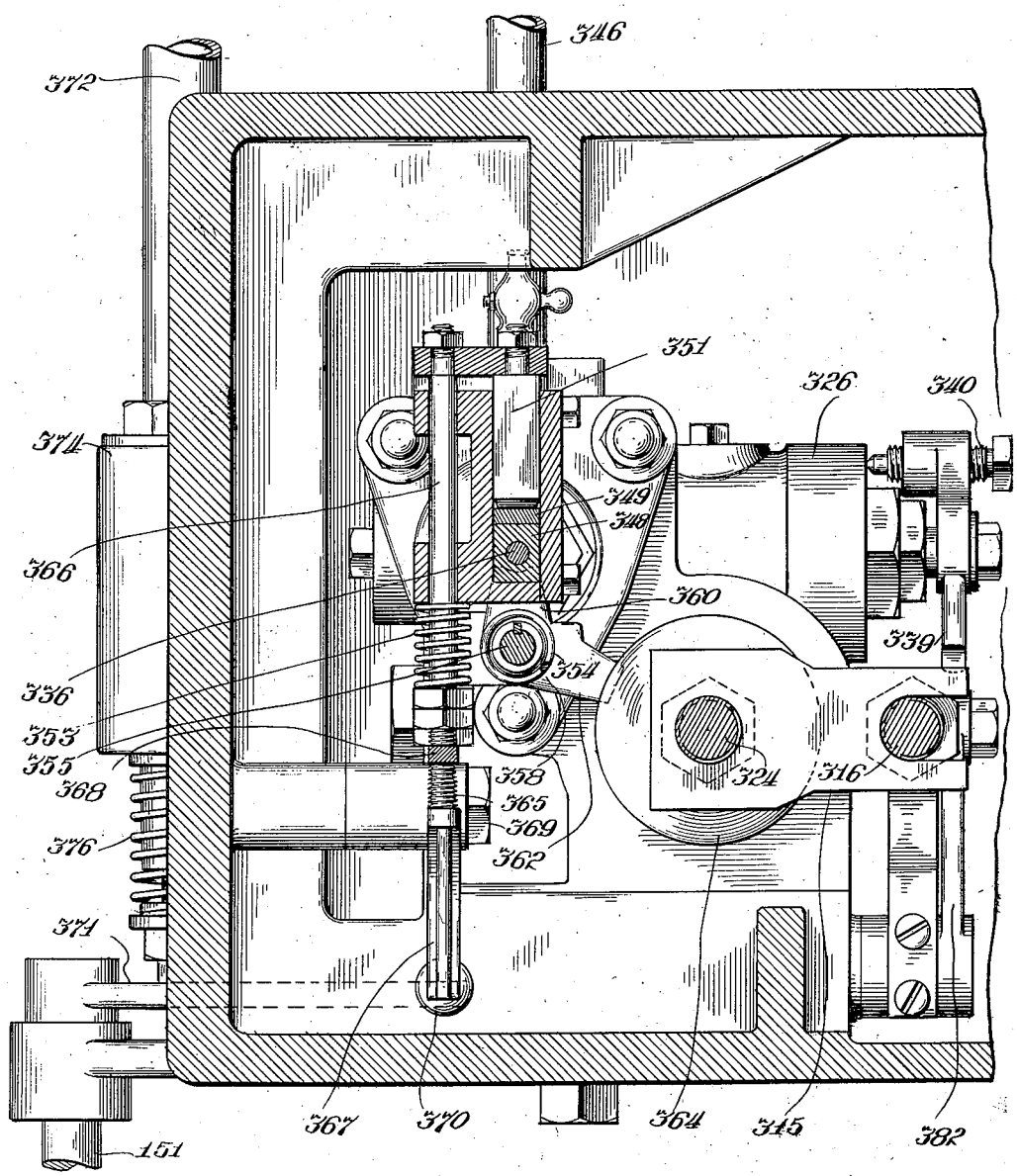

Fig. 66 is a transverse vertical section on line 66—66 of Fig. 58, of the mechanism for actuating the timing cylinder valve.

Figure 67:
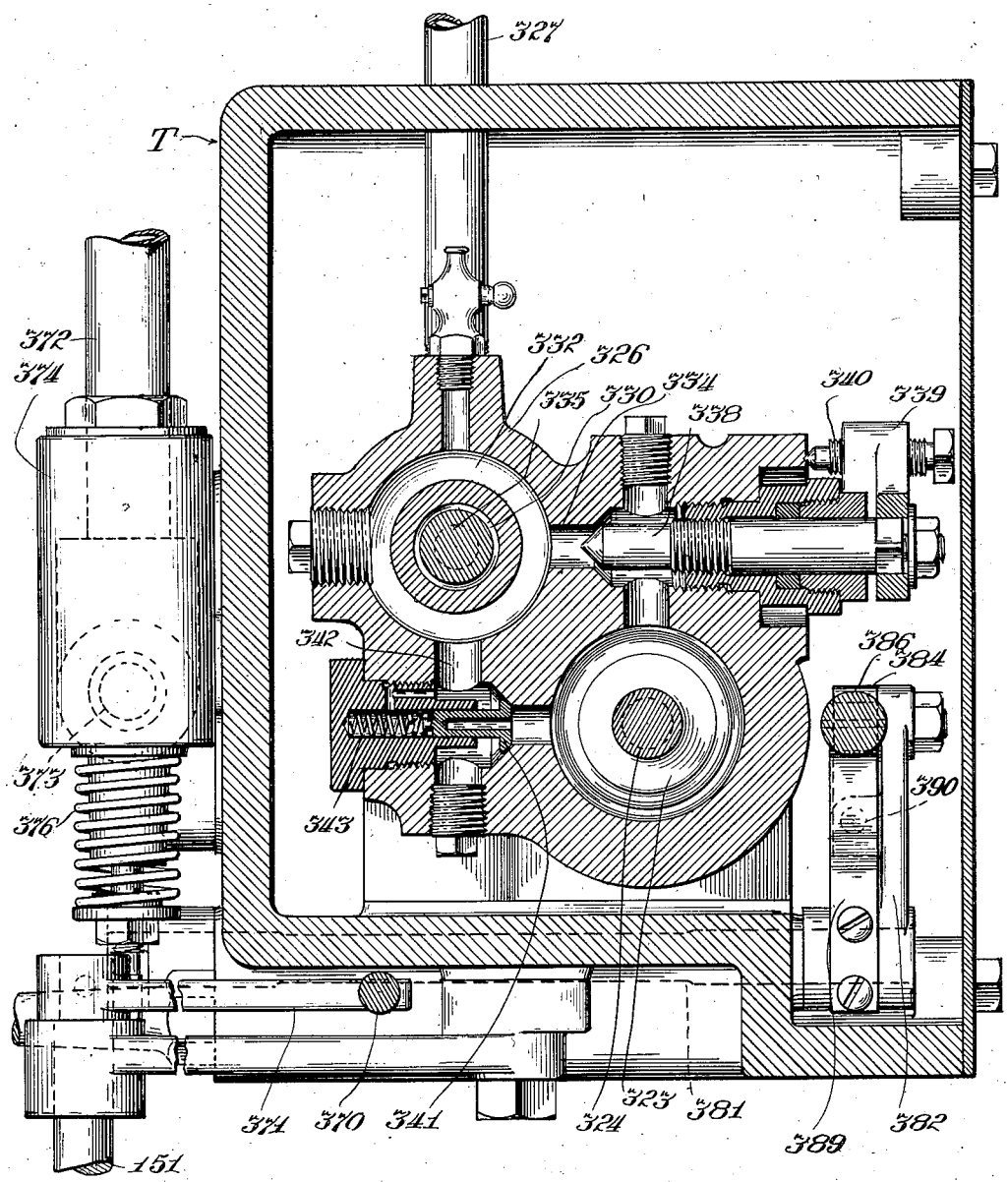

Fig. 67 is a transverse vertical section through the timing cylinder and valve taken on line 67—67 of Fig. 58.

Figure 68:
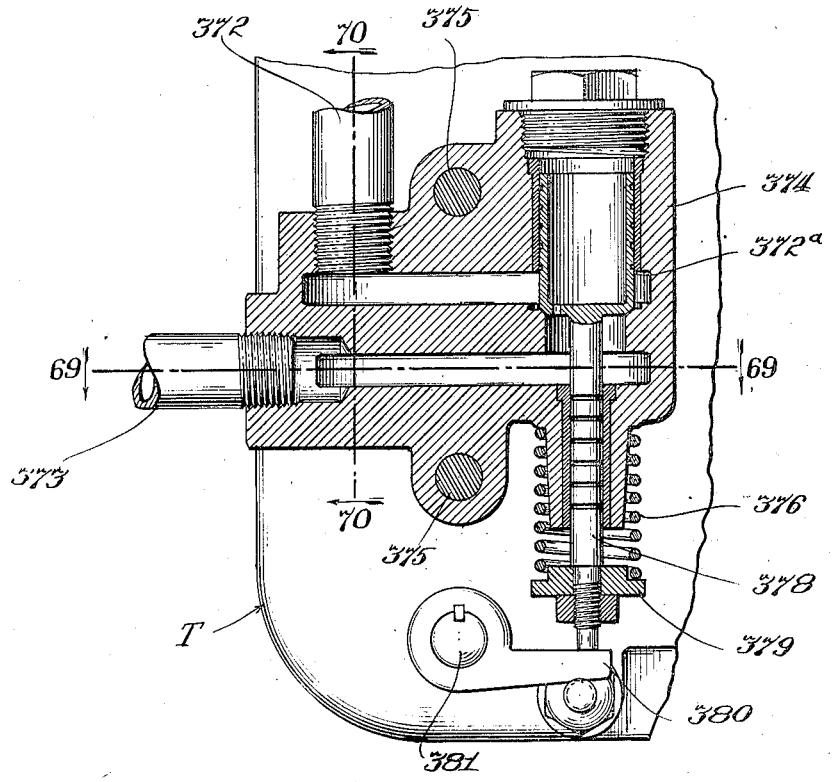

Fig. 68 is a vertical section taken on line 68—68 of Fig. 59, showing the valve for admitting steam to the die table cylinder.

Figure 69:
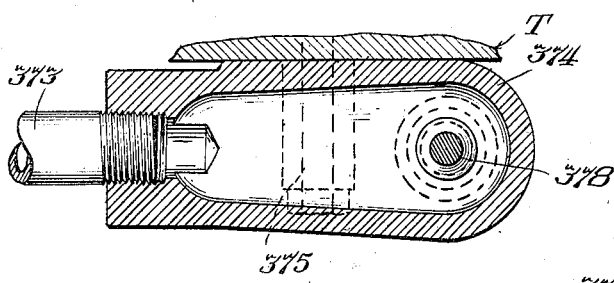

Fig. 69 is a section taken on line 69—69 of Fig. 68, showing the port leading to the die table cylinder.

Figure 70:
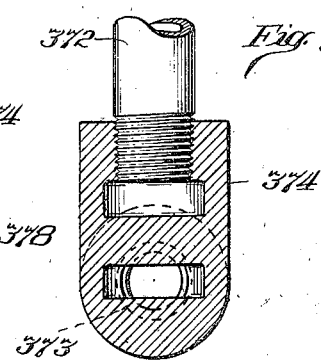

Fig. 70 is a section, taken on the line 70—70 of Fig. 68, through the steam inlet port and port leading to the die table cylinder.

Like characters of reference designate like parts in the several figures of the drawings.

The machine comprises a base A and posts B, C and D for supporting the superstructure E. A die table F revolves about post D. The superstructure is connected to the supporting posts by means of a large triangular shaped casting forming the hydraulic cylinder G. The base A and cylinder casting G are secured to the ends of the posts B, C, D, so as to resist relative separation by the pressures developed during the briquetting operation. Centrally within the hydraulic cylinder casting is disposed the hydraulic ram H, capable of moving vertically therein. Above the ram is the power cylinder J, within which operates the piston K carrying the piston rod L, on the end of which is the head M.

Movement of the power piston is controlled by an inlet valve gear N and an exhaust valve gear P.

The die table is rotated periodically by mechanism characterized generally by reference letter Q (Figs. 2 to 15). The hydraulic ram is actuated by mechanism characterized generally by R.

The completed briquets are discharged from the die table by means of discharging mechanism characterized by S.

The operations of the table rotating mechanism, briquet ejecting mechanism, ram operating mechanism, and power cylinder operating mechanism, are correlated by controlling mechanism located in the timing box and designated generally by T.

The mechanism for precompressing and finally compressing the briquet is, in general, the same as that shown in the patent to Marius P. Jacomini, No. 1,230,486, dated June 19, 1917, one of the joint inventors herein, and the patent to Ladislav F. Kristufek, No. 1,230,492, dated June 19, 1917, the other of the joint inventors. In the machine herein illustrated, the construction of the said patents is arranged for automatic operation. For convenience in understanding and describing the operation of the machine as a whole, the structure may be divided into two main groups. First, the mechanism for operating the die carrying structure or die table, and second, the power mechanism for producing pressure on the material to be formed into blocks or briquets.

Die table.

The base of the machine is shown generally at A and is required to assume the thrust of the die plunger. Referring to Fig. 6, the die table F rotates around one of the main posts, in the present case post D. For the purpose of forming a bearing a cast iron sleeve 25 surrounds the post D, and is finished on its outside with a bearing surface. The die table is preferably formed of steel and is cast with a hub to form a bearing surface 27 for rotating about the sleeve 25. For the purpose of supporting the weight of the table, a thrust ring 28, preferably made of bronze, is located at the bottom of the die table and upon which the lower surface 29 of the die table hub rotates.

The die table is provided with a number of die blocks, six in the present case, which are so located as to be capable of being positioned in succession directly below the upper die plunger. The particular form of the die is immaterial and depends upon the size and character of the material to be compressed into briquets. Each die block may be formed of a number of dies, if desired, so that a plurality of briquets may be formed by each stroke of the plunger. This construction, however, is optional. For the purpose of illustration we have shown a die table provided with six dies equally spaced, each die forming a single briquet.

The die block is made open at the bottom and the force of the upper die plunger 30 is taken up by the lower die plunger 31, shown in Figs. 6 and 40. The lower die plunger is seated on a plate 32 which rests on the upper surface 33 of the base A and which acts to distribute the load over a larger area. In order to relieve the die table and table bearings of the downward pressure caused by the friction of the material in the die during compression and to provide, in conjunction with means hereinafter described, a "floating" die, each die block 34 is supported within the table by means of three springs 35 spaced around the die (see Figs. 6 and 49). These springs are supported within the die table casting at 36. The dies are suspended from the upper end of the springs by means of the rods 37 connected to arms 38 and 38$^a$ on the die block. A shoulder 39 is provided around the die block to engage with a corresponding shoulder 40 in the die table casting so as to position the die with its upper surface 41 level with the upper surface 42 of the die table casting. This construction permits the die to move downwardly under the friction caused by the briquet, so as to impose the entire pressure of the upper die plunger on the lower die plunger. The briquet is formed intermediate the ends of the die, as shown in Figure 40. The shoulders 39 and 40 form with the cylindrical sides 43 and 44 of the die block an air cushion which cushions the die block on its return movement after the withdrawal of the die plunger. A small opening 45 is made in the side of the die table to permit the air forming the cushion between the die block and die table to gradually escape.

The die block is provided with a removable die bushing 46 which is tapered in its lower portion 47 so as to be larger at the lower end (see Fig. 40). This is to permit an easy discharge of the briquet. A suitable packing 48 is provided around the upper edge of the die block so as to exclude the material to be briquetted from contact with the bearing surfaces between the die casting and die table. The wear plate 41 of the die block is removable and secured to the die block by suitable fastening means 49.

The arms 38 and 38$^a$ (see Figs. 55 and 56) for supporting the die block on the springs are removably connected to the spring rods in order that the die block may be removed from the die table. For this purpose, these arms are forked and supported by means of T-heads 38$^b$ on the ends of the spring rods. By withdrawing the T-heads 38$^b$ from engagement with the arms, the die block may be dropped out of the die table. The arm 38 fits in a dovetailed recess in the die block, Fig. 57, and is rigidly secured therein by a set screw, and extends through a closely fitting slot in the die table to the T-head on one of the spring rods 37. The slot in the die table prevents a turning of the die block therein and in case a multiple section die is used, maintains the die in alignment with the die plungers.

A conical shield 42$^a$ connects the table bearing 27 with the surface of the table 42 and excludes dirt and material from the interior of the table.

Below the die table is a plate divided into several independent segments 50, 51 and 52 (see Fig. 11). The segment 50 is located below the table in the region where the die is filled with material to be briquetted from the hopper (see Fig. 49). The segment 51, shown in section in Fig. 40, is located below the upper die plunger and is supported by a lower plate 51$^a$. The segment 52 serves to exclude dust and material from the parts below.

Material to be briquetted is introduced by means of a chute or otherwise, into the hopper 53 (see Fig. 6). The hopper is secured to the post D by means of a bracket 54 which is secured to a stationary casting 55. As the dies pass successively under the hopper (Figs. 10 and 49), they receive a charge of material which fills the die space and is scraped off even with the upper surface of the table by means of a brush 56 located in the space 57, of the hopper. The segment plate 50 is pressed by springs 61 seated in recesses 62 in the supporting plate 58 against the lower surface of the die, and prevents leakage of material, before it is compressed, through the bottom of the die. The plate 58 is supported by a bracket 59 bolted, or otherwise secured, at 60 to the base A of the machine. The plate 50 is positioned on the lower plate 58 by means of dowels 63 and 64 (see Figs. 11 and 51). The dowel 63 is provided with a nut, Fig. 51, to limit the upward travel of the leading end of the segment plate 50. The segment plate 50 retains the loose material in the die until the same passes to the segment 51. Small curved troughs 65, 66 are secured to the lower plate 58 and are intended to receive scattered material and oil in order to prevent the same from dropping upon the floor and mechanism below the table. The segmental wear plate 51 prevents the escape of material from the die after it has passed from the segment 50 and is provided with a central opening for the lower die plunger 31. In order to provide what is substantially a "floating die," referred to above, and to permit the die to assume a position of equilibrium under the direct pressure and reaction of the upper and lower die plungers, respectively, the segment 51 (see Fig. 40) is yieldingly held in normal position by a lower plate 51ᵃ carried over a crosshead 67 having arms 68 supported by means of spring rods 69 secured thereto by nuts 70 on compression springs 71. The springs 71 are seated in recesses 72 in the base A of the machine. Pistons 73 are secured to the lower ends of the spring rods and locked by means of nuts 74 which engage the upper ends of the springs. The spring rods pass through guides 75 seated in openings 76 in the upper surface 33 of the base A. Such guides are secured in place by means of suitable bolts, (Figs. 12 and 42). The triangular plate 77 (Figs. 12, 40) also surrounds the lower portion of the lower die plunger 31 and engages the shoulder 79 thereon, thus securing the same in position and preventing its displacement. This plate is clamped to the surface 33 by means of bolts 78, the inner one of which, because of inaccessibility, is provided with wedge 82 instead of a nut (Fig. 12).

The upward movement of the segment 51 after the withdrawal of the upper die plunger 30, is cushioned by the pistons 73 in the openings 76 in the base of the machine. These pistons trap sufficient air within these openings to cushion the upward movement of the segment 51. For purposes of ease in assembling, the spring rods 69 and their extensions 80 which pass through the bottom of the recesses 72 are screw-threaded and provided with lock nuts. The lower ends of the springs 71 rest against collars 81 seated on the bottoms of the recesses 72.

Packing 83 in a packing recess 84 in the cross head 67 surrounds the lower die plunger 31 so as to prevent dust and other substances from accumulating between the cross head and plate 77.

The meeting surfaces of the upper and lower die plunger are concaved, as shown in Fig. 40, in order to form a rounded surface on the faces of the briquets so that the same may be easily picked up with a shovel or scoop.

Die table operating mechanism.

The table operating mechanism is not limited, however, to a table carrying dies but is applicable to a table carrying a plurality of pieces of work which are placed successively under some sort of mechanism for performing an operation on said work.

The rotation of the die table from the position of one die under the plunger to that of the succeeding one is accomplished by means of steam or other fluid pressure admitted behind a trunk piston 85 in a horizontal cylinder 86 located directly below the die table, as shown in Figs. 3 and 12.

A pawl ring 87 is rotatably mounted around the lower portion of the die table hub 27, as shown in Fig. 6. Suitable bearings between the hub 27 and the pawl ring are provided. These consist preferably of a bronze bushing 88 surrounding the hub 27 at the upper portion of the pawl ring and a corresponding bronze bushing 89 near the lower portion. Suitable thrust surfaces 90 are provided on the pawl ring and bronze bushings 88 and 89 to carry the weight of the pawl ring and certain other parts, and to prevent displacement of the pawl ring with respect to the die table. The pawl ring carries a pawl 91 pivoted thereon by the pin 96 which is adapted to engage the slots 92 formed in the outer surface of the lower portion of the die table hub 27. These slots are faced with wear blocks 93 which may be removed and replaced after they have become worn. The number of slots or jaws 92 formed in the hub of the die table corresponds with the number of dies in the table, in the present disclosure six in number.

A connecting rod 94 connected to the piston 85 by a ball joint, is slidably connected to block 95 pivoted around the pin 96. The opening in the connecting rod which surrounds the block 95 is slightly longer than the block. This provides a certain lost motion between the connecting rod and the pawl, the function of which will later be described. The pawl is pressed in the slots by means of a spring 97, one end of which is secured to the pawl ring at 98 and the other end of which loosely bears on the pawl.

The stroke of the die table piston is sufficient to turn the pawl ring and the die table when the pawl is engaged in a slot therein, through an arc corresponding to the angular separation of the two adjacent dies as may be seen from Figs. 12 and 14. Suitable mechanism, later described, is provided for disengaging the pawl from the slot in the die table so as to permit the reverse rotation of the pawl ring without rotating the die table.

In view of the fact that the mass of the die table is considerable, it is necessary to provide means for preventing the sudden stopping of the die table in order to prevent breakage of the operating mechanism, and for gradually retarding the moving masses. It is also necessary to provide means for locating each die accurately below the upper die plunger so that when the same descends, it will not strike the die block, but will invariably enter the die freely. The means for locating the die under the die plunger must be positive and infallible, in view of the fact that the blow of the die plunger is sufficient to destroy the machine if it should strike the die table instead of entering the die.

Mechanism for accomplishing the foregoing results will now be described. The pawl ring is also pivotally connected at 99 to a connecting rod 100 which is pivotally connected at 101 to the cross head 102 of an oil piston 103. The oil cylinder 104 is grooved at 105, as shown in Fig. 12ª, to permit the passage of oil around the piston. Short grooves 105ª which decrease in section toward the head end 106 of the cylinder are provided so as to gradually retard and finally stop the rotation of the pawl ring and die table when the piston 103 reaches the end of its stroke against the head 106 of the cylinder. The connecting rod end of the cylinder is packed with a suitable hydraulic packing 107 for packing the piston rod 108. In order to provide for the escape of oil due to the displacement of the piston rod 108 as it enters the oil cylinder, a small reservoir 109 (Figs. 1 and 2) partially filled with oil, is connected by means of a pipe intermediate the ends of the cylinder at the point 110. As the piston rod enters the oil cylinder it displaces oil against a cushion of air in the upper part of reservoir 109. It will be noted that the oil grooves 105ª stop at the point 111 a short distance from the head end of the oil cylinder. The stroke of the die table cylinder is so adjusted as to bring the die a short distance beyond its proper position in alignment with the upper die plunger. Independent mechanism is provided for positively aligning the die with the die plunger.

The oil grooves 105 terminate a short distance from the connecting rod end of the oil cylinder at 112. This provides a slight oil cushion for cushioning the moving parts at the end of the reverse rotation of the pawl ring. This cushion, however, needs to be only slight inasmuch as the weight of the rotating parts is very much less on the return stroke of the die table cylinder.

*Table key mechanism.*

When the piston of the die table cylinder approaches the end of its forward stroke and the die is near its proper position, a small stop or projection 113 located on the periphery of the die table (Fig. 44) engages a lever 114 and rotates the same against a weak spring 115 in the direction of the rotation of the die table. The stop 113 is so positioned that when the die is approximately directly in alignment with the die plunger the lever 114 is permitted to slip over the end of the stop and rotate in the opposite direction under the tension of the spring 115. The weight of the lever 114 is sufficient so that its inertia causes the opposite end 116 to strike the end of a small valve rod 117 and open the valve 118 which normally is seated by spring 119 stronger than the spring 115. It will thus be seen that the opening of the valve 118 is only momentary and that shortly after its opening it again closes because the spring 119 is stronger than the spring 115. The opening of this valve permits air under pressure from the pipe 120 (Fig. 44) to pass through the port 121 (Fig. 47) behind the piston 122 (Figs. 45, 46 and 47). This moves the piston against the pressure of the spring 123 and likewise moves the table key 124 which is connected to the body 125 of the piston by means of a pin 126 passing through a slot 127 in the side of the table key cylinder 128. The forward movement of the table key 124 causes the end thereof to enter the table slot 129 opposite the end of the key (Figs. 45 and 48). The end of the table key is slightly tapered at 130 and the faces of the slots 129 are correspondingly tapered and faced with wear blocks 131 which are removable and may be replaced after they have become worn. When the table key 124 enters fully one of the slots 129 and is brought to rest by the inclined faces of the blocks 131, the corresponding die is directly in alignment with the die plunger. The table key and slots are tapered so that the force of the forward movement of the key under the pressure of the air admitted behind the table key cylinder is sufficient to rotate the die table back by the short distance beyond its proper position to which it was carried by the die table cylinder.

By means of this construction the die table is rotated as rapidly as its weight will permit and stopped gradually and later positively locked in position by an independent means which does not assume any of the stress required to stop the table in position.

The table key cylinder is provided with a removable head 132, so that the piston packing may be replaced.

The opening of the valve 117 also admits air under pressure to the pipe 133 (Fig. 47) connected to the exhaust valve of the die table cylinder. The pipe 133 leads to the exhaust valve 134 (Fig. 16) of the die table cylinder 86. This exhaust valve is substantially a balanced valve, as may be seen from Fig. 16. It is only unbalanced sufficiently to keep the same closed.

When air is admitted to the table key cylinder, it also passes under pressure through the pipe 133 and moves the valve 134, shown in Fig. 16, to the right and connects the exhaust ports 135 of the die table cylinder with the exhaust pipe 136. This permits the exhaust of the steam from the die table cylinder through the pipe 136. The piston 85 is moved in the reverse direction by means of air pressure admitted to the space 137 behind the piston through the pipe 138 (Figs. 12 and 14). This pressure is maintained against the piston at all times, but does not prevent the forward movement of the piston under the action of the steam. When the steam pressure has been released from the face of the piston and the exhaust valve opened, the air pressure is then sufficient to return the pawl ring and other mechanism to its proper position.

In order to release the pawl from engagement with its slot in the die table (Figs. 12 and 14) a small pin 139 (Figs. 14, 15 and 16) is provided and attached to the connecting rod adjacent the connecting rod head, as shown. The opposite end of the pawl is provided with forked extensions 140 extending on opposite sides of the connecting rod and adapted to engage the ends of the pin 139. When the die table piston is at the end of its stroke, as shown in Fig. 14, the relative positions of the extensions 140 and the pin 139 have so changed with respect to their positions as shown in Fig. 12, when the piston is at the head end of its stroke, that said extensions are about to engage the pin 139. Upon the reverse stroke of the piston under pressure of air, the connecting rod takes up the lost motion at 141 (Fig. 14) without rotating the pawl ring. This lost motion is sufficient to permit the pin 139 through its engagement with the extensions 140 to rotate the pawl 91 and disengage the end thereof from the slot 92. The pawl ring is then free to be rotated and will so rotate as soon as the lost motion 141 is entirely removed.

When the die table piston approaches the end of its return stroke the projection 142 on the pawl ring engages the end of a rod 143 (see Fig. 16) and moves the same to the left. This movement moves the rod 144 through the agency of the spring 145 and causes the valve 134 to again close against its seat, the air pressure in the pipe 133 and behind the table key piston having, in the meantime, escaped through a small opening in the adjustable needle valve 146 (Fig. 47). The spring 145 provides for inaccuracies in construction and adjustment and prevents injury to the valve or its seat 147 in case the rod 143 moves through a greater distance than that through which the valve 134 is capable of being moved.

*Power mechanism.*

In order that the power cylinder be not accidentally set into operation before the die is in alignment with the plunger, the control mechanism therefor is not set in operation until the table key comes to rest in one of the slots 129. In other words, the control mechanism is set in operation by means of the table key, and unless the table key enters one of the slots 129, the power cycle is not commenced.

Referring to Figs. 44 and 45, it will be seen that the casting 148, within which is the table key and table key cylinder, is clamped by means of bolts 149 to the post C. In order to permit of some slight adjustment, a set screw 150 is provided. A shaft 151 running between the timing box T and the table key mechanism is provided with a bearing 152 at its lower end within the casting 148. An arm 153 is rigidly secured thereto, and connected at its end to a link 154. The table key is provided with a pin 155 extending through a slot 156 in the lower portion of the casting 148 to which is pivoted the other end of the link 154. It will be seen therefore, that the movement of the table key rotates the shaft 151. This shaft is operatively connected at its upper end with mechanism, hereinafter described, for setting in operation the power mechanism.

The mechanism for precompressing and compressing the briquet consists of a ram H capable of sliding movement within the hydraulic cylinder G. This cylinder is supported near the upper ends of the three posts B, C and D, by means of shoulders *b*, *c* and *d* formed on the posts B, C and D, respectively. The reaction of the cylinder during the briquetting operation is transmitted equally to the posts B, C and D by the nuts 157 (Fig. 5) screwed on the upper ends thereof. These posts are placed under tension during the briquetting operation and assume the stress of the downward thrust of the upper die plunger.

It will be noted that this machine is a "three post" as distinguished from the "four post" type of press. By the use of three posts instead of four a much more rigid machine is secured. The combined cross section of the three posts is determined by the stress resulting from the briquetting operation. When this cross section is distributed in three posts instead of four a much more rigid machine is secured inasmuch as the coefficient of rigidity, or, in other words, the section modulus increases as the cube of diameter of the post. Accordingly three posts are more rigid and withstand deflection and bending more readily than four posts and the distribution of stress therein is more likely to be uniform. Such a machine is, moreover, more compact and conveniently arranged. The machine may be more cheaply made because there are fewer posts to machine, the machining of such posts being expensive because of the small tolerance permitted in machining.

Above the hydraulic cylinder is positioned the power cylinder J which is bolted by means of stud bolts 158 (Fig. 5) to the top of the cylinder casting G.

In order that the description of the power mechanism may be more readily understood, a brief explanation of its operation will be made. When the table key enters the slot and sets in motion the power operating mechanism, oil, or any liquid under pressure, is first admitted into the cylinder G which causes the ram H to descend and precompress the material in the die. After precompression, steam is admitted behind the piston K which forces the piston rod having the head M thereon into the body of oil. This head M, as will be seen from Fig. 5, is of general conical shape so as not to unduly heat the oil by splashing in the same or churning the same during the compression stroke. The head M moves a short distance down during which the material is compressed under the pressure of steam, the oil valves to the hydraulic cylinder having been closed. This downward movement of the head M creates a space above the head not filled with oil, which space increases until the downward movement of the head uncovers said space to the entry of oil. This increases the capacity of the cylinder and the piston is permitted to move downwardly encountering practically no resistance from the oil. When the displacement of oil by the piston rod L in the cylinder equals the increase in capacity of the cylinder, the head M again meets resistance, but having, in the meanwhile acquired considerable velocity the inertia of the moving parts transmits a tremendous blow to the oil which is, in turn, transmitted through the die plunger to the briquet, thus finally compressing the same.

After the compression stroke the piston rod head is withdrawn, the exhaust oil valve to the hydraulic cylinder is opened, and the ram is lifted by means of lifting cylinders to its former position.

With this brief explanation the power mechanism will be described in detail.

The ram H is formed with an upper section 159 and a lower section 160 provided with a clean-out passage 160$^a$ closed by a plug. The walls of the upper portion 159 are considerably thinner than those of the portion 160. In order to withstand the oil pressure openings 161 are made through the walls of the ram intermediate the upper and lower sections. These openings serve to balance the pressure of oil inside and outside of the walls 159, inasmuch as a small space 162 is provided between the surface of the ram and the cylinder G into which oil under pressure may pass. A bearing sleeve 163 is provided at the upper portion of the ram. The lower portion 160 of the ram is not thus balanced and accordingly the walls thereof are made thicker. A sleeve 164 of cast iron, or other suitable material, is provided to form a bearing surface against the cylinder G. The cavity in the lower portion of the ram corresponds with the shape of the head M, so that in the event that insufficient oil were in the cylinder, oil would be trapped between the head M and the bottom of the ram so as to prevent the head M from striking the bottom of the ram.

Suitable hydraulic packing 165 in the form of a ring of U-shaped cross section is provided at the lower end of the cylinder G and a packing ring gland 165$^a$ is bolted to the lower face of the cylinder G by means of bolts 165$^b$.

For the purpose of raising the ram after the compression stroke a cross-head or yoke 166 (see Fig. 23) supports the lower end thereof. The ends of the cross head are provided with openings 167 through which pass piston rods 168 having retaining nuts at their lower ends. Pistons 169 are connected to the piston rods and work in cylinders 170. These pistons work against a continual pressure of air admitted into the cylinders through the pipes 171 and serve to raise the ram whenever the steam and oil pressure is released.

The upper die plunger 30 is provided with a head 172 and is seated within a casting 173 (Figs. 5 and 23) which is bolted by means of three bolts 174 through the crosshead and to the bottom of the ram H. The upper die plunger 30 seats against a plate 175 which serves to distribute the pressure over the large surface of the ram. It will be noted that the bolts 174 also serve to secure the crosshead 166 to the ram. This casting is provided with an annular groove 176 adapted to catch oil leakage.

Referring to Figs. 5 and 32, the hydraulic cylinder valve mechanism R comprises a valve chest r bolted to the cylinder G, having inlet and discharge valves 178 and 179, respectively. These valves admit oil or other liquid to the port 180 leading to the interior of the cylinder. Oil under pressure is admitted to the valve chest through the pipe 181. The valve 178 and its seat 182 are provided with narrow cylindrical rims 178$^a$ and 182$^a$ adjacent the seating surfaces to momentarily trap oil in the space so formed so as to cushion the seating of the valve. The valve 178 is pressed on its seat by means of a spring 183 which seats against the valve plug 184 screwed into the valve chest r at 185, as shown. Suitable packing 186 is provided for the valve stem 187 and a gland 188 holds the same in place. In order to pack the valve against pressure of the oil inside the hydraulic cylinder the cylindrical valve body 178 is surrounded by a valve guide 189 and packed by means of suitable hydraulic packing 190 and packing ring 192. A bushing 191 in the plug 184 forms a bearing for the lower portion of the valve body. The valve guide 189 seats within the valve chest against a shoulder 193.

The valve 179 is similar to valve 178 and need not be further described. This valve connects the port 180 with the discharge pipe 194. The valve stems are operatively connected with suitable operating cams which will be later described, by rods 177 and 195 which extend into the timing box T.

By pass valve.

Referring to Fig. 34, it will be noted that the head M on the piston rod L fits closely within the sleeve 198 located in hydraulic cylinder below the cylinder nut 197. As the head M moves down due to the reduction in volume of the material being compressed a space 199 shown in dotted lines in Fig. 34 unfilled with oil will be left behind the head M until the head clears the lower edge of the sleeve 198. The space 199 thus created permits the piston with the head to dive through the oil and transmit to the briquet the final compressing blow. In order to permit the escape of oil from the space 199 on the return stroke a by pass valve 200 connected therewith through the passage 201 and with the hydraulic cylinder through passage 202 is provided. This valve is provided with a valve chest 203 which is bolted by means of bolts 204, or otherwise secured to the casting G (Figs. 35 and 37).

In order to vary the compressing blow of the plunger on the material an adjustment is provided on the check valve whereby the same may be slightly "cracked." The extent of the cracking or opening of this valve determines the amount of oil which is forced through the valve by the downward movement of the head M. In other words, an adjustable stop 205 engages the valve 200 and prevents the same from seating tightly on its seat so as to permit some oil to be forced past the valve and through the passage 201 into the space 199 in order to vary the effective volume of said space.

The amount of oil forced past the valve and into the space above the head M by said head, before its dive, determines the amount of energy absorbed by the piston, piston rod and head M during the period of reduced resistance to its dive through the oil and until the downward movement of the piston displaces the oil to completely fill the cylinder. By this means the pressure on the die plunger may be varied to suit the characteristics of the material to be compressed.

The stop 205 is attached to a rod 206 which screws within the plug 207 and passes to the exterior through a packing 208. The end of the rod 206 is provided with a handle 209 (Fig. 37) and a small screw which may be set to engage any one of the recesses 210 in the upper surface of the plug 207. By this means the position of the stop 205 may be adjusted to hold the valve off its seat by different amounts and to vary the size of the passage through which the oil is forced.

In order to provide for the passage of oil around the valve body, grooves 211 (Fig. 36) are provided in the casting 203 between the valve guides. The bottom of the casting is provided with a screw-threaded opening into which a plug provided with a stop 212 is screwed. Stop 212 acts both as a spring rod and to limit the opening of the valve under pressure of the returning oil forced out of the space 199 when the head M enters the sleeve 198 on its return stroke.

Power cylinder inlet valve.

Considering Figs. 4 and 22, the piston K in the power cylinder J is driven by steam admitted by the steam inlet valve mechanism N. Steam enters the valve chest through the pipe 213 bolted to the top of the steam chest. The valve 214 is a double seated valve and is made hollow, as shown at 215, so that steam pressure may be admitted on both sides thereof for the purpose of balancing the same. The valve seats are shown at 216 and 217, the inlet port at 218, and the passage to the steam cylinder at 219 (Fig. 4). The valve is retained on its seat by means of a spring 220 interposed between the plate 221 on the valve rod 222 and the plate 223 on the casting 224 of the valve. The valve is opened by means of upward pressure through the rod 225 forming an extension of the valve rod 222. A piston 222ª forms with the valve cage a dash-pot to cushion the closing of the valve. A small adjustable vent 222ᵇ in the cage permits the gradual escape of the air forming the cushion.

The valve opening mechanism consists of a cam 226 operated by means of a rod 227 actuated by mechanism hereinafter described, located in the timing box T. The valve is opened against the pressure of the spring 220 when the roller 228 rides upon the cam surface 229. The roller is maintained in contact with the cam by means of the spring 230 placed between the bottom 231 of the frame 232, which supports the roller and the U-shaped plate 233 which engages the lower portion of the valve casting.

A small drip pan 234 is placed below the valve to catch oil.

In order to vary the cut-off of the steam valve an adjustable tripping block 235 is provided on the upper surface of the cam roller supporting frame 232. This tripping block runs between suitable guides 236 on the upper surface of the frame 232, and is adapted to engage the lower end of the rod 225 for the purpose of lifting the valve when the roller 228 rides upon the cam surface 229. The surface of the tripping block and the lower end of the rod 225 are faced with small pieces 237 of hard metal for the purpose of resisting wear.

It will be noted that when the tripping block is moved to the right (Fig. 22) the same is not in position to engage the rod 225 and raise the valve. For the purpose of closing the valve the block 235 is moved to the right and out of engagement with rod 225, thus permitting the valve to close. A bell crank 238 connected with the tripping block 235 through the link 239 is adapted to move said block to the right or left. The lower arm 240 of this bell crank is provided with an adjustable cam block 241 which is adapted to be engaged by the cam surface 242 on the cam 226. After the steam valve has been opened by movement of the cam 226 to the left, further movement in this direction causes the cam block 241 to ride up on the cam surface 242 and move the tripping block 235 to the right, finally tripping the steam valve and permitting the same to close under pressure of the valve spring 220 (Fig. 22).

The position of the cam block 241 is adjusted on the arm 240 of the bell crank 238 to vary the steam cut-off, by means of a bell crank 243 connected to the block through a link 244 (Fig. 22). The other arm of the bell crank 243 is connected to a rod 245 (Fig. 1) which runs down to and is connected to an indicator rod 246 carrying a pointer 247 and hand wheel 248. The position of the block 241 on the bell crank 238 may be varied by screwing the hand wheel 248 on the rod 246, this position being indicated by the position of the pointer 247 on a scale which is graduated to indicate the point of cut-off of the steam valve.

The mechanism for tripping and closing the steam valve is also used to prevent the opening of the valve whenever the upper die plunger 30 enters the die during the precompression stroke more than a certain distance. In case of an empty die or broken upper die plunger, the ram crosshead is apt to strike the die table with a hard blow, if steam were admitted to the power cylinder. For the purpose of preventing the admission of steam to the steam cylinder in such case, an iron clad magnet 249 of any suitable design and having an armature 250 is provided. The armature is connected through a rod 251 to the bell crank 252 pivoted to a bracket 253 on the machine. The other end of the bell crank 252 is forked as shown at 254, and engages a pin on the link 239. Normally the magnet is excited through wires 255 so that it draws up the armature against the spring 256 and holds the tripping block 235 under the rod 225. Whenever the current to the magnet is broken, as will be hereinafter described, the armature 250 drops and with the aid of the spring 256 moves the tripping block 235 to the right out of alignment with the rod 225 (Fig. 22).

Referring to Figs. 1 and 41, an electric switch 257 of ordinary design having an arm 258 extending out of the switch box is secured to one of the main posts by means of a strap 259 at a point opposite the ram crosshead 166. The switch is placed in circuit with a suitable source of electric power and the wires 255 leading to magnet 249. The crosshead 166 is provided with a bracket 260 carrying a vertically adjustable cam 261 which engages the arm 258 and normally holds the switch closed so as to excite the magnet. When, however, as stated above, the ram carrying the yoke 166 descends more than a certain definite amount, the arm 258 runs off the end of the cam and opens the switch permitting the armature 250 to fall and causing the tripping block 235 to move to the right out of alignment with the end of the rod 225, so that the raising of the cam roller 228 cannot open the valve N. Accordingly, this safety device prevents the admission of steam to the cylinder for subsequent power stroke and thereby avoids possible injury of the machine.

The design of the magnet 249 is such that the armature 250 may be drawn downwardly a sufficient distance against the attraction of the magnet so as to permit the tripping of the valve N when the cam surface 242 engages the cam block 241. In this respect the magnet acts in the same manner as a tension spring.

*Power cylinder exhaust valve.*

The exhaust valve mechanism is positioned opposite the steam valve (Figs. 4 and 7). The valve chest 262 (Figs. 7 and 21) is connected to the exhaust line by the pipe 263 and provided with a chamber 264 connected with the exhaust port 265. The valve piston 266 is provided with suitable packing rings 267 and is adapted to seat under the pressure of a spring 268 on the seat 269. The face of the piston is provided with openings 270 so as to balance the valve by the admission of exhaust steam pressure behind the valve through the openings 270. The valve rod 271 is packed at 272 and provided with a spring plate 273 engaging the spring 268. The lower end of the valve rod is connected to a roller frame 274, carrying the cam roller 275. A cam 276 and the roller frame slide in a guide 277 secured to the lower portion of the valve cage by means of bolts 278. The cam is reciprocated by means of a rod 279 which is actuated by mechanism within the timing box T. The cam opens the exhaust valve by forcing down the roller 275 by engagement with the cam surface 280. As shown in Fig. 21, the valve is in open position.

A small drip pan is provided below the valve to catch oil.

*Power cylinder.*

The power cylinder J (see Figs. 4 and 5) is of ordinary construction having a piston K and piston rod L passing into the hydraulic cylinder through suitable hydraulic packing 281 in the hydraulic cylinder nut 197. The cylinder head 282 is bolted to the cylinder casting by means of suitable bolts. The inlet and exhaust valve chests are cast integral with the cylinder J. For the purpose of returning the piston to the top of the cylinder after the power stroke, air pressure supplied through pipe 283 controlled by a suitable valve is maintained below the piston and against which the piston works. This pressure is merely sufficient to raise the piston and the piston rod. A relief valve 283ª connected to the lower part of the cylinder prevents the building up of air pressure above a certain amount. (Fig. 4.)

Preferably both valve chests and steam cylinder are covered with suitable lagging 284 to reduce loss of heat through radiation.

Control mechanism.

The steam valve cam rods 227 and 279 (Figs. 21 and 22) are connected to arms 285 and 286, respectively, which are keyed to a rock shaft 287 so as to move in unison. The arm 285 is cast integral with another arm 288 forming, in effect, a bell crank. The arm 288 is connected to a rod 289, the length of which may be adjusted to vary the time of opening of the steam valves (Figs. 1 and 61). The lower end of the rod 289 is adjustably connected to an arm 290 keyed to a shaft 290ª extending into the timing box T. Another arm 290ᵇ, keyed to shaft 290ª, is connected by means of a link 291 (Fig. 61) to the reciprocating hydraulic valve cam 292. This cam is guided within a casting 293 within which are also guided two vertically sliding frames 296, 297, carrying cam rollers 294 and 295, respectively. The cam rollers are normally forced up by springs 298, 299, and are forced down by means of the cam surfaces 300, 301, respectively, on the cam 292. The upper ends of the cam roller frames are connected, respectively, with the valve rods 177 and 195, operatively connected to the oil inlet and discharge valves, respectively, of the hydraulic cylinder.

Clamps 302 connect the rods 177 and 195 to the upper valve rods leading to the hydraulic valves. These connections are used for structural reasons, so that the hydraulic valves may be removed without necessitating the disassembling of the mechanism within the timing box.

The hydraulic valves are provided with mechanism by means of which they may be tripped and closed independently of the mechanism for opening them (Figs. 58 and 61). Such tripping mechanism consists of tripping blocks 303 (Fig. 63) slidably disposed within each of the cam roller frames 296 and 297. These blocks are provided with ribs 304, which slide in corresponding horizontal grooves 305 near the upper ends of the roller frames. A tripping surface 306 faced with a wear block 307 is provided for engaging a corresponding wear block 308 placed on extensions on each of the valve rods 177 and 195. When the tripping blocks are moved to the left, the same are adapted by engagement with the upper faces of the blocks 308 to open the hydraulic inlet and discharge valves when the blocks are pulled downwardly by the action of the cam 292 on the rollers 294 and 295, respectively. A vertical groove 309 is formed in each of the tripping blocks within which pins 310 and 311 are adapted to slide. These pins are connected, respectively, to levers 312, 313, having stationary pivots 312ª and 313ª, respectively. These levers are adapted to be actuated by mechanism connected with the cam 292 to withdraw the tripping blocks from engagement with their respective valve rods. Normally the tripping blocks are held ready for engagement with the valve rods by means of tension springs 314 attached to the ends of pins 310 and 311 (Fig. 59).

Parallel to the cam 292 is a tripping rod 316 supported within guides 317, 318, and operatively connected to the cam by an extension 315 secured between lock nuts on the rod so as to permit the longitudinal adjustment of the rod relative to the cam. The tripping rod carries two longitudinally adjustable blocks 319, 320 (Figs. 58 and 60) which are adapted to engage respectively with the levers 312, 313, so as to trip the inlet and discharge oil valves at the proper moment. The moment of tripping may be varied by adjusting the position of the blocks 319 and 320 on the rod 316. The lever 312 is provided with an arm 321 which is adapted to be raised by the stop 319 when the latter passes below it during the movement of the cam 292 to the left (Fig. 58). This causes the lever to oscillate and move the tripping block to the right (Fig. 58) and trip and allow the inlet oil valve, which had previously been opened by the engagement of the roller 294 with the can surface 300 on the cam 292 to close. The discharge oil valve is opened when the cam 292 starts its movement from left to right by the engagement of the cam surface 301 with the roller 295. It is tripped and later, during the movement of the cam 292 to the right (Fig. 60) by the engagement of the block 320 with the rounded surface 322 on the lever 313, is closed.

Timing cylinder.

The cam 292 is reciprocated by means of a timing piston 323 (Figs. 58 to 61) carrying a piston rod 324 to the end of which it is connected so as to be capable of longitudinal adjustment, as shown at 325. This piston is operated by oil or other fluid under pressure. The timing piston is reciprocated by means of a control valve 326 having a casing cast integral with the timing cylinder (Fig. 67). Referring to Fig. 65, oil under pressure is admitted through the pipe 327 to a central chamber 328 of the valve 326. The valve is provided with pistons 329 and 330 covering ports 331 and 332 leading to opposite ends of the timing cylinder through passages 333 and 334. These pistons are connected by means of a rod 335 and provided with an extension rod 336 passing through a stuffing box 337. Each of the passages 333, 334, is provided with an adjustable needle valve 338 (Fig. 67) for controlling the inlet ports. By screwing it in or out with the handle 339 the effective area of the inlet ports may be varied and, in consequence, the speed with which the timing piston and cam 292 travel may be controlled so as to allow sufficient time for the completion of all operations not positively controlled by the timing piston. The set screw 340 is provided in the handle 339 so that the same may be set in any position desired. A check valve 341 is provided in an auxiliary passage 342, 342ª, at each end of the cylinder connecting the valve and cylinder, so as to permit the return of oil to the valve and to the discharge without passing it in a reverse direction through the needle valve. This valve, which is normally retained on its seat by a spring 343, opens when the piston makes the reverse stroke and serves to decrease the back pressure of the oil on the return stroke.

When the valve is in the position shown in Fig. 65 oil under pressure is admitted to the left hand end of the timing cylinder through the port 332 and the opposite end of the cylinder is connected through the port 331 and passage 345 with the exhaust pipe 344. The left hand end of the timing cylinder is connected to the exhaust pipe 346 through the passage 347 and the right hand end to oil pressure when the valve pistons are moved to a position opposite to that shown in Fig. 65.

*Operation of the timing cylinder valve.*

Referring to Fig. 65, to the end of the rod 336 is secured a block 348 carrying thereon a wear block 349. Latches 350, 351, pressed downwardly by means of springs 352, 353, are adapted to alternately engage the ends of the wear block 349 and lock the valve at the ends of its stroke. In other words, the latch 350 is adapted to engage the edge of the wear block and hold the valve in its position at the left hand end of its stroke. The latch 351 is adapted to hold the valve at the right hand end of its stroke by engaging the opposite end of the wear block.

A spring 354 mounted on the rod 355 which is supported between brackets 356 and 357 is adapted to actuate the valve. On the rod 355 and connected to each end of the spring are angular shaped sliding blocks 358, 359, shown in perspective in Fig. 64, prevented from turning thereon by a feather key 355ª. One arm, 360, 361, of each block, is adapted to engage the block 348 on the valve rod 336. The other arms 362, 363, are adapted to be engaged alternatively by the stop 364 secured so as to be capable of adjustment between lock nuts on the piston rod 324 of the timing piston. Each latch 350, 351, is provided with a rod 365, 366, respectively, the lower ends of which are adapted to be raised by the bell cranks 367, 368, respectively, to disengage the latches from the wear block 349.

The bell crank 367 is pivoted at 369 and is adapted to be rocked by the push rod 370 running in guides in the lower portion of the timing box T. The opposite end of the push rod 370 is engaged by an arm 371 keyed to the upper end of the shaft 151 running down and controlled by the table key. As stated in connection with the description of the table key (Figs. 44, 48) the movement of the table key into one of the slots in the die table rotates the rod 151, which in turn, as may be seen from inspection of Figs. 65 and 66, causes the arm 371 to move the push rod 370 forward, causing it to rock the bell crank 367 and lift the latch 350, permitting the control valve to move to the right, due to tension of spring 354, and admit oil behind the right hand end of the timing piston. This spring is put under tension by means of the blocks 358 and 359, the former being engaged behind the stop 364 (Fig. 60) when the timing piston is at the right hand end of its stroke, the block 359 being retained by engagement with the end of block 348. When the timing valve pistons reach the right hand end of their stroke the bell crank 368 which lifted the latch 351 out of engagement with the wear block 349, is lowered, and the latch 351 engages the wear block and locks the valve at the right hand end of its stroke.

As stated above, in this position the valve admits oil behind the timing piston in its position, as shown in Fig. 60, and moves the piston to the left, the stop 364 engaging the block 359, which in turn engages the vertical arm 368ª of the bell crank 368. This movement places the spring 354 under tension, the other end thereof being held by the block 358 in engagement with the block 348 and also causes the bell crank 368 to lift the latch 351 from engagement with the wear block 349, thus permitting the control valve to be moved to the left by the spring 354, and be retained in that position, as shown in Fig. 65, by the latch 350, the bell crank 367 having in the meantime been lowered by the withdrawal of the table key from the die table slot. In this position the movement of the timing piston halts until it is again set in motion by the entry of the table key into the succeeding table slot.

*Die table cylinder inlet valve control mechanism.*

Referring to Fig. 68, steam is admitted to the die table cylinder (Fig. 16) through the steam supply pipe 372, the valve 372ª and the pipe 373 leading to the top of the steam cylinder (Fig. 16). The valve 372ª is supported in a casting 374 bolted by means of bolts 375 to the rear face of the timing box T. A spring 376 serves to retain the valve on its seat 377. The valve rod 378 extends through a gland 379 and is adapted to be engaged by an arm 380 keyed to the shaft 381 which passes into the interior of the timing box. The rotation of the shaft 381 lifts the valve from its seat and admits steam to the die table cylinder. To the other end of rod 381 is keyed a short arm 382 and to the free end of this arm is pivoted a small bell crank 383 (Fig. 58) one arm 384 of which is adapted to be slightly raised by a cam surface 385 at the end of an extension 386 on the tripping rod 316, and engaged by a block 385ª on said extension. The other arm 387 of this bell crank is pressed against a pin 388 on the arm 382 by means of a spring 389. This arm is also adapted to be engaged by an adjustable stop 390 screwed through the casing of the timing box and locked in position by a lock nut 391.

When the piston of the timing cylinder approaches the right hand end of its stroke the block 385ª near the end of the extension 386 which moves with the piston, engages the arm 384 and rotates the rod 381 lifting the valve 372ª from its seat and admitting steam behind the die table piston. The valve 372ª is tripped and closed by its spring when the arm 387 of the bell crank 383 engages the end of the stop 390. This engagement causes a lifting of the arm 384 from the block 385ª on the extension 386 and disengages the same therefrom. A variation of the cut off of the valve 372ª is accomplished by moving the stop in or out so that it will be engaged at different points of movement of the bell crank 383.

*Discharge or "knock out" cylinder.*

The discharge or "knock out" cylinder S (Fig. 28) is provided with a piston 392 carrying a head 393 screwed to the piston rod 392ª so as to be adjustable, for discharging the briquets from the die. This cylinder is supported by a bracket 394 which is clamped around the post D above the bracket holding the filling hopper. This bracket positions the head 393 directly over a die when the table comes to rest during the power stroke. The piston 392 is packed with suitable packing 395 and the piston rod 392ª is packed by gland and packing 396. Felt washers 397 (Fig. 28) slightly larger than the diameter of the die and having vertical grooves therein, are clamped in place against the head by the metal washer 398. These washers are soaked with oil for the purpose of lubricating the die during the ejecting stroke of the discharge piston. The piston is forced down by means of oil pressure entering the cylinder through the pipe 399. Oil pressure is supplied by means of two pistons 400 connected to and placed above the lifting pistons 169 (Fig. 23). When the ram descends on the precompression and power stroke, the pistons 400 force oil through the pipes 401, 402, into the pipe 399. Two pistons are provided so that the resistance to the downward motion of the yoke 166 is balanced.

These oil cylinders are identical, and only one need be described in detail.

Referring to Fig. 24, the piston 400 is connected to a rod 403 which runs through a stuffing box 404 at the lower end of the cylinder 405. This rod is secured to the piston 169 by means of a sleeve 406 which screws on the upper end of the rod 168 and serves also to clamp the piston packing in place by means of the shoulder 407. At the top of the cylinder 405 is a small reservoir 408, partially filled with oil for supplying leakage. The upper end of the cylinder 405 is tapered outwardly at 409 so that when the piston reaches the upper end of its stroke, oil from the reservoir is permitted to run in and supply any leakage of oil through various packings. The packing rings 410 of the piston 400 leave a space between the periphery of the packing and the cylinder walls when the piston is at the upper end of its stroke to allow for the passage of oil. The piston is slotted at 411 to permit the passage of oil into the space below it. As stated above, on the downward stroke of the piston 400 oil is forced through the pipe 401 and also through the pipe 402 by the other piston on the top of the piston 392. This causes the same to descend and eject the briquet. For the purpose of permitting an easy ejectment of the briquet, the lower portion of the die is tapered outwardly so as not to resist the ejectment of the briquet throughout the entire length of its movement through the die.

The piston 392 is raised after the power stroke has been completed, and the ram has been raised, by means of oil pressure on the lower face of the piston connected to the cylinder through the pipe 412 (Fig. 30). This oil pressure is sufficient only to lift the piston and does not offer any appreciable resistance to the downward motion on the discharge stroke. The pipe 412 is connected at its other end to an oil reservoir in which the oil is maintained under pressure.

Supporting posts 413 are placed below the discharge cylinder and resist the downward movement of the die block under the pressure of the discharge piston in discharging the briquet and thus relieve the die table from this strain.

Operation: The cycle of operation of the machine is believed to be sufficiently clear from the foregoing description, so that nothing more than a brief description of the operation of the machine itself is necessary. It will be understood that during the compression and return stroke of the power cylinder, the die table is at rest. The die table is only put in motion when the upper die plunger is raised out of the die.

Because of the relatively high pressure exerted by the die plunger, it is necessary to provide safety means which prevent the commencement of the power stroke unless a die is in alignment with the die plungers. The machine is also provided with safety means which prevent the operation of the power piston for the compression stroke when on the precompression stroke the ram has descended over a certain distance.

Owing to the weight of the parts connected with the die table and the necessity for procuring a rapid operation, it is necessary to provide means for retarding the motion of the die table when a die approaches alignment with the die plunger, and to provide separate means for locking the die table in position, which means is not set in operation until after the die table is substantially brought to rest. In the embodiment here shown the table key is incapable of withstanding the shock which would be imposed thereon if it were attempted to suddenly stop the table by inserting the key into a table slot.

The die table is again set in operation after the formation of the briquet by the opening of the steam valve 372 (Fig. 68). This steam valve is opened when the timing piston 323 is at the end of its stroke, as shown in Fig. 61. In this position of the timing piston, both the inlet and exhaust valves for the hydraulic cylinder are closed, the power cylinder inlet valve has been tripped shut by the cut off and the exhaust valve thereof is opened.

The pawl on the pawl ring having fallen into a slot under the pressure of its spring, the die table is rotated in a counter-clockwise direction (Fig. 12) until the piston 103 reaches the end of its stroke. This brings the die a short distance past alignment with the die plungers. At this time the lever 114 (Fig. 44) is tripped by the projection 113 and opens the air valve admitting air behind the table key and also behind the die table cylinder exhaust valve 134 (Fig. 16). This air pressure drives the key into one of the slots on the die table, positioning the die in alignment with the upper die plunger, and opens the exhaust valve to the steam table cylinder, permitting the return of the piston 85 under pressure of air admitted behind the same. In removing the lost motion between the connecting rod 94 and the connecting rod block 96 the pawl 91 is lifted out of its slot (Fig. 15) so as to permit the reverse rotation of the pawl ring.

When the pawl ring has completed its reverse rotation, the projection 142 thereon engages the rod 143 and closes the exhaust valve. The air pressure behind the exhaust valve and behind the table key piston having, in the meantime escaped through the needle valve 146 (Fig. 47).

The entry of the table key into one of the slots on the table causes the rotation of the shaft 151 (Fig. 47), and the lifting of the latch 350 from engagement with the wear block 349. The release of the wear block causes the timing cylinder valve to move to the right (Fig. 65) and admit oil under pressure behind the timing piston (Fig. 61).

The motion of the hydraulic valve cam 292 to the left under pressure behind the piston 323 opens first the oil inlet valve to the hydraulic cylinder, the discharge valve having been previously tripped and closed. The ram accordingly descends and precompresses the material in the briquet. During the descent of the ram, oil is forced by means of the pistons 400 through the pipes 401 and 402 (Figs. 24 and 28) into the discharge cylinder S, whereupon a briquet is ejected from the die directly below the discharge cylinder and at the same time the surface of the die is lubricated preparatory to the formation of another briquet therein. Further movement of the timing piston to the left causes the closing of the power cylinder exhaust valve (Fig. 21), the tripping and closing of the oil inlet valve by means of the lever 312 (Fig. 58) and the opening of the steam inlet valve of the power cylinder (Fig. 22).

The power piston K commences its descent applying further pressure to the briquet. When the head M on the piston rod L has descended far enough to clear the lower edge of the sleeve 198 (Fig. 34) it plunges down into the oil until the piston rod L has displaced a volume equal to the volume of the space 199 created behind the head M. During this stroke the further movement of the inlet steam cam 226 controlled by timing piston trips the steam valve and permits the same to close.

The steam exhaust valve having been opened at the end of the downward stroke of the power piston K by the exhaust cam 276, the power piston is caused to rise by means of the air pressure maintained below it.

The hydraulic valve cam 292 then completes its forward stroke and permits the roller frame 297 to rise and the tripping block 303 to engage the block 308 on the oil discharge valve stem. Near the end of the forward stroke of the timing piston the latch 351 is raised, permitting the timing valve to move to the left and be retained there by the latch 350, as shown in Fig. 65, and admit oil under pressure to the left hand end of the timing piston 323, thus starting it on its return stroke. The movement of the hydraulic valve cam 292 to the right (Fig. 61) opens the oil discharge valve and permits the ram to be raised by the pistons 169 (Fig. 23), the power piston having just previously been raised, at the same time permitting the raising of the briquet discharge piston 292 by oil pressure through the pipe 412 (Fig. 28).

When the timing piston 323 reaches the end of its return stroke, the blocks 385ª near the end of the extension 386 on the tripping rod opens the valve 372ª which admits steam behind the die table cylinder and reinitiates the rotation of the die table.

The timing mechanism then remains in the position shown in Fig. 65 until the table completes its movement and the table key again trips the latch 350 by its entry into the succeeding slot in the die table.

It will be noted that the operations of forming the briquet and of ejecting a previously formed briquet are simultaneous, and that the filling of the die with material takes place during the period of rotation of the die table. This coordination of operations results in a more rapid cycle of operation of the briquetting press as a whole, and accordingly in a more rapid production of briquets.

*The floating die.*

During the compression of material into a briquet, the die assumes a position where the downward force thereon due to the friction of the material therein under action of the upper die plunger, is balanced by the upward force due to the friction of the material in the lower portion of the briquet under the reaction of the lower die plunger, neglecting the load assumed by the springs. The die is, in effect, a floating die, the upward pressure of the springs 71 being negligible compared to the force tending to carry the die down. This results in the formation of a briquet with a minimum of movement of material relatively to the die during compression, and consequently a minimum of erosion of both the surface of the briquet and the surface of the die. Accordingly the density of the briquet is more uniform than a briquet formed in a press having an immovable die.

It will be observed that while for convenience we have shown and referred to our invention as embodied in a machine for and method of forming briquets, our invention as an entirety is capable of various uses where compression is required, while various features of our invention, as the same are shown and claimed, are capable of widely varied uses in the mechanic arts not involving a compressing operation, and it is our intention to claim these various features when utilized for any purpose, either in the exact construction shown or in equivalent embodiments thereof.

We claim:

1. In a press having means for applying pressure, a movable die carrying structure carrying a plurality of open ended dies, means for bringing said dies successively into and out of operative relation with said pressure applying means, means for yieldingly supporting said dies in said die carrier, means bearing against the lower end of said dies for preventing the escape of material before compression, and means for permitting said bearing means to yield responsively to the yielding movement of the dies.

2. In a press having opposing die plungers, a die carrying structure carrying a plurality of open ended dies, means for bringing said dies successively into and out of operative relation with said die plungers, means adapted to place the material to be operated on in said dies, and yielding means for preventing the escape of the material in the dies until the same is operated upon by said die plungers.

3. In a press having opposing die plungers, a die carrying structure carrying a plurality of open ended dies, means for bringing said dies successively into and out of operative relation with said die plungers, means for yieldingly supporting said dies in said carrying structure, a yielding support associated with one die plunger adapted to close the corresponding ends of said dies until the same are brought into operative relation with the plungers and adapted to yield responsively to the movement of the die.

4. In a press having movable and stationary die plungers, a die carrying structure carrying a plurality of open ended dies, means for bringing said dies successively into and out of operative relation with said die plungers, means for yieldingly supporting said dies in said carrying structure, a plate surrounding the stationary die plunger, springs for supporting said plate and for permitting the same to move responsively to the movements of the die during the operation of the plungers therein.

5. In a press having movable and stationary die plungers, a die carrying structure carrying a plurality of open ended dies, means for bringing said dies successively into and out of operative relation with said die plungers, means for yieldingly supporting said dies in said carrying structure, a plate surrounding the lower die plunger, means for supporting said plate to permit it to move down during the compression operation and to return the die to its normal position after the compression operation.

6. In a press having upper and lower die plungers, a die carrying structure carrying a plurality of open ended dies, means for bringing said dies successively into and out of operative relation with said die plungers, means for yieldingly supporting said dies in said carrying structure, a plate surrounding the lower die plunger, means for supporting said plate to permit it to move down during the compression operation and to return the die to its normal position after the compression operation, said plate provided with packing around the lower plunger to prevent the accumulation of material below said plate.

7. In a press having means for applying pressure, a movable die carrying structure carrying a plurality of dies, means for bringing said dies successively into and out of operative relation with said pressure applying means, means for supporting said dies in said carrier to permit the same to yield under the action of the pressure means, and means for cushioning the return of said dies to normal position after the termination of the application of pressure thereto.

8. In a press having means for applying pressure, a movable die carrier, a plurality of die blocks carried thereby, resilient means for supporting said blocks in said carrier, and means for cushioning the movements of said blocks in said carrier.

9. In a press having means for applying pressure, a movable die table, a plurality of die blocks carried in openings in said die table, means for resiliently supporting said blocks in said carrier, said blocks being formed with shoulders adapted to seat against corresponding shoulders in said table so as to form with the walls of the openings and of said blocks dash pots for cushioning the movements of said blocks.

10. In a press having opposing die plungers, a movable die carrier having open ended dies therein, means for supporting said dies in said carrier to permit them to yield under the action of said die plungers, means for filling said dies, and a plate resiliently pressed against the lower end of said dies to retain the material therein.

11. In a press having movable and stationary die plungers, a movable die carrier having open ended dies therein, means for supporting said dies in said carrier to permit them to yield under the action of said die plungers, a follower plate associated with the stationary die plunger to prevent the escape of material from the die until the same is brought into operative relation with said plungers, means for filling each die with material to be compressed, and a plate resiliently pressed against the lower end of said die to retain the material therein until the die passes over the follower plate.

12. In a press having upper and lower die plungers, a rotatable die carrier having an open ended die therein, means for supporting said die in said carrier to permit it to yield under the action of said die plungers, means for filling said die with material to be compressed, means for rotating said table to carry the die from said filling means into operative relation with said die plungers, a follower plate associated with the lower die plunger for retaining the material in the die until it passes into operative relation to said die plunger, means for supporting said follower to permit it to yield during the compression of the material, and a plate adjacent to said follower plate, held against the lower end of said die to retain material therein until the same passes over said follower plate.

13. The combination with a die table, of a die block therein, means for yieldingly supporting said die block in said table, and means for cushioning the return movement of said die block.

14. The combination with a die table, of a die block therein, a shoulder on said die block seated against a corresponding shoulder on said table, springs for holding said block against the shoulder on said table and adapted to permit the same to yield downwardly, said shoulders forming with the sides of said block and the sides of the opening in said table a dash pot for cushioning the return movement of said die block.

15. The combination with a die table, of a die block therein, means for yieldingly supporting said die block in said table so as to permit the same to move therein, and packing between said block and table.

16. In a machine, the combination with mechanism for operating on material, a movable work carrier, means for holding material to be operated on in position on said carrier, means for moving said carrier, and means for retarding said carrier and positively stopping it in a position where the work is slightly beyond operative position, and means for moving said carrier in a reverse direction to bring the work in operative relation with said mechanism and for locking the same in that position.

17. In a machine, the combination with mechanism for operating on material, a movable work carrier, means for holding material to be operated on in position on said carrier, means for moving said carrier to bring the work into and out of operative relation with said mechanism comprising a power device adapted to move the carrier, and a retarding device for retarding the motion of said carrier and adapted to bring the work to rest in a position slightly beyond its proper position, and means for moving the work back into exact operative relation with said mechanism and for locking the work in that position.

18. In a machine, the combination with mechanism for operating on material, of a rotary table adapted to carry a plurality of work holding devices, a piston for rotating said table periodically, a hydraulic brake for retarding and stopping the rotation of said table so as to position one of said devices in substantially operative relation with said mechanism, and means for exactly positioning said device and locking the same in said operative relation.

19. In a machine, the combination with mechanism for operating on material, of a rotary table adapted to carry a plurality of work holding devices, a pawl ring movably mounted on the table and adapted to be rigidly connected thereto by means of a pawl, a piston connected with said ring for rotating said table, and a hydraulic brake connected to said ring for retarding the rotation of said table so as to position one of said devices in substantially operative relation with said mechanism, means for exactly positioning said device, and means for disconnecting said pawl from said table to permit the reverse rotation of said ring.

20. In a machine, the combination with mechanism for operating on material, a rotary table adapted to carry a plurality of equally spaced work holding devices, a piston for rotating said table periodically, an oil brake for retarding and stopping the rotation of said table so as to position one of said devices in substantially operative relation with said mechanism, and a key adapted to be moved into a slot in said table to accurately position said device and lock the same in said operative relation.

21. In a machine, the combination with a rotary table having a series of slots therein, of a pawl ring adapted to rotate around the axis of said table, a piston for rotating said ring and connected thereto, by a connecting rod, a pawl on said ring, a pin in said ring having a loose connection with said connecting rod, a pawl pivotally mounted on said ring adapted to engage in one of said slots in said table in order to rotate the same, and a pin on said connecting rod adapted to engage said pawl on the reverse stroke of the piston and lift said pawl out of said slot.

22. In a press, a die plunger, a rotary die table carrying a plurality of equally spaced dies, a piston for rotating said table, means for disconnecting said piston from said table to permit the return stroke thereof, means for retarding and stopping the rotation of said table when one of said dies is substantially in alignment with said plunger, and a key adapted to enter a slot in said table to lock the same and to position the die exactly in alignment with said plunger.

23. In a machine, the combination with mechanism for operating on material, a movable support for carrying the material to be operated upon, means for moving said support so as to bring said material into operative relation with said mechanism, means for accurately positioning and locking said movable support in said operative relation, and means operated by said locking means for setting said mechanism into operation.

24. In a machine, the combination with mechanism for operating on material, of a movable work carrier, means for moving said carrier so as to bring the work into operative relation with said mechanism, and means for locking said carrier in said operative relation, and means dependent on the position of said locking means for setting said mechanism into operation.

25. In a machine, the combination with mechanism for operating on material, of a movable work carrier, and means for setting said mechanism into operation conditioned upon the location of the work on the carrier in operative relation with said mechanism.

26. The combination with mechanism for performing an operation on material, of a movable work carrier having a plurality of work holding means, means for positioning said work holding means successively in alignment with said mechanism, and means for setting said mechanism into operation conditioned upon the exact alignment of one of said work holding means with said mechanism.

27. In a press, a die plunger, a rotary die table carrying a plurality of dies, means for rotating said table to bring said dies successively into alignment with said plunger, a key for locking said dies in exact alignment and mechanism actuated by said key for operating said plunger when a die is locked in alignment with said plunger.

28. In a press, a die plunger, a movable die table carrying a plurality of dies, means for moving said table to bring said dies successively into alignment with said plunger, a key for locking said dies in exact alignment, and mechanism actuated by said key for operating said plunger when a die is locked in alignment with said plunger.

29. The combination with mechanism for performing an operation on material, of a movable work carrier having a plurality of work holding means, means for positioning said work holding means successively in alignment with said mechanism, means actuated by said mechanism upon the completion of an operation for again setting said work carrier into motion, and means for setting said mechanism into operation conditioned upon the exact alignment of one of said work holding means with said mechanism.

30. The combination with mechanism for performing an operation on material, of a movable work carrier having a plurality of work holding means, means for positioning said work holding means successively in alignment with said mechanism, means for setting said mechanism into operation conditioned upon the exact alignment of one of said work holding means with said mechanism, and means actuated by said mechanism upon the completion of an operation for again setting said work carrier into motion.

31. In a press, a movable die carrier having a plurality of dies, a compression member, an ejecting plunger, a hydraulic piston connected to said compression member for hydraulically operating said ejecting plunger simultaneously with the operation of said compression member.

32. In a press, a rotary die table having a plurality of dies, a die plunger, a hydraulic ejecting plunger, hydraulic means operatively connected to said die plunger for operating said ejecting plunger.

33. In a press having pressure applying mechanism, a die carrier movable into and out of operative relation with said mechanism and having dies resiliently supported thereon, means for ejecting the completed article from said dies, and a support for said dies opposite said ejecting means for supporting said dies during the ejecting operation.

34. In a press, the combination of mechanism for pre-compressing material, mechanism for thereafter compressing said material, and means for preventing the actuation of said compressing mechanism when the movement of said pre-compressing mechanism exceeds a certain amount.

35. In a machine for compressing material, the combination of a die plunger, mechanism for moving said plunger to pre-compress the material and thereafter to compress said material, and means for preventing the compressing operation of said plunger when the movement of said plunger during the pre-compressing operation exceeds a certain amount.

36. In a press having a die and die plunger adapted to enter said die, the combination of mechanism for moving said die plunger into said die with limited power and thereafter for moving said plunger with greater power, and means for preventing the application of greater power to said plunger when said plunger enters said die more than a certain amount.

37. In a press having a die and a die plunger adapted to enter said die, the combination of mechanism for moving said die plunger into said die with limited power, means for increasing the power on said plunger and means for automatically preventing the operation of said power increasing means under certain conditions.

38. In a press having a die and die plunger adapted to enter said die, the combination of mechanism for moving said die plunger into said die with limited power and means for thereafter moving said plunger with greater power comprising a fluid operated piston and means for preventing the application of the fluid to the piston when said plunger enters said die more than a certain amount.

39. In a press having a die and die plunger adapted to enter said die, the combination of mechanism for moving said die plunger into said die with limited power and thereafter for moving said plunger with greater power. comprising a fluid actuated piston and cylinder having inlet and exhaust valves, means for engaging said inlet valve to open the same, and means for preventing the engagement of said valve when said plunger enters said die more than a certain amount.

40. In a press having a compressing member, the combination of mechanism for moving said member through a pre-compression stroke, mechanism for moving said member through a compression stroke, and automatic controlling means for actuating said pre-compression mechanism and thereafter actuating said compression mechanism.

41. In a press having a compressing member, the combination of mechanism for giving to said member a movement of limited power, mechanism for giving to said member a movement of greater power, and controlling means for actuating said mechanism in succession.

42. In a press having a compressing member, the combination of mechanism for giving to said member a movement of limited power, mechanism for giving to said member a movement of greater power, and controlling means for actuating said limited power mechanism and thereafter actuating said greater power mechanism.

43. In a press, the combination of a pair of power actuated members, means for transmitting pressure from said members to the material to be compressed, and controlling means for causing the actuation of said members in succession.

44. In a press, a hydraulic ram, means for introducing liquid behind said ram for moving the same, a power member for giving said ram additional power, and controlling means for causing the actuation of said ram and power member in succession.

45. In a press, a hydraulic ram, means for introducing liquid behind said ram for moving the same, a power member for giving said ram additional power, and controlling means for causing the actuation of said ram and thereafter said power member.

46. In a press, a hydraulic cylinder and ram, means for introducing liquid behind said ram for moving the same, a power member adapted to enter said cylinder and transmit to said ram additional power, and controlling means for causing the actuation of said ram and power member in succession.

47. In a press, a hydraulic cylinder and ram, means for introducing liquid behind said ram for moving the same, a power member adapted to enter said cylinder and transmit to said ram additional power, and controlling means for causing the actuation of said ram and thereafter the movement of said power member into said cylinder.

48. In a press having a die and die plunger, the combination of a hydraulic ram for moving said plunger into said die, and a power member for transmitting power to said plunger and controlling mechanism for first actuating said ram and then said power member.

49. In a press having a movable die table carrying a plurality of dies and a die plunger, the combination of means for moving said table to place said dies successively in alignment with said plunger, a hydraulic ram for moving said plunger into the die, and means actuated by the alignment of a die with said plunger for setting said ram into operation.

50. In a press having a movable die table carrying a plurality of dies and a die plunger, the combination of means for moving said table to place said dies successively in alignment with said plunger, a hydraulic ram for moving said plunger into the die, a power member for applying power to said ram, and means actuated by the alignment of a die with said plunger for moving said plunger to said die and thereafter setting said power member into operation.

51. In a press having a movable die table carrying a plurality of dies and a die plunger, the combination of means for moving said table to place said dies successively in alignment with said plunger, a hydraulic cylinder and a ram for operating said plunger, inlet and discharge valves for said cylinder and control mechanism actuated by the alignment of a die with said plunger for opening said inlet valve.

52. In a press having a movable die table carrying a plurality of dies and a die plunger, the combination of means for moving said table to place said dies successively in alignment with said plunger, a hydraulic cylinder and a ram for operating said plunger, inlet and discharge valves for said cylinder and control mechanism actuated by the alignment of a die with said plunger for opening said inlet valve and thereafter closing the same.

53. In a press having a movable die table carrying a plurality of dies and a die plunger, the combination of means for moving said table to place said dies successively in alignment with said plunger, a hydraulic cylinder and a ram for operating said plunger, inlet and discharge valves for said cylinder, and control mechanism actuated by the alignment of a die with said plunger for successively opening said inlet valve, closing the same, opening said discharge valve and closing the same.

54. In a press having a movable die table carrying a plurality of dies and a die plunger, the combination of means for moving said table to place said dies successively in alignment with said plunger, a hydraulic cylinder and a ram for operating said plunger, inlet and discharge valves for said cylinder, a power member for applying power to said plunger through said ram, mechanism for moving said power member, and control mechanism actuated by the alignment of a die with said plunger for successively opening said inlet valve, closing the same, actuating said power member, opening said discharge valve and closing the same.

55. In a press having a movable die table carrying a plurality of dies and a die plunger, the combination of means for moving said table to place said dies successively in alignment with said plunger, a hydraulic cylinder and a ram for operating said plunger, inlet and discharge valves for said cylinder, a power member for applying power to said plunger through said ram, mechanism for moving said power member, control mechanism actuated by the alignment of a die with said plunger for successively opening said inlet valve, closing the same, actuating said power member, opening said discharge valve and closing the same, means for returning said power member to its original position after the application of power, and means for returning said ram while said discharge valve is open.

56. In a machine, a movable work holding table carrying a plurality of work holding means, mechanism for operating on the material in said work holding means, means for successively moving said table so as to place said work holding means successively in operative relation to said mechanism, and timing means for actuating said mechanism and for actuating said table moving means after the completion of the operation by said mechanism.

57. In a press having a rotary die table carrying a plurality of dies and mechanism for compressing material in said dies, the combination of means for rotating said table so as to bring said dies successively into operative relation with said mechanism, and means for actuating said mechanism and actuating said rotating means after the operation of said mechanism.

58. In apparatus of the character described, the combination with a steam cylinder provided with inlet and exhaust valves, a piston in said cylinder provided with a hydraulic plunger, a hydraulic cylinder in which said plunger operates, inlet and discharge valves for said hydraulic cylinder, a ram in said hydraulic cylinder, and control mechanism for successively opening said hydraulic inlet valve, closing the same, opening said steam inlet valve, closing the same, opening said exhaust valve, opening said discharge valve, and then closing said discharge and exhaust valves.

59. In apparatus of the character described, the combination with a steam cylinder provided with inlet and exhaust valves, a piston in said cylinder provided with a hydraulic plunger, a hydraulic cylinder in which said plunger operates, inlet and discharge valves for said cylinder, a ram in said cylinder, and automatic control mechanism for operating said valves in proper sequence.

60. In apparatus of the character described, the combination with a steam cylinder provided with inlet and exhaust valves, a piston in said cylinder provided with a hydraulic plunger, a hydraulic cylinder in which said plunger operates, inlet and discharge valves for said hydraulic cylinder, a ram in said cylinder, control mechanism for operating said valves in proper sequence, and means for returning said piston and ram to their initial positions.

61. In apparatus of the character described, the combination with a steam cylinder provided with inlet and exhaust valves, a piston in said cylinder provided with a hydraulic plunger, a hydraulic cylinder in which said plunger operates, inlet and discharge valves for said hydraulic cylinder, a ram in said cylinder, and automatic timing mechanism for operating said valves in proper sequence.

62. In apparatus of the character described, the combination with a steam cylinder provided with inlet and exhaust valves, a piston in said cylinder provided with a hydraulic plunger, a hydraulic cylinder in which said plunger operates, inlet and discharge valves for said hydraulic cylinder, a ram in said hydraulic cylinder, timing mechanism for operating said valves in proper sequence, and means for varying the speed of movement of said timing mechanism.

63. In apparatus of the character described, the combination with a steam cylinder provided with inlet and exhaust valves, a piston in said cylinder provided with a hydraulic plunger, a hydraulic cylinder in which said plunger operates, inlet and discharge valves for said hydraulic cylinder, a ram in said hydraulic cylinder, hydraulically operated timing mechanism for operating said valves in proper sequence, and means for varying the speed of movement of said timing mechanism.

64. In apparatus of the character described, the combination with a steam cylinder provided with inlet and exhaust valves, a piston in said cylinder provided with a hydraulic plunger, a hydraulic cylinder in which said plunger operates, inlet and discharge valves for said hydraulic cylinder, a ram in said cylinder and timing mechanism actuated by a hydraulic control cylinder having a piston for operating said valves in proper sequence, and means for varying the supply of the actuating fluid to said control cylinder to vary the speed of said control cylinder piston.

65. In a press having a hydraulic cylinder provided with inlet and discharge valves, a steam cylinder provided with inlet and exhaust valves, cams for operating said steam valves, and a timing cam adapted to operate said hydraulic valves and operatively connected with said steam valve cams and means for moving said timing cam.

66. In a press having a hydraulic cylinder provided with inlet and discharge valves, a steam cylinder provided with inlet and exhaust valves, cams for operating said steam valves, a timing cam adapted to operate said hydraulic valves and operatively connected with said steam valve cams, and means for reciprocating said timing cam so as to operate said valves in proper sequence.

67. In a press having a hydraulic cylinder provided with inlet and discharge valves, a steam cylinder provided with inlet and exhaust valves, cams for opening said steam valves, a timing cam adapted to open said hydraulic valves and operatively connected with said steam valve cams, and a hydraulic control cylinder and piston for reciprocating said timing cam.

68. In a press having a hydraulic cylinder provided with inlet and discharge valves, a steam cylinder provided with inlet and exhaust valves, steam valve cams for operating said steam valves, means associated with the cam for said steam valve for varying the cut-off of said steam inlet valve, and a hydraulic valve cam adapted to operate said hydraulic valves and operatively connected with said steam valve cams, and means for moving said hydraulic valve cam.

69. In a press having a hydraulic cylinder provided with inlet and discharge valves, a steam cylinder provided with inlet and exhaust valves, cams for opening said steam valves, a timing cam adapted to open said hydraulic valves and operatively connected with said steam valve cams, means associated with said timing cam for tripping and closing said hydraulic valves and permitting the same to close, and means for moving said timing cam.

70. In a press having a hydraulic cylinder provided with inlet and discharge valves, a steam cylinder provided with inlet and exhaust valves, cams for opening said steam valves, a timing cam adapted to open said hydraulic valves and operatively connected with said steam valve cams, said timing cam having devices operatively connected thereto for tripping and closing said hydraulic valves, and means for adjusting said devices so as to vary the time of tripping said valves, and means for reciprocating said timing cam.

71. In a machine, a movable table carrying a plurality of work holding means, mechanism for performing an operation on the material in said work holding means, said table having a plurality of slots therein corresponding to the number of pieces of work, a centering key adapted to enter said slots and adapted to position the corresponding work holding means in operative relation with said mechanism, a timing member adapted to actuate and co-ordinate the operations of said mechanism, a cylinder having a control valve and a piston for reciprocating said timing member, said key operatively connected with said control valve and adapted to actuate said piston when said key enters one of said slots.

72. In a machine, a movable table carrying a plurality of work holding means, mechanism for performing an operation on the material in said work holding means, a piston and cylinder for moving said table on its forward stroke to bring a piece of work into operative relation with said mechanism, inlet and exhaust valves for said cylinder, control means for actuating said mechanism and operatively connected with said inlet valve and exhaust valves and adapted to open said exhaust valve at the beginning of the cycle of operations of said mechanism and to open said inlet valve upon the completion of said cycle of operations, and means connected to said piston for closing said exhaust valve at the end of the return stroke of said piston.

73. In a machine, a movable table carrying a plurality of work holding means, mechanism for performing an operation on the material in said work holding means, a piston and cylinder for moving said table on its forward stroke to bring a piece of work into operative relation with said mechanism, inlet and exhaust valves for said cylinder, control means for actuating said mechanism and operatively connected with said inlet valve and adapted to open said exhaust valve at the beginning of the cycle of operations of said mechanism on the material and to open said inlet valve upon the completion of said cycle of operations, and means for returning said piston to its initial position, and means connected to said piston for closing said exhaust valve at the end of the return stroke of said piston.

74. In a press, the combination with power mechanism, a rotary die table carrying a plurality of dies, a piston in a cylinder for rotating said table on its forward stroke to position a die in operative relation to said mechanism, an inlet valve for said cylinder, a reciprocating control member for controlling the operations of said mechanism, said control member having means associated therewith for opening said inlet valve at the termination of the cycle of operations of said mechanism.

75. In a press, the combination with power mechanism, a rotary die table carrying a plurality of dies, a piston operated in a cylinder for rotating said table on its forward stroke to position a die in operative relation to said mechanism, an inlet valve for said cylinder, a reciprocating control member for controlling the operations of said mechanism, said control member having means associated therewith for opening said inlet valve at the termination of the cycle of operations of said mechanism, and variable cut-off means for said inlet valve.

76. In a machine having a movable table having a series of slots therein and a projection associated with each slot, the combination of a key mechanism having a slidable key therein adapted to enter the slot opposite said key; a piston connected with said key and a cylinder for actuating said piston to move said key into a slot, a valve for said cylinder and a valve lever adapted to be engaged by one of said projections when one of said slots is opposite said key and to open said valve, thereby causing said key to move into said slot.

77. In a machine of the class described, a key mechanism comprising a housing having therein a slidable key, a piston connected with said key for moving said key forward, a cylinder having a spring pressed valve for actuating said piston, a pivoted lever normally pressed against said valve by a spring weaker than said valve spring, said lever adapted to be momentarily lifted from engagement with said valve and adapted when released to momentarily open said valve by its inertia to cause said key to move forward.

78. In a machine of the class described, a key mechanism comprising a housing having therein a slidable key, a piston connected with said key for moving said key forward, a spring against which said piston works, a cylinder having a spring pressed valve for actuating said piston, a pivoted lever normally pressed against said valve by a spring normally weaker than said valve spring, said lever adapted to be momentarily lifted from engagement with said valve and adapted when released to momentarily open said valve by its inertia to admit a fluid under pressure behind said piston to move the same, and an adjustable valve to permit the gradual escape of fluid from behind said piston, thereby returning said key to its initial position.

79. In a machine, the combination of a work ejecting member comprising a hydraulic cylinder, a piston therein for ejecting the work, another hydraulic cylinder and piston operatively connected to said machine and by means of a conduit to said ejecting cylinder for operating said ejecting piston hydraulically, and a reservoir at one end of said operating cylinder for supplying liquid to compensate for leakage.

80. In a machine, the combination of a work ejecting member comprising a hydraulic cylinder, a piston actuated therein for ejecting the work, another hydraulic cylinder and piston operatively connected to said machine and by means of a conduit to said ejecting cylinder for operating said ejecting piston hydraulically, the upper end of said operating cylinder being tapered and provided with a reservoir for containing liquid to maintain said cylinders full of liquid.

81. In a press having a reciprocating compressing member, the combination of a work ejecting member comprising a hydraulic cylinder and a piston for ejecting the completed work from said machine, a hydraulic operating cylinder hydraulically connected to said ejecting cylinder and a piston for said operating cylinder connected to said compressing member and reciprocated thereby and adapted to force liquid into said ejecting cylinder to cause said ejecting piston to operate simultaneously with said compressing member, said operating cylinder being of a larger diameter at its upper end than its piston and provided with a liquid reservoir adapted to supply oil leakage when said operating piston is at the upper end of its cylinder.

82. In a press, a ram, a hydraulic cylinder for actuating said ram, a plunger operating in said cylinder, said cylinder constructed to provide a chamber into which pressure liquid is suddenly admitted after the ram has traveled a certain distance, a by-pass duct leading from said chamber into said cylinder, and means for regulating the flow of liquid through said duct comprising a check valve and adjustable means for holding said valve off its seat by varying amounts.

83. In a press, the combination of a power member, a compressing member, confining means for a pressure transmitting fluid interposed between said members and a chamber adapted to be put into communication with said confining means during the power operation of said press, and means for varying the effective size of said chamber comprising a by-pass duct between said chamber and confining means and a check valve in said duct having an adjustable stop for holding said valve off its seat by varying amounts.

84. In a press, a ram, a hydraulic cylinder and a valve for admitting pressure liquid into said cylinder, said valve provided with means for confining a body of liquid to cushion said valve on seating.

85. In a press, a ram, a hydraulic cylinder and a valve for admitting pressure liquid into said cylinder, said valve provided with flanges adjacent its seating surfaces for confining a body of oil to cushion the valve.

86. The combination with a hydraulic cylinder, of a valve having a seat, said valve and seat provided with means for momentarily confining a body of oil between the seating surfaces.

87. In apparatus of the class described, a self-cushioning valve having means for momentarily confining a body of fluid between the valve and valve seat.

88. In apparatus of the class described, a self-cushioning valve having a seat, said valve and seat provided with cylindrical surfaces adjacent the edges of the seating surfaces of said valve and seat for momentarily confining a body of fluid between the valve and seat.

89. In apparatus of the class described, a steam cylinder, an inlet valve therefor having a valve stem, a member adapted to engage said stem to raise said valve, and means for moving said member out of engagement with said stem to permit the closing of said valve.

90. In apparatus of the class described, a steam cylinder, an inlet valve therefor normally pressed on its seat by a spring, a movable member adapted to engage said valve to open the same, means for raising said member, adjustable means adapted to be engaged by said raising means to move said member out of engagement with said valve to permit the same to close.

91. In apparatus of the class described, a steam cylinder, an inlet valve therefor normally pressed on its seat by a spring and provided with a valve stem, mechanism for opening said valve, a movable member on said mechanism adapted to engage said stem and having means connected thereto adapted to be engaged by said mechanism to move said member out of engagement with said stem to permit the closing of said valve, said means being adjustable to vary the cut-off.

92. In apparatus of the class described, a steam cylinder, an inlet valve therefor normally pressed on its seat by a spring and provided with a valve stem, a movable member for engaging said stem and means connected to said member for opening the valve, and mechanism connected to said member for moving said member out of position for engagement with said stem in order to automatically prevent, under certain conditions, the operation of said steam cylinder.

93. In apparatus of the class described, a steam cylinder, an inlet valve therefor normally pressed on its seat by a spring and provided with a valve stem, means for opening said valve, a tripping block slidably connected to said means and adapted to engage said stem, mechanism for moving said block out of engagement with said valve at cut-off, and for preventing the opening of said valve under certain conditions.

94. In a machine, operating mechanism, a steam cylinder for applying power to said mechanism, an inlet valve for said cylinder, means for opening said valve, a tripping member for operatively connecting said valve and opening means, a magnet connected to said member and adapted when excited to maintain said connection, and an electric switch controlling said magnet adapted to be opened by said mechanism under certain conditions to prevent the opening of said inlet valve.

95. In apparatus of the class described, a hydraulic cylinder, a hollow ram adapted to reciprocate in said cylinder, packing for said ram, a portion of said ram being of a smaller diameter than said cylinder to provide a space between said ram and cylinder, and passages leading to said space for balancing the fluid pressure on said ram.

96. In an automatic machine having a piston and cylinder for controlling the operations of said machine, the combination of valve mechanism for said cylinder comprising a piston valve adapted to admit fluid to said cylinder for reciprocating said control piston, said piston valve provided with a rod having a block thereon, and means for reciprocating said piston valve comprising a spring adapted to alternately engage opposite faces of said block, latches adapted to alternately engage opposite faces of said block for preventing movement of said block by said spring, and means for alternately lifting said latches to cause the reciprocation of said valve piston.

97. In an automatic machine having a piston and cylinder for controlling the operations of said machine, the combination of valve mechanism for said cylinder comprising a valve adapted to admit fluid to said cylinder for reciprocating said control piston, said valve provided with a rod having a block thereon, and means for reciprocating said valve comprising a spring adapted to alternately engage opposite faces of said block, latches adapted to alternately engage opposite faces of said block for preventing movement of said block by said spring, means for lifting one of said latches when said control piston reaches the end of its forward stroke to cause the return stroke of said control piston, the other latch being connected to control mechanism adapted to lift said latch to begin another cycle of operation of said machine.

98. In a press having means for applying pressure, a movable die carrying structure carrying a die, means for bringing said die into and out of operative relation with said pressure applying means, means for yieldingly supporting said die in said die carrier, means bearing against one end of said die for preventing the escape of material from said die before compression, and means for permitting said bearing means to yield responsively to the yielding movement of the die.

99. In a press having means for applying pressure, a movable die carrying structure carrying a plurality of open ended dies, means for bringing said dies successively into and out of operative relation with said pressure applying means, means for yieldingly supporting said dies in said die carrier, means for placing material to be subjected to pressure in said dies, means for preventing the escape of material from said dies, and means for permitting said preventing means to yield under the longitudinal movements of said dies.

100. In a press having opposing die plungers, a die carrying structure carrying an open ended die, means for bringing said die into and out of operative relation with said die plungers, means for yieldingly supporting said die in said carrying structure, a yielding support associated with one die plunger adapted to close the corresponding end of said die until the same is brought into operative relation with the plunger and adapted to yield responsively to the movement of the die.

101. In a press having movable and stationary die plungers, a die carrying structure carrying a plurality of open ended dies, means for bringing said dies successively into and out of operative relation with said die plungers, means for yieldingly supporting said dies in said carrying structure, a plate surrounding the stationary die plunger, springs for supporting said plate and for permitting the same to move responsively to the movements of the die during the operation of the plungers therein, and means for cushioning the return of said plate.

102. In a press, means for applying pressure, a die carrying structure, a die block flexibly supported within said structure, and packing between said die block and said structure.

103. In a press having means for applying power, the combination of a die carrying structure having a movable die therein, and means for cushioning the return movement of said die.

104. In a machine, the combination with mechanism for operating on material, a movable work carrier, means for holding material to be operated on in position on said carrier, means for moving said carrier, and means for retarding said carrier and stopping it in a position where the work is slightly beyond operative position, and means for moving said carrier in a reverse direction to bring the work in operative relation with said mechanism.

105. In a machine, the combination with mechanism for operating on material, a movable work carrier, means for holding material to be operated on in position on said carrier, means for moving said carrier to bring the work into and out of operative relation with said mechanism comprising a power device adapted to move the carrier, and a retarding device for retarding the motion of said carrier and adapted to bring the work to rest in a position slightly beyond its proper position, and means for moving the work back into exact operative relation with said mechanism.

106. In a machine, the combination with mechanism for operating on material, of a rotary table adapted to carry a plurality of work holding devices, a piston for rotating said table periodically, and a hydraulic brake for retarding and stopping the rotation of said table so as to position one of said devices in substantially operative relation with said mechanism.

107. In a machine, a rotary table adapted to carry a plurality of work holding devices, a ring rotatably mounted on the table, movable means for rigidly connecting said ring to said table, a piston connected to said ring for rotating said table, and a hydraulic brake connected to said ring for retarding the rotation of said table and means for disconnecting said movable means from said table to permit the reverse rotation of said ring.

108. In a press, a die plunger, a rotary die table carrying a plurality of dies, a pawl ring rotatably mounted on said table and adapted to be rigidly connected thereto by a pawl, a steam piston having a connecting rod connected to said ring for rotating the same in one direction, means for disconnecting said pawl from said ring to permit the reverse rotation of said ring, a hydraulic brake connected to said ring for retarding the rotation of said table and stopping it when one of said dies is substantially in alignment with said plunger, and for retarding and cushioning the reverse rotation of said pawl ring, and a tapered key adapted to be forced into a slot in said table to position the die exactly in alignment with said plunger.

109. In a press, the combination with a movable table of a hydraulic brake comprising a piston connected to said table, and a cylinder having near its head internal grooves to allow the flow of fluid around the piston which decrease in cross-sectional area toward the head of the cylinder.

110. In a machine, the combination with mechanism for operating on material, of a movable work carrier, means for moving said carrier so as to bring the work into operative relation with said mechanism, and means dependent on the position of said carrier in said operative relation for setting said mechanism into operation.

111. In a press, a die plunger, a rotary die table carrying a plurality of dies, means for rotating said table to bring said dies seccessively into alignment with said plunger, a key for positioning said dies in exact alignment, and mechanism actuated by said key for operating said plunger when a die is positioned in alignment with said plunger.

112. The combination with mechanism for performing an operation on material, of a movable work carrier having work holding means, means for positioning said work holding means in operative alignment with said mechanism, and means for setting said mechanism into operation conditioned upon the exact alignment of said work holding means with said mechanism.

113. In a press, a rotary die table carrying a die, a die plunger, a hydraulic ejecting plunger, hydraulic means operatively connected to said die plunger for operating said ejecting plunger.

114. In a press, a movable die carrier, a compression member, an ejecting plunger and cylinder, a hydraulic piston and cylinder operated by the movement of said compression member, and a conduit connecting said cylinders for actuating said ejecting plunger hydraulically.

115. In a press, the combination of a pair of opposing die plungers, a die, means for yieldingly supporting said die to permit the same to yield responsively to the action of said plungers, said die increasing in cross section in the direction in which the same yields during compression.

116. In a press, the combination with a movable and stationary die plunger, of a die, means for flexibly supporting said die in normal position, said die increasing in cross-sectional area in the direction of the forward movement of said movable plunger.

117. In a press, the combination with a movable and stationary die plunger, of a die, means for supporting said die so as to permit the same to yield responsively to the movement of said movable plunger and to pass partially over said stationary plunger, said die being tapered toward said movable plunger.

118. In apparatus of the character described, the combination with a power cylinder provided with inlet and exhaust valves, a piston in said cylinder provided with a hydraulic plunger, a hydraulic cylinder in which said plunger operates, inlet and discharge valves for said hydraulic cylinder, a ram in said hydraulic cylinder, and hydraulically operated timing mechanism for operating said valves in proper sequence.

119. In apparatus of the character described, the combination with a steam cylinder provided with inlet and exhaust valves, a piston in said cylinder provided with a hydraulic plunger, a hydraulic cylinder in which said plunger operates, inlet and discharge valves for said hydraulic cylinder, a ram in said cylinder, and timing mechanism actuated by a hydraulic control cylinder having a piston for operating said valves in proper sequence.

120. In a machine, a movable table carrying a plurality of work holding means, power mechanism for performing an operation on the material in said work holding means, said table having a plurality of slots therein corresponding to the number of pieces of work, a centering key adapted to enter said slots and adapted to position the corresponding work holding means in operative relation with said mechanism, timing mechanism adapted to actuate and co-ordinate the operations of said power mechanism, said key operatively connected with said timing mechanism and adapted to actuate the same when said key enters one of said slots.

121. In an automatic machine, the combination with a cylinder and piston and piston rod adapted to reciprocate therein, of means for reciprocating said piston comprising a valve adapted to admit fluid to said cylinder for reciprocating said piston, a spring associated with said valve for oscillating it, a block on said piston rod adapted to alternately engage opposite ends of said spring to place the same in tension, so as to actuate said valve.

122. In apparatus of the class described, hydraulic mechanism comprising in combination a hydraulic valve having a seat, mechanism for opening said valve to permit the passage of liquid, means for tripping said valve at a predetermined moment and permitting the same to close under pressure of the liquid, said valve and seat having means associated therewith for momentarily confining a body of oil between said valve and seat for cushioning said valve on seating.

123. In an automatic machine, the combination with a cylinder and piston and piston rod adapted to reciprocate therein, of means for reciprocating said piston comprising a valve adapted to admit fluid to said cylinder for reciprocating said piston, a spring associated with said valve for oscillating it, a block on said piston rod adapted to alternately engage opposite ends of said spring to place the same in tension so as to actuate said valve, and latches for holding said valve against oscillation and means for periodically releasing said latches to permit the oscillation of said valve.

124. In a machine, the combination with mechanism for operating on material, a movable support for carrying the material to be operated upon, and means adapted to be actuated by an expansible fluid for moving said support so as to bring said material into operative relation with said mechanism, and means for retarding the movement of said support.

125. In a machine, the combination with mechanism for operating on material, a movable support for carrying the material to be operated upon, resilient means for moving said support so as to bring said material into operative relation with said mechanism, and means independent of said moving means for gradually retarding and stopping the movement of said support.

126. In a machine, a rotary table, means actuated by an expansible fluid for periodically rotating said table through a predetermined arc, and means independent of said rotating means for absorbing the energy of rotation of said table and stopping the same.

127. In a machine, a rotary table, a piston and cylinder operatively connected with said table and adapted to be actuated by an expansible fluid for periodically rotating said table through a predetermined arc, and means independent of said rotating means for gradually retarding the rotation of said table and stopping the same.

128. In a pressing machine, the combination of a plunger, means for moving the plunger, a movable carrier comprising a plurality of dies, means for moving the carrier to bring the dies successively under the plunger, and means for holding said carrier in fixed position under the plunger, and mechanism actuated when said last named means becomes effective for setting the plunger moving means in operation.

MARIUS P. JACOMINI.
LADISLAV F. KRISTUFEK.